United States Patent
Ramos et al.

(10) Patent No.: US 10,586,279 B1
(45) Date of Patent: Mar. 10, 2020

(54) AUTOMATED ANALYSIS OF DATA TO GENERATE PROSPECT NOTIFICATIONS BASED ON TRIGGER EVENTS

(71) Applicant: EXPERIAN INFORMATION SOLUTIONS, INC., Costa Mesa, CA (US)

(72) Inventors: Armando Ramos, Santa Maria, CA (US); Stephen R. Meeks, Orange, CA (US); Michele M. Pearson, Irvine, CA (US); Pamela Fielding, Corona, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 362 days.

(21) Appl. No.: 14/254,750

(22) Filed: Apr. 16, 2014

Related U.S. Application Data

(63) Continuation of application No. 11/231,339, filed on Sep. 20, 2005, now Pat. No. 8,732,004.

(Continued)

(51) Int. Cl.
*G06Q 30/00* (2012.01)
*G06Q 40/02* (2012.01)
*G06Q 30/02* (2012.01)

(52) U.S. Cl.
CPC ....... *G06Q 40/025* (2013.01); *G06Q 30/0255* (2013.01); *G06Q 30/0269* (2013.01)

(58) Field of Classification Search
CPC .. G06Q 30/0251; G06Q 90/00; G06Q 40/025; G06Q 30/0255; G06Q 30/0269
(Continued)

(56) References Cited

U.S. PATENT DOCUMENTS

| 3,316,395 A | 4/1967 | Lavin et al. |
| 4,305,059 A | 12/1981 | Benton |

(Continued)

FOREIGN PATENT DOCUMENTS

| CN | 1290373 | 4/2001 |
| CN | 1290372 | 5/2001 |

(Continued)

OTHER PUBLICATIONS

International Search Report and Written Opinion for Application No. PCT/US2007/021815, dated Sep. 5, 2008.
(Continued)

*Primary Examiner* — Michael Berkman
(74) *Attorney, Agent, or Firm* — Knobbe Martens, Olson & Bear LLP

(57) ABSTRACT

Systems and methods are described for identifying a subset of interest from a general population and for monitoring a database of daily activity logs associated with the general population in order to identify database entries indicative of an occurrence of a pre-defined trigger event that is associated with a member of the subset of interest. In particular, systems and methods are described that allow a massive database of daily activity logs to be monitored to identify trigger events that have occurred within the past twenty-four hours or other very recent time period. Embodiments are described that may be advantageously used by a provider of credit-related products and/or services who wishes to accurately target prospective customers, identified by the system, based on occurrence of a trigger event, as being in a decision-making phase of credit shopping, for purposes of making a timely and targeted offering relevant to the customers' current activities.

20 Claims, 8 Drawing Sheets

Related U.S. Application Data

(60) Provisional application No. 60/612,313, filed on Sep. 22, 2004.

(58) Field of Classification Search
USPC .......................... 705/14.1, 38, 14.53, 14.66
See application file for complete search history.

(56) References Cited

U.S. PATENT DOCUMENTS

| | | |
|---|---|---|
| 4,371,739 A | 2/1983 | Lewis et al. |
| 4,398,055 A | 8/1983 | Ijaz et al. |
| 4,578,530 A | 3/1986 | Zeidler |
| 4,617,195 A | 10/1986 | Mental |
| 4,672,149 A | 6/1987 | Yoshikawa et al. |
| 4,736,294 A | 4/1988 | Gill |
| 4,754,544 A | 7/1988 | Hanak |
| 4,774,664 A | 9/1988 | Campbell et al. |
| 4,775,935 A | 10/1988 | Yourick |
| 4,872,113 A | 10/1989 | Dinerstein |
| 4,876,592 A | 10/1989 | Von Kohorn |
| 4,891,503 A | 1/1990 | Jewell |
| 4,895,518 A | 1/1990 | Arnold |
| 4,947,028 A | 8/1990 | Gorog |
| 4,982,346 A | 1/1991 | Girouard et al. |
| 5,013,038 A | 5/1991 | Luxenberg et al. |
| 5,025,138 A | 6/1991 | Cuervo |
| 5,025,373 A | 6/1991 | Keyser, Jr. et al. |
| 5,034,807 A | 7/1991 | Von Kohorn |
| 5,056,019 A | 10/1991 | Schultz et al. |
| 5,060,153 A | 10/1991 | Nakagawa |
| 5,148,365 A | 9/1992 | Dembo |
| 5,201,010 A | 4/1993 | Deaton et al. |
| 5,220,501 A | 6/1993 | Lawlor et al. |
| 5,239,462 A | 8/1993 | Jones et al. |
| 5,259,766 A | 11/1993 | Sack |
| 5,262,941 A | 11/1993 | Saladin |
| 5,274,547 A | 12/1993 | Zoffel et al. |
| 5,283,731 A | 2/1994 | Lalonde et al. |
| 5,297,031 A | 3/1994 | Gutterman et al. |
| 5,305,195 A | 4/1994 | Murphy |
| 5,317,636 A | 5/1994 | Vizcaino |
| 5,325,509 A | 6/1994 | Lautzenheiser |
| 5,336,870 A | 8/1994 | Hughes et al. |
| 5,353,218 A | 10/1994 | DeLapa et al. |
| 5,361,201 A | 11/1994 | Jost et al. |
| 5,454,030 A | 9/1995 | de Oliveira et al. |
| 5,459,306 A | 10/1995 | Stein et al. |
| 5,468,988 A | 11/1995 | Glatfelter et al. |
| 5,504,675 A | 4/1996 | Cragun et al. |
| 5,515,098 A | 5/1996 | Caries |
| 5,563,783 A | 10/1996 | Stolfo et al. |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,621,201 A | 4/1997 | Langhans et al. |
| 5,621,812 A | 4/1997 | Deaton et al. |
| 5,627,973 A | 5/1997 | Armstrong et al. |
| 5,629,982 A | 5/1997 | Micali |
| 5,630,127 A | 5/1997 | Moore et al. |
| 5,640,577 A | 6/1997 | Scharmer |
| 5,649,114 A | 7/1997 | Deaton et al. |
| 5,659,725 A | 8/1997 | Levy et al. |
| 5,659,731 A | 8/1997 | Gustafson |
| 5,661,516 A | 8/1997 | Caries |
| 5,679,176 A | 10/1997 | Tsuzuki et al. |
| 5,689,651 A | 11/1997 | Lozman |
| 5,696,907 A | 12/1997 | Tom |
| 5,699,527 A | 12/1997 | Davidson |
| 5,704,029 A | 12/1997 | Wright, Jr. |
| 5,708,422 A | 1/1998 | Blonder et al. |
| 5,724,521 A | 3/1998 | Dedrick |
| 5,732,400 A | 3/1998 | Mandler |
| 5,740,549 A | 4/1998 | Reilly et al. |
| 5,745,654 A | 4/1998 | Titan |
| 5,745,694 A | 4/1998 | Egawa et al. |
| 5,745,706 A * | 4/1998 | Wolfberg ............. G06Q 20/102 705/35 |
| 5,748,098 A | 5/1998 | Grace |
| 5,771,562 A | 6/1998 | Harvey et al. |
| 5,774,868 A | 6/1998 | Cragun et al. |
| 5,774,870 A | 6/1998 | Storey |
| 5,774,883 A | 6/1998 | Andersen |
| 5,793,972 A | 8/1998 | Shane |
| 5,802,142 A | 9/1998 | Browne |
| 5,819,226 A | 10/1998 | Gopinathan et al. |
| 5,822,410 A | 10/1998 | McCausland et al. |
| 5,822,750 A | 10/1998 | Jou et al. |
| 5,825,884 A | 10/1998 | Zdepski et al. |
| 5,844,218 A | 12/1998 | Kawan et al. |
| 5,848,396 A | 12/1998 | Gerace |
| 5,857,174 A | 1/1999 | Dugan |
| 5,857,175 A | 1/1999 | Day et al. |
| 5,864,822 A | 1/1999 | Baker, III |
| 5,864,830 A | 2/1999 | Armetta et al. |
| 5,870,721 A | 2/1999 | Norris |
| 5,873,068 A | 2/1999 | Beaumont et al. |
| 5,875,236 A | 2/1999 | Jankowitz |
| 5,878,403 A | 3/1999 | DeFrancesco |
| 5,884,287 A | 3/1999 | Edesess |
| 5,884,289 A | 3/1999 | Anderson et al. |
| 5,912,839 A | 6/1999 | Ovshinsky et al. |
| 5,914,472 A | 6/1999 | Foladare et al. |
| 5,915,243 A | 6/1999 | Smolen |
| 5,918,217 A | 6/1999 | Maggioncalda et al. |
| 5,924,082 A | 7/1999 | Silverman et al. |
| 5,930,764 A | 7/1999 | Melchione et al. |
| 5,930,774 A | 7/1999 | Chennault |
| 5,930,776 A | 7/1999 | Dykstra et al. |
| 5,933,813 A | 8/1999 | Teicher et al. |
| 5,940,812 A | 8/1999 | Tengel et al. |
| 5,944,790 A | 8/1999 | Levy |
| 5,950,172 A | 9/1999 | Klingman |
| 5,953,707 A | 9/1999 | Huang et al. |
| 5,953,710 A | 9/1999 | Fleming |
| 5,956,693 A | 9/1999 | Geerlings |
| 5,966,695 A | 10/1999 | Melchione et al. |
| 5,970,478 A | 10/1999 | Walker et al. |
| 5,974,396 A | 10/1999 | Anderson et al. |
| 5,978,780 A | 11/1999 | Watson |
| 5,991,411 A | 11/1999 | Kaufman et al. |
| 5,991,735 A | 11/1999 | Gerace |
| 5,995,947 A | 11/1999 | Fraser et al. |
| 6,012,044 A | 1/2000 | Maggioncalda et al. |
| 6,014,645 A * | 1/2000 | Cunningham ....... G06Q 20/363 235/379 |
| 6,014,688 A | 1/2000 | Venkatraman et al. |
| 6,021,362 A | 2/2000 | Maggard et al. |
| 6,021,397 A | 2/2000 | Jones et al. |
| 6,026,368 A | 2/2000 | Brown et al. |
| 6,029,139 A | 2/2000 | Cunningham et al. |
| 6,029,149 A | 2/2000 | Dykstra et al. |
| 6,029,154 A | 2/2000 | Pettitt |
| 6,038,551 A | 3/2000 | Barlow et al. |
| 6,044,357 A | 3/2000 | Garg |
| 6,055,570 A | 4/2000 | Nielsen |
| 6,058,375 A | 5/2000 | Park |
| 6,061,658 A | 5/2000 | Chou et al. |
| 6,061,691 A | 5/2000 | Fox |
| 6,064,973 A | 5/2000 | Smith et al. |
| 6,064,987 A | 5/2000 | Walker |
| 6,070,141 A | 5/2000 | Houvener |
| 6,070,142 A | 5/2000 | McDonough et al. |
| 6,070,147 A | 5/2000 | Harms et al. |
| 6,073,140 A | 6/2000 | Morgan et al. |
| 6,085,169 A | 7/2000 | Walker et al. |
| 6,088,686 A | 7/2000 | Walker et al. |
| 6,094,643 A | 7/2000 | Anderson et al. |
| 6,098,052 A | 8/2000 | Kosiba et al. |
| 6,101,486 A | 8/2000 | Roberts et al. |
| 6,105,007 A | 8/2000 | Norris |
| 6,115,690 A | 9/2000 | Wong |
| 6,115,693 A | 9/2000 | McDonough et al. |
| 6,115,694 A | 9/2000 | Cheetham et al. |

(56) References Cited

U.S. PATENT DOCUMENTS

| | | |
|---|---|---|
| 6,119,103 A | 9/2000 | Basch et al. |
| 6,128,599 A | 10/2000 | Walker |
| 6,128,603 A | 10/2000 | Dent |
| 6,134,548 A | 10/2000 | Gottsman et al. |
| 6,144,948 A | 11/2000 | Walker et al. |
| 6,154,729 A | 11/2000 | Cannon et al. |
| 6,178,442 B1 | 1/2001 | Yamazaki |
| 6,182,060 B1 | 1/2001 | Hedgcock et al. |
| 6,182,229 B1 | 1/2001 | Nielsen |
| 6,185,543 B1 | 2/2001 | Galperin et al. |
| 6,198,217 B1 | 3/2001 | Suzuki et al. |
| 6,202,053 B1 | 3/2001 | Christiansen et al. |
| 6,208,979 B1 | 3/2001 | Sinclair |
| 6,209,033 B1 | 3/2001 | Datta et al. |
| 6,223,171 B1 | 4/2001 | Chaudhuri et al. |
| 6,233,566 B1 | 5/2001 | Levine et al. |
| 6,236,977 B1 | 5/2001 | Verba et al. |
| 6,239,352 B1 | 5/2001 | Luch |
| 6,249,770 B1 | 6/2001 | Erwin et al. |
| 6,253,203 B1 | 6/2001 | O'Flaherty et al. |
| 6,254,000 B1 | 7/2001 | Degen et al. |
| 6,269,325 B1 | 7/2001 | Lee et al. |
| 6,275,824 B1 | 8/2001 | O'Flaherty et al. |
| 6,278,055 B1 | 8/2001 | Forrest et al. |
| 6,285,983 B1 | 9/2001 | Jenkins |
| 6,285,987 B1 | 9/2001 | Roth et al. |
| 6,289,318 B1 | 9/2001 | Barber |
| 6,298,330 B1 | 10/2001 | Gardenswartz et al. |
| 6,298,348 B1 | 10/2001 | Eldering |
| 6,304,860 B1 | 10/2001 | Martin et al. |
| 6,307,958 B1 | 10/2001 | Deaton et al. |
| 6,308,210 B1 | 10/2001 | Fields et al. |
| 6,311,169 B2 | 10/2001 | Duhon |
| 6,317,752 B1 | 11/2001 | Lee et al. |
| 6,324,524 B1 | 11/2001 | Lent et al. |
| 6,324,566 B1 | 11/2001 | Himmel et al. |
| 6,330,546 B1 | 12/2001 | Gopinathan et al. |
| 6,330,575 B1 | 12/2001 | Moore |
| 6,334,110 B1 | 12/2001 | Walter et al. |
| 6,366,903 B1 | 4/2002 | Agrawal et al. |
| 6,384,844 B1 | 5/2002 | Stewart et al. |
| 6,385,592 B1 | 5/2002 | Angles et al. |
| 6,385,594 B1 | 5/2002 | Lebda et al. |
| 6,397,224 B1 | 5/2002 | Zubeldia et al. |
| 6,405,173 B1 | 6/2002 | Honarvar |
| 6,405,181 B2 | 6/2002 | Lent et al. |
| 6,412,012 B1 | 6/2002 | Bieganski et al. |
| 6,418,436 B1 | 7/2002 | Degen et al. |
| 6,424,956 B1 | 7/2002 | Werbos |
| 6,430,539 B1 | 8/2002 | Lazarus et al. |
| 6,442,577 B1 | 8/2002 | Britton et al. |
| 6,456,979 B1 | 9/2002 | Flagg |
| 6,457,012 B1 | 9/2002 | Jatkowski |
| 6,460,036 B1 | 10/2002 | Herz |
| 6,505,168 B1 | 1/2003 | Rothman et al. |
| 6,513,018 B1 | 1/2003 | Culhane |
| 6,529,878 B2 | 3/2003 | De Rafael et al. |
| 6,532,450 B1 | 3/2003 | Brown et al. |
| 6,542,894 B1 | 4/2003 | Lee et al. |
| 6,549,944 B1 | 4/2003 | Weinberg et al. |
| 6,567,791 B2 | 5/2003 | Lent et al. |
| 6,597,775 B2 | 7/2003 | Lawyer et al. |
| 6,601,234 B1 | 7/2003 | Bowman-Amuah |
| 6,606,744 B1 | 8/2003 | Mikurak |
| 6,611,816 B2 | 8/2003 | Lebda et al. |
| 6,615,193 B1 | 9/2003 | Kingdon et al. |
| 6,615,247 B1 | 9/2003 | Murphy |
| 6,622,131 B1 | 9/2003 | Brown et al. |
| 6,622,266 B1 | 9/2003 | Goddard et al. |
| 6,623,529 B1 | 9/2003 | Lakritz |
| 6,629,245 B1 | 9/2003 | Stone et al. |
| 6,636,803 B1 | 10/2003 | Hartz, Jr. et al. |
| 6,640,215 B1 | 10/2003 | Galperin et al. |
| 6,654,727 B2 | 11/2003 | Tilton |
| 6,658,393 B1 | 12/2003 | Basch et al. |
| 6,665,715 B1 | 12/2003 | Houri |
| 6,671,818 B1 | 12/2003 | Mikurak |
| 6,687,713 B2 | 2/2004 | Mattson et al. |
| 6,698,020 B1 | 2/2004 | Zigmond et al. |
| 6,703,930 B2 | 3/2004 | Skinner |
| 6,708,166 B1 | 3/2004 | Dysart et al. |
| 6,714,918 B2 | 3/2004 | Hillmer et al. |
| 6,735,572 B2 | 5/2004 | Landesmann |
| 6,748,426 B1 | 6/2004 | Shaffer et al. |
| 6,782,390 B2 | 8/2004 | Lee et al. |
| 6,801,909 B2 | 10/2004 | Delgado et al. |
| 6,804,346 B1 | 10/2004 | Mewhinney |
| 6,805,287 B2 | 10/2004 | Bishop et al. |
| 6,810,356 B1 | 10/2004 | Garcia-Franco et al. |
| 6,823,319 B1 | 11/2004 | Lynch et al. |
| 6,757,740 B1 | 12/2004 | Parekh et al. |
| 6,836,764 B1 | 12/2004 | Hucal |
| 6,839,682 B1 | 1/2005 | Blume et al. |
| 6,839,690 B1 | 1/2005 | Foth et al. |
| 6,850,606 B2 | 2/2005 | Lawyer et al. |
| 6,859,785 B2 | 2/2005 | Case |
| 6,865,566 B2 | 3/2005 | Serrano-Morales et al. |
| 6,873,972 B1 | 3/2005 | Marcial et al. |
| 6,873,979 B2 | 3/2005 | Fishman et al. |
| 6,901,406 B2 | 5/2005 | Nabe et al. |
| 6,910,624 B1 | 6/2005 | Natsuno |
| 6,915,269 B1 | 7/2005 | Shapiro et al. |
| 6,925,441 B1 | 8/2005 | Jones, III et al. |
| 6,950,807 B2 | 9/2005 | Brock |
| 6,959,281 B1 | 10/2005 | Freeling et al. |
| 6,962,336 B2 | 11/2005 | Glass |
| 6,965,889 B2 | 11/2005 | Serrano-Morales et al. |
| 6,970,830 B1 | 11/2005 | Samra et al. |
| 6,983,478 B1 | 1/2006 | Grauch et al. |
| 6,985,887 B1 | 1/2006 | Sunstein et al. |
| 6,988,085 B2 | 1/2006 | Hedy |
| 6,993,493 B1 | 1/2006 | Galperin et al. |
| 7,003,476 B1 | 2/2006 | Samra et al. |
| 7,003,792 B1 | 2/2006 | Yuen |
| 7,016,870 B1 | 3/2006 | Jones et al. |
| 7,028,052 B2 | 4/2006 | Chapman et al. |
| 7,031,945 B1 | 4/2006 | Donner |
| 7,033,792 B2 | 4/2006 | Zhong et al. |
| 7,039,176 B2 | 5/2006 | Borodow et al. |
| 7,039,607 B2 | 5/2006 | Watarai et al. |
| 7,047,251 B2 | 5/2006 | Reed et al. |
| 7,050,986 B1 | 5/2006 | Vance et al. |
| 7,050,989 B1 | 5/2006 | Hurt et al. |
| 7,054,828 B2 | 5/2006 | Heching et al. |
| 7,058,817 B1 | 6/2006 | Ellmore |
| 7,062,458 B2 | 6/2006 | Maggioncalda et al. |
| 7,065,566 B2 | 6/2006 | Menard et al. |
| 7,069,249 B2 | 6/2006 | Stolfo et al. |
| 7,072,853 B2 | 7/2006 | Shkedi |
| 7,072,963 B2 | 7/2006 | Anderson et al. |
| 7,076,462 B1 | 7/2006 | Nelson et al. |
| 7,076,475 B2 | 7/2006 | Honarvar |
| 7,082,435 B1 | 7/2006 | Guzman et al. |
| 7,083,087 B1 | 8/2006 | Gangi |
| 7,085,734 B2 | 8/2006 | Grant et al. |
| 7,120,599 B2 | 10/2006 | Keyes |
| 7,133,935 B2 | 11/2006 | Hedy |
| 7,136,448 B1 | 11/2006 | Venkataperumal et al. |
| 7,143,063 B2 | 11/2006 | Lent |
| 7,150,030 B1 | 12/2006 | Eldering et al. |
| 7,152,018 B2 | 12/2006 | Wicks |
| 7,152,053 B2 | 12/2006 | Serrano-Morales et al. |
| 7,152,237 B2 | 12/2006 | Flickinger et al. |
| 7,165,036 B2 | 1/2007 | Kruk et al. |
| 7,165,037 B2 | 1/2007 | Lazarus et al. |
| 7,185,353 B2 | 2/2007 | Schlack |
| 7,191,144 B2 | 3/2007 | White |
| 7,200,602 B2 | 4/2007 | Jonas |
| 7,212,995 B2 | 5/2007 | Schulkins |
| 7,234,156 B2 | 6/2007 | French et al. |
| 7,240,059 B2 | 7/2007 | Bayliss et al. |
| 7,249,048 B1 | 7/2007 | O'Flaherty |
| 7,249,076 B1 | 7/2007 | Pendleton et al. |
| 7,249,114 B2 | 7/2007 | Burchetta et al. |

(56) References Cited

U.S. PATENT DOCUMENTS

| | | |
|---|---|---|
| 7,254,558 B2 | 8/2007 | Hinkle et al. |
| 7,263,497 B1 | 8/2007 | Wiser et al. |
| 7,263,506 B2 | 8/2007 | Lee et al. |
| 7,275,083 B1 | 9/2007 | Seibel et al. |
| 7,277,875 B2 | 10/2007 | Serrano-Morales et al. |
| 7,280,980 B1 | 10/2007 | Hoadley et al. |
| 7,280,983 B2 | 10/2007 | Kuroda et al. |
| 7,296,734 B2 | 11/2007 | Pliha |
| 7,302,420 B2 | 11/2007 | Aggarwal et al. |
| 7,305,364 B2 | 12/2007 | Nabe et al. |
| 7,308,417 B1 | 12/2007 | Nathan |
| 7,308,418 B2 | 12/2007 | Malek et al. |
| 7,310,617 B1 | 12/2007 | Cunningham |
| 7,313,538 B2 | 12/2007 | Wilmes et al. |
| 7,314,166 B2 | 1/2008 | Anderson et al. |
| 7,314,167 B1 | 1/2008 | Kiliccote |
| 7,318,224 B2 | 1/2008 | Honarvar et al. |
| 7,324,962 B1 | 1/2008 | Valliani et al. |
| 7,328,169 B2 | 2/2008 | Temares et al. |
| 7,333,635 B2 | 2/2008 | Tsantes et al. |
| 7,333,937 B2 | 2/2008 | Baldwin, Jr. et al. |
| 7,337,133 B1 | 2/2008 | Bezos et al. |
| 7,337,468 B2 | 2/2008 | Metzger |
| 7,343,149 B2 | 3/2008 | Benco |
| 7,346,573 B1 | 3/2008 | Cobrinik et al. |
| 7,366,694 B2 | 4/2008 | Lazerson |
| 7,373,324 B1 | 5/2008 | Engin et al. |
| 7,376,603 B1 | 5/2008 | Mayr et al. |
| 7,376,618 B1 | 5/2008 | Anderson et al. |
| 7,379,880 B1 | 5/2008 | Pathria et al. |
| 7,383,215 B1 | 6/2008 | Navarro et al. |
| 7,383,988 B2 | 6/2008 | Slonecker, Jr. |
| 7,386,466 B2 | 6/2008 | McLean et al. |
| 7,392,216 B1 | 6/2008 | Palmgren et al. |
| 7,395,232 B1 | 7/2008 | Pilato |
| 7,403,919 B2 | 7/2008 | Chacko et al. |
| 7,409,362 B2 | 8/2008 | Calabria |
| 7,409,369 B1 | 8/2008 | Homuth et al. |
| 7,418,417 B2 | 8/2008 | Chacko et al. |
| 7,424,439 B1 | 9/2008 | Fayyad et al. |
| 7,428,509 B2 | 9/2008 | Klebanoff |
| 7,428,526 B2 | 9/2008 | Miller et al. |
| 7,433,855 B2 | 10/2008 | Gavan et al. |
| 7,451,095 B1 | 11/2008 | Bradley et al. |
| 7,458,508 B1 | 12/2008 | Shao et al. |
| 7,467,401 B2 | 12/2008 | Cicchitto |
| 7,472,088 B2 | 12/2008 | Taylor et al. |
| 7,479,949 B2 | 1/2009 | Jobs et al. |
| 7,480,631 B1 | 1/2009 | Merced et al. |
| 7,499,868 B2 | 3/2009 | Galperin et al. |
| 7,505,938 B2 | 3/2009 | Lang et al. |
| 7,505,939 B2 | 3/2009 | Lent et al. |
| 7,509,117 B2 | 3/2009 | Yum |
| 7,512,221 B2 | 3/2009 | Toms |
| 7,516,149 B2 | 4/2009 | Motwani et al. |
| 7,529,698 B2 | 5/2009 | Joao |
| 7,542,993 B2 | 6/2009 | Satterfield et al. |
| 7,546,266 B2 | 6/2009 | Beirne et al. |
| 7,546,619 B2 | 6/2009 | Anderson et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,556,192 B2 | 7/2009 | Wokaty, Jr. |
| 7,559,217 B2 | 7/2009 | Bass |
| 7,562,184 B2 | 7/2009 | Henmi et al. |
| 7,571,139 B1 | 8/2009 | Giordano et al. |
| 7,575,157 B2 | 8/2009 | Barnhardt et al. |
| 7,580,856 B1 | 8/2009 | Pliha |
| 7,581,112 B2 | 8/2009 | Brown et al. |
| 7,584,146 B1 | 9/2009 | Duhon |
| 7,590,589 B2 | 9/2009 | Hoffberg |
| 7,593,891 B2 | 9/2009 | Kornegay et al. |
| 7,593,892 B2 | 9/2009 | Balk et al. |
| 7,596,512 B1 | 9/2009 | Raines et al. |
| 7,596,716 B2 | 9/2009 | Frost et al. |
| 7,603,317 B2 | 10/2009 | Adler et al. |
| 7,606,778 B2 | 10/2009 | Dewar |
| 7,610,216 B1 | 10/2009 | May et al. |
| 7,610,229 B1 | 10/2009 | Kornegay |
| 7,610,243 B2 | 10/2009 | Haggerty et al. |
| 7,610,257 B1 | 10/2009 | Abrahams |
| 7,620,592 B2 | 11/2009 | O'Mara et al. |
| 7,620,596 B2 | 11/2009 | Knudson et al. |
| 7,623,844 B2 | 11/2009 | Herrmann et al. |
| 7,624,068 B1 | 11/2009 | Heasley et al. |
| 7,630,932 B2 | 12/2009 | Danaher et al. |
| 7,653,592 B1 | 1/2010 | Flaxman et al. |
| 7,653,593 B2 | 1/2010 | Zarikian et al. |
| 7,657,471 B1 | 2/2010 | Sankaran et al. |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,676,418 B1 | 3/2010 | Chung et al. |
| 7,676,751 B2 | 3/2010 | Allen et al. |
| 7,686,214 B1 | 3/2010 | Shao et al. |
| 7,689,451 B2 | 3/2010 | Vives |
| 7,689,494 B2 | 3/2010 | Torre et al. |
| 7,689,504 B2 | 3/2010 | Warren et al. |
| 7,689,505 B2 | 3/2010 | Kasower |
| 7,690,032 B1 | 3/2010 | Peirce |
| 7,698,236 B2 | 4/2010 | Cox et al. |
| 7,702,550 B2 | 4/2010 | Perg et al. |
| 7,707,059 B2 | 4/2010 | Reed et al. |
| 7,707,102 B2 | 4/2010 | Rothstein |
| 7,708,190 B2 | 5/2010 | Brandt et al. |
| 7,711,635 B2 | 5/2010 | Steele et al. |
| 7,711,636 B2 | 5/2010 | Robida et al. |
| 7,720,750 B2 | 5/2010 | Brody |
| 7,725,300 B2 | 5/2010 | Pinto et al. |
| 7,729,983 B1 | 6/2010 | Ellis |
| 7,730,509 B2 | 6/2010 | Boulet et al. |
| 7,734,522 B2 | 6/2010 | Johnson et al. |
| 7,734,523 B1 | 6/2010 | Cui et al. |
| 7,734,539 B2 | 6/2010 | Ghosh et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,761,384 B2 | 7/2010 | Madhogarhia |
| 7,769,657 B2 | 8/2010 | Chacko et al. |
| 7,774,257 B2 | 8/2010 | Maggioncalda et al. |
| 7,774,270 B1 | 8/2010 | MacCloskey |
| 7,778,885 B1 | 8/2010 | Semprevivo et al. |
| 7,783,515 B1 | 8/2010 | Kumar et al. |
| 7,783,562 B1 | 8/2010 | Ellis |
| 7,788,147 B2 | 8/2010 | Haggerty et al. |
| 7,788,152 B2 | 8/2010 | Haggerty et al. |
| 7,788,155 B2 | 8/2010 | Jones et al. |
| 7,792,715 B1 | 9/2010 | Kasower |
| 7,792,732 B2 | 9/2010 | Haggerty et al. |
| 7,793,835 B1 | 9/2010 | Coggeshall et al. |
| 7,801,811 B1 | 9/2010 | Merrell et al. |
| 7,801,812 B2 | 9/2010 | Conlin et al. |
| 7,802,104 B2 | 9/2010 | Dickinson |
| 7,805,345 B2 | 9/2010 | Abrahams et al. |
| 7,805,362 B1 | 9/2010 | Merrell et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,822,665 B2 | 10/2010 | Haggerty et al. |
| 7,827,115 B2 | 11/2010 | Weller et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,844,534 B2 | 11/2010 | Haggerty et al. |
| 7,848,987 B2 | 12/2010 | Haig |
| 7,849,004 B2 | 12/2010 | Choudhuri et al. |
| 7,853,518 B2 | 12/2010 | Cagan |
| 7,853,998 B2 | 12/2010 | Blaisdell et al. |
| 7,856,397 B2 | 12/2010 | Whipple et al. |
| 7,856,494 B2 | 12/2010 | Kulkarni |
| 7,860,782 B2 | 12/2010 | Cash et al. |

(56) References Cited

U.S. PATENT DOCUMENTS

| | | | |
|---|---|---|---|
| 7,870,078 B2 | 1/2011 | Clark et al. |
| 7,877,304 B1 | 1/2011 | Coulter |
| 7,890,420 B2 | 2/2011 | Haggerty et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,912,770 B2 | 3/2011 | Haggerty et al. |
| 7,912,865 B2 | 3/2011 | Akerman et al. |
| 7,925,549 B2 | 4/2011 | Looney et al. |
| 7,925,578 B1 | 4/2011 | Hong et al. |
| 7,925,582 B1 | 4/2011 | Kornegay et al. |
| 7,930,252 B2 | 4/2011 | Bender et al. |
| 7,941,363 B2 | 5/2011 | Tanaka et al. |
| 7,941,365 B1 | 5/2011 | Bradley et al. |
| 7,945,510 B1 | 5/2011 | Bradley et al. |
| 7,962,404 B1 | 6/2011 | Metzger, II et al. |
| 7,962,501 B1 | 6/2011 | Semprevivo et al. |
| 7,966,255 B2 | 6/2011 | Wong et al. |
| 7,970,676 B2 | 6/2011 | Feinstein |
| 7,970,679 B2 | 6/2011 | Kasower |
| 7,970,698 B2 * | 6/2011 | Gupta et al. .................. 705/38 |
| 7,974,919 B2 | 7/2011 | Conlin et al. |
| 7,983,975 B2 | 7/2011 | Jones et al. |
| 7,983,976 B2 | 7/2011 | Nafeh et al. |
| 7,987,124 B1 | 7/2011 | Holden et al. |
| 7,991,666 B2 | 8/2011 | Haggerty et al. |
| 7,991,677 B2 | 8/2011 | Haggerty et al. |
| 7,991,689 B1 | 8/2011 | Brunzell et al. |
| 7,996,521 B2 | 8/2011 | Chamberlain et al. |
| 8,001,034 B2 | 8/2011 | Chung et al. |
| 8,001,041 B2 | 8/2011 | Hoadley et al. |
| 8,005,712 B2 | 8/2011 | von Davier et al. |
| 8,005,738 B2 | 8/2011 | Chacko et al. |
| 8,005,759 B2 | 8/2011 | Hirtenstein et al. |
| 8,005,795 B2 | 8/2011 | Galipeau et al. |
| 8,015,045 B2 | 9/2011 | Galperin et al. |
| 8,015,107 B2 | 9/2011 | Kornegay et al. |
| 8,024,245 B2 | 9/2011 | Haggerty et al. |
| 8,024,263 B2 | 9/2011 | Zarikian et al. |
| 8,024,264 B2 | 9/2011 | Chaudhuri et al. |
| 8,027,871 B2 | 9/2011 | Williams et al. |
| 8,032,932 B2 | 10/2011 | Speyer et al. |
| 8,036,979 B1 | 10/2011 | Torrez et al. |
| 8,055,579 B2 | 11/2011 | Davies et al. |
| 8,060,424 B2 | 11/2011 | Kasower |
| 8,065,234 B2 | 11/2011 | Liao et al. |
| 8,073,752 B2 | 12/2011 | Haggerty et al. |
| 8,073,768 B2 | 12/2011 | Haggerty et al. |
| 8,078,453 B2 | 12/2011 | Shaw |
| 8,078,524 B2 | 12/2011 | Crawford et al. |
| 8,078,527 B2 | 12/2011 | Cerise et al. |
| 8,082,202 B2 | 12/2011 | Weiss |
| 8,086,509 B2 | 12/2011 | Haggerty et al. |
| 8,086,523 B1 | 12/2011 | Palmer |
| 8,086,524 B1 | 12/2011 | Craig et al. |
| 8,095,458 B2 | 1/2012 | Peterson et al. |
| 8,099,356 B2 | 1/2012 | Feinstein et al. |
| 8,103,530 B2 | 1/2012 | Quiring et al. |
| 8,126,805 B2 | 2/2012 | Sulkowski et al. |
| 8,127,982 B1 | 3/2012 | Casey et al. |
| 8,131,614 B2 | 3/2012 | Haggerty et al. |
| 8,131,639 B2 | 3/2012 | Haggerty et al. |
| 8,135,607 B2 | 3/2012 | Williams et al. |
| 8,145,754 B2 | 3/2012 | Chamberlain et al. |
| 8,160,960 B1 | 4/2012 | Fei et al. |
| 8,161,104 B2 | 4/2012 | Tomkow |
| 8,165,940 B2 | 4/2012 | Meimes et al. |
| 8,175,945 B2 | 5/2012 | Haggerty et al. |
| 8,195,549 B2 | 6/2012 | Kasower |
| 8,204,774 B2 | 6/2012 | Chwast et al. |
| 8,204,812 B2 | 6/2012 | Stewart et al. |
| 8,209,250 B2 | 6/2012 | Bradway et al. |
| 8,214,238 B1 | 7/2012 | Fairfield et al. |
| 8,214,262 B1 | 7/2012 | Semprevivo et al. |
| 8,225,395 B2 | 7/2012 | Atwood et al. |
| 8,234,498 B2 | 7/2012 | Britti et al. |
| 8,271,313 B2 | 9/2012 | Williams et al. |
| 8,271,378 B2 | 9/2012 | Chaudhuri et al. |
| 8,280,805 B1 | 10/2012 | Abrahams et al. |
| 8,285,577 B1 | 10/2012 | Galperin et al. |
| 8,285,613 B1 | 10/2012 | Coulter |
| 8,285,656 B1 | 10/2012 | Chang et al. |
| 8,290,840 B2 | 10/2012 | Kasower |
| 8,296,229 B1 | 10/2012 | Yellin et al. |
| 8,301,574 B2 | 10/2012 | Kilger et al. |
| 8,311,936 B2 | 11/2012 | Haggerty et al. |
| 8,315,942 B2 | 11/2012 | Haggerty et al. |
| 8,315,943 B2 | 11/2012 | Torrez et al. |
| 8,321,334 B1 | 11/2012 | Kornegay et al. |
| 8,321,339 B2 | 11/2012 | Imrey et al. |
| 8,326,671 B2 | 12/2012 | Haggerty et al. |
| 8,326,672 B2 | 12/2012 | Haggerty et al. |
| 8,327,429 B2 | 12/2012 | Speyer et al. |
| 8,335,741 B2 | 12/2012 | Kornegay et al. |
| 8,386,377 B1 | 2/2013 | Xiong et al. |
| 8,392,334 B2 | 3/2013 | Hirtenstein et al. |
| 8,412,593 B1 | 4/2013 | Song et al. |
| 8,458,074 B2 | 6/2013 | Showalter |
| 8,463,595 B1 | 6/2013 | Rehling et al. |
| 8,468,198 B2 | 6/2013 | Tomkow |
| 8,473,353 B2 | 6/2013 | Matsuda et al. |
| 8,489,502 B2 | 7/2013 | Morris et al. |
| 8,515,828 B1 | 8/2013 | Wolf et al. |
| 8,515,844 B2 | 8/2013 | Kasower |
| 8,515,862 B2 | 8/2013 | Zhang et al. |
| 8,527,596 B2 | 9/2013 | Long et al. |
| 8,533,118 B2 | 9/2013 | Weller et al. |
| 8,533,322 B2 | 9/2013 | Chamberlain et al. |
| 8,560,161 B1 | 10/2013 | Kator et al. |
| 8,560,434 B2 | 10/2013 | Morris et al. |
| 8,560,436 B2 | 10/2013 | Ingram et al. |
| 8,560,666 B2 | 10/2013 | Low |
| 8,566,167 B2 | 10/2013 | Munjal |
| 8,571,971 B1 | 10/2013 | Brown et al. |
| 8,572,083 B1 | 10/2013 | Snell et al. |
| 8,589,286 B1 | 11/2013 | Kornegay et al. |
| 8,595,101 B1 | 11/2013 | Daukas et al. |
| 8,600,886 B2 | 12/2013 | Ramavarjula et al. |
| 8,606,626 B1 | 12/2013 | DeSoto et al. |
| 8,606,666 B1 | 12/2013 | Courbage et al. |
| 8,606,694 B2 | 12/2013 | Campbell et al. |
| 8,626,563 B2 | 1/2014 | Williams et al. |
| 8,626,646 B2 | 1/2014 | Torrez et al. |
| 8,639,920 B2 | 1/2014 | Stack et al. |
| 8,660,919 B2 | 2/2014 | Kasower |
| 8,694,420 B1 | 4/2014 | Oliai |
| 8,725,613 B1 | 5/2014 | Celka et al. |
| 8,732,004 B1 * | 5/2014 | Ramos et al. ............... 705/14.1 |
| 8,738,515 B2 | 5/2014 | Chaudhuri et al. |
| 8,738,516 B1 | 5/2014 | Dean et al. |
| 8,744,956 B1 | 6/2014 | DiChiara et al. |
| 8,762,243 B2 | 6/2014 | Jenkins et al. |
| 8,775,299 B2 | 7/2014 | Achanta et al. |
| 8,781,951 B2 | 7/2014 | Lewis et al. |
| 8,781,953 B2 | 7/2014 | Kasower |
| 8,856,894 B1 | 10/2014 | Dean et al. |
| 8,930,263 B1 | 1/2015 | Mahacek et al. |
| 8,966,649 B2 | 2/2015 | Stack et al. |
| 9,053,589 B1 | 6/2015 | Kator et al. |
| 9,053,590 B1 | 6/2015 | Kator et al. |
| 9,058,627 B1 | 6/2015 | Wasser et al. |
| 9,076,276 B1 | 7/2015 | Kator et al. |
| 9,116,918 B1 | 8/2015 | Kim |
| 9,213,461 B2 | 12/2015 | Eraker et al. |
| 9,256,904 B1 | 2/2016 | Haller et al. |
| 9,558,519 B1 | 1/2017 | Burger |
| 9,569,797 B1 | 2/2017 | Rohn et al. |
| 9,607,336 B1 | 3/2017 | Dean et al. |
| 9,690,820 B1 | 6/2017 | Girulat, Jr. |
| 2001/0011247 A1 | 8/2001 | O'Flaherty et al. |
| 2001/0013011 A1 | 8/2001 | Day et al. |
| 2001/0014868 A1 | 8/2001 | Herz et al. |
| 2001/0016833 A1 | 8/2001 | Everling et al. |

(56) References Cited

U.S. PATENT DOCUMENTS

| | | |
|---|---|---|
| 2001/0027413 A1 | 10/2001 | Bhutta |
| 2001/0039523 A1 | 11/2001 | Iwamoto |
| 2001/0042785 A1 | 11/2001 | Walker et al. |
| 2001/0044766 A1 | 11/2001 | Keyes |
| 2001/0049672 A1 | 12/2001 | Moore et al. |
| 2002/0019804 A1 | 2/2002 | Sutton |
| 2002/0023051 A1 | 2/2002 | Kunzle et al. |
| 2002/0029162 A1 | 3/2002 | Mascarenhas |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0035520 A1 | 3/2002 | Weiss |
| 2002/0046096 A1 | 4/2002 | Srinivasan et al. |
| 2002/0046099 A1 | 4/2002 | Frengut et al. |
| 2002/0049624 A1 | 4/2002 | Raveis, Jr. |
| 2002/0049626 A1 | 4/2002 | Mathis et al. |
| 2002/0049701 A1 | 4/2002 | Nabe et al. |
| 2002/0049738 A1 | 4/2002 | Epstein |
| 2002/0049968 A1 | 4/2002 | Wilson et al. |
| 2002/0052836 A1 | 5/2002 | Galperin et al. |
| 2002/0055869 A1 | 5/2002 | Hegg |
| 2002/0055906 A1 | 5/2002 | Katz et al. |
| 2002/0069122 A1 | 6/2002 | Yun et al. |
| 2002/0069203 A1 | 6/2002 | Dar et al. |
| 2002/0077964 A1 | 6/2002 | Brody et al. |
| 2002/0082892 A1 | 6/2002 | Raffel et al. |
| 2002/0087460 A1 | 7/2002 | Hornung |
| 2002/0091650 A1 | 7/2002 | Ellis |
| 2002/0095360 A1 | 7/2002 | Joao |
| 2002/0099641 A1 | 7/2002 | Mills et al. |
| 2002/0099649 A1 | 7/2002 | Lee et al. |
| 2002/0099824 A1 | 7/2002 | Bender et al. |
| 2002/0099936 A1 | 7/2002 | Kou et al. |
| 2002/0107765 A1 | 8/2002 | Walker |
| 2002/0111845 A1 | 8/2002 | Chong |
| 2002/0111890 A1 | 8/2002 | Sloan et al. |
| 2002/0120504 A1 | 8/2002 | Gould et al. |
| 2002/0123904 A1 | 9/2002 | Amengual et al. |
| 2002/0123928 A1 | 9/2002 | Eldering et al. |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133404 A1 | 9/2002 | Pedersen |
| 2002/0133444 A1 | 9/2002 | Sankaran et al. |
| 2002/0133462 A1 | 9/2002 | Shteyn |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0138417 A1 | 9/2002 | Lawrence |
| 2002/0143661 A1 | 10/2002 | Tumulty et al. |
| 2002/0147623 A1 | 10/2002 | Rifaat |
| 2002/0147669 A1 | 10/2002 | Taylor et al. |
| 2002/0147695 A1 | 10/2002 | Khedkar et al. |
| 2002/0161664 A1 | 10/2002 | Shaya et al. |
| 2002/0161711 A1 | 10/2002 | Sartor et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0188544 A1 | 12/2002 | Wizon et al. |
| 2002/0194099 A1 | 12/2002 | Weiss |
| 2002/0194117 A1 | 12/2002 | Nabe et al. |
| 2002/0194140 A1 | 12/2002 | Makuck |
| 2002/0198736 A1 | 12/2002 | Harrison |
| 2002/0198806 A1 | 12/2002 | Blagg et al. |
| 2002/0198824 A1 | 12/2002 | Cook |
| 2003/0000568 A1 | 1/2003 | Gonsiorawski |
| 2003/0002639 A1 | 1/2003 | Huie |
| 2003/0004787 A1 | 1/2003 | Tripp et al. |
| 2003/0004855 A1 | 1/2003 | Dutta et al. |
| 2003/0004865 A1 | 1/2003 | Kinoshita |
| 2003/0009368 A1 | 1/2003 | Kitts |
| 2003/0009393 A1 | 1/2003 | Norris et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0023489 A1 | 1/2003 | McGuire et al. |
| 2003/0028477 A1 | 2/2003 | Stevenson et al. |
| 2003/0033242 A1 | 2/2003 | Lynch et al. |
| 2003/0033261 A1 | 2/2003 | Knegendorf |
| 2003/0036996 A1 | 2/2003 | Lazerson |
| 2003/0041031 A1 | 2/2003 | Hedy |
| 2003/0041050 A1 | 2/2003 | Smith et al. |
| 2003/0046222 A1 | 3/2003 | Bard et al. |
| 2003/0060284 A1 | 3/2003 | Hamalainen et al. |
| 2003/0061132 A1 | 3/2003 | Yu et al. |
| 2003/0061163 A1 | 3/2003 | Durfield |
| 2003/0064705 A1 | 4/2003 | Desierio |
| 2003/0065563 A1 | 4/2003 | Elliott et al. |
| 2003/0078877 A1 | 4/2003 | Beirne et al. |
| 2003/0078897 A1 | 4/2003 | Florance et al. |
| 2003/0093366 A1 | 5/2003 | Halper et al. |
| 2003/0097320 A1 | 5/2003 | Gordon |
| 2003/0097380 A1 | 5/2003 | Mulhern et al. |
| 2003/0101111 A1 | 5/2003 | Dang et al. |
| 2003/0105696 A1 | 6/2003 | Kalotay et al. |
| 2003/0110111 A1 | 6/2003 | Nalebuff et al. |
| 2003/0113727 A1 | 6/2003 | Girn et al. |
| 2003/0115080 A1 | 6/2003 | Kasravi et al. |
| 2003/0115122 A1 | 6/2003 | Slater et al. |
| 2003/0115133 A1 | 6/2003 | Bian |
| 2003/0139986 A1 | 7/2003 | Roberts |
| 2003/0149610 A1 | 8/2003 | Rowan et al. |
| 2003/0149659 A1 | 8/2003 | Danaher et al. |
| 2003/0154162 A1 | 8/2003 | Danaher et al. |
| 2003/0158751 A1 | 8/2003 | Suresh et al. |
| 2003/0158776 A1 | 8/2003 | Landesmann |
| 2003/0158960 A1 | 8/2003 | Engberg |
| 2003/0163435 A1 | 8/2003 | Payone |
| 2003/0164497 A1 | 9/2003 | Carcia et al. |
| 2003/0167218 A1 | 9/2003 | Field et al. |
| 2003/0172039 A1 | 9/2003 | Guy |
| 2003/0182214 A1 | 9/2003 | Taylor |
| 2003/0187780 A1 | 10/2003 | Arthus et al. |
| 2003/0195830 A1 | 10/2003 | Merkoulovitch et al. |
| 2003/0195859 A1 | 10/2003 | Lawrence |
| 2003/0200135 A1 | 10/2003 | Wright |
| 2003/0204752 A1 | 10/2003 | Garrison |
| 2003/0205845 A1 | 11/2003 | Pichler et al. |
| 2003/0208428 A1 | 11/2003 | Raynes et al. |
| 2003/0212618 A1 | 11/2003 | Keyes et al. |
| 2003/0216965 A1 | 11/2003 | Libman |
| 2003/0225656 A1 | 12/2003 | Aberman et al. |
| 2003/0225692 A1 | 12/2003 | Bosch et al. |
| 2003/0229507 A1 | 12/2003 | Perge |
| 2003/0229580 A1 | 12/2003 | Gass et al. |
| 2003/0229892 A1 | 12/2003 | Sardera |
| 2003/0233278 A1 | 12/2003 | Marshall |
| 2003/0233323 A1 | 12/2003 | Bilski et al. |
| 2003/0233655 A1 | 12/2003 | Gutta et al. |
| 2003/0236738 A1 | 12/2003 | Lange et al. |
| 2004/0002916 A1 | 1/2004 | Timmerman et al. |
| 2004/0006536 A1 | 1/2004 | Kawashima et al. |
| 2004/0010443 A1 | 1/2004 | May et al. |
| 2004/0019518 A1 | 1/2004 | Abraham et al. |
| 2004/0023637 A1 | 2/2004 | Johnson et al. |
| 2004/0024692 A1 | 2/2004 | Turbeville et al. |
| 2004/0024848 A1 | 2/2004 | Smith |
| 2004/0029311 A1 | 2/2004 | Snyder et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0030667 A1 | 2/2004 | Xu et al. |
| 2004/0033375 A1 | 2/2004 | Mori |
| 2004/0034570 A1 | 2/2004 | Davis et al. |
| 2004/0039681 A1 | 2/2004 | Cullen et al. |
| 2004/0039688 A1 | 2/2004 | Sulkowski et al. |
| 2004/0044615 A1 | 3/2004 | Xue et al. |
| 2004/0044617 A1 | 3/2004 | Lu |
| 2004/0046497 A1 | 3/2004 | Shaepkens et al. |
| 2004/0049452 A1 | 3/2004 | Blagg |
| 2004/0049729 A1 | 3/2004 | Penfield |
| 2004/0054619 A1 | 3/2004 | Watson et al. |

(56) References Cited

U.S. PATENT DOCUMENTS

| | | |
|---|---|---|
| 2004/0059626 A1 | 3/2004 | Smallwood |
| 2004/0059653 A1 | 3/2004 | Verkuylen et al. |
| 2004/0062213 A1 | 4/2004 | Koss |
| 2004/0078248 A1 | 4/2004 | Altschuler |
| 2004/0078809 A1 | 4/2004 | Drazin |
| 2004/0083215 A1 | 4/2004 | de Jong |
| 2004/0088221 A1 | 5/2004 | Katz et al. |
| 2004/0093278 A1 | 5/2004 | Burchetta et al. |
| 2004/0098625 A1 | 5/2004 | Lagadec et al. |
| 2004/0102197 A1 | 5/2004 | Dietz |
| 2004/0103147 A1 | 5/2004 | Flesher et al. |
| 2004/0107123 A1 | 6/2004 | Haffner et al. |
| 2004/0107125 A1 | 6/2004 | Guheen et al. |
| 2004/0111292 A1 | 6/2004 | Hutchins |
| 2004/0111305 A1 | 6/2004 | Gavan et al. |
| 2004/0111358 A1 | 6/2004 | Lange et al. |
| 2004/0111359 A1 | 6/2004 | Hudock |
| 2004/0111363 A1 | 6/2004 | Trench et al. |
| 2004/0117235 A1 | 6/2004 | Shacham |
| 2004/0117302 A1 | 6/2004 | Weichert et al. |
| 2004/0122730 A1 | 6/2004 | Tucciarone et al. |
| 2004/0122735 A1 | 6/2004 | Meshkin |
| 2004/0128193 A1 | 7/2004 | Brice et al. |
| 2004/0128230 A1 | 7/2004 | Oppenheimer et al. |
| 2004/0128232 A1 | 7/2004 | Descloux |
| 2004/0128236 A1 | 7/2004 | Brown et al. |
| 2004/0133493 A1 | 7/2004 | Ford et al. |
| 2004/0138932 A1 | 7/2004 | Johnson et al. |
| 2004/0138995 A1 | 7/2004 | Hershkowitz et al. |
| 2004/0139025 A1 | 7/2004 | Coleman |
| 2004/0139035 A1 | 7/2004 | Wang |
| 2004/0143526 A1 | 7/2004 | Monasterio et al. |
| 2004/0143546 A1 | 7/2004 | Wood et al. |
| 2004/0153330 A1 | 8/2004 | Miller et al. |
| 2004/0153437 A1 | 8/2004 | Buchan |
| 2004/0153509 A1 | 8/2004 | Alcorn et al. |
| 2004/0158520 A1 | 8/2004 | Noh |
| 2004/0158521 A1 | 8/2004 | Newton |
| 2004/0158723 A1 | 8/2004 | Root |
| 2004/0159700 A1 | 8/2004 | Khan et al. |
| 2004/0163101 A1 | 8/2004 | Swix |
| 2004/0167793 A1 | 8/2004 | Masuoka et al. |
| 2004/0176995 A1 | 9/2004 | Fusz |
| 2004/0177046 A1 | 9/2004 | Ogram |
| 2004/0186807 A1 | 9/2004 | Nathans et al. |
| 2004/0193535 A1 | 9/2004 | Barazesh |
| 2004/0199456 A1 | 10/2004 | Flint et al. |
| 2004/0199458 A1 | 10/2004 | Ho |
| 2004/0199462 A1 | 10/2004 | Starrs |
| 2004/0199584 A1 | 10/2004 | Kirshenbaum et al. |
| 2004/0199789 A1 | 10/2004 | Shaw et al. |
| 2004/0205157 A1 | 10/2004 | Bibelnieks et al. |
| 2004/0212299 A1 | 10/2004 | Ishikawa et al. |
| 2004/0215584 A1 | 10/2004 | Yao |
| 2004/0225586 A1 | 11/2004 | Woods et al. |
| 2004/0225594 A1 | 11/2004 | Nolan, III et al. |
| 2004/0230448 A1 | 11/2004 | Schaich |
| 2004/0230459 A1 | 11/2004 | Dordick et al. |
| 2004/0230527 A1 | 11/2004 | Hansen et al. |
| 2004/0243450 A1 | 12/2004 | Bernard, Jr. et al. |
| 2004/0243506 A1 | 12/2004 | Das |
| 2004/0243518 A1 | 12/2004 | Clifton et al. |
| 2004/0243588 A1 | 12/2004 | Tanner et al. |
| 2004/0249532 A1 | 12/2004 | Kelly et al. |
| 2004/0255127 A1 | 12/2004 | Arnouse |
| 2004/0261116 A1 | 12/2004 | Mckeown et al. |
| 2005/0004855 A1 | 1/2005 | Jenson et al. |
| 2005/0010513 A1 | 1/2005 | Duckworth et al. |
| 2005/0015330 A1 | 1/2005 | Beery et al. |
| 2005/0021397 A1 | 1/2005 | Cui et al. |
| 2005/0021476 A1 | 1/2005 | Candella et al. |
| 2005/0027633 A1 | 2/2005 | Fortuna et al. |
| 2005/0027983 A1 | 2/2005 | Klawon |
| 2005/0033734 A1 | 2/2005 | Chess et al. |
| 2005/0038726 A1 | 2/2005 | Salomon et al. |
| 2005/0050027 A1 | 3/2005 | Yeh et al. |
| 2005/0055275 A1 | 3/2005 | Newman et al. |
| 2005/0058262 A1 | 3/2005 | Timmins et al. |
| 2005/0065809 A1 | 3/2005 | Henze |
| 2005/0065874 A1 | 3/2005 | Lefner et al. |
| 2005/0080697 A1 | 4/2005 | Foss et al. |
| 2005/0080821 A1 | 4/2005 | Breil et al. |
| 2005/0086126 A1 | 4/2005 | Patterson |
| 2005/0086176 A1* | 4/2005 | Dahlgren ............... G06Q 40/02 705/64 |
| 2005/0086579 A1 | 4/2005 | Leitner et al. |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102206 A1 | 5/2005 | Savasoglu et al. |
| 2005/0102226 A1 | 5/2005 | Oppenheimer et al. |
| 2005/0105719 A1 | 5/2005 | Huda |
| 2005/0125291 A1 | 6/2005 | Demkiw Grayson et al. |
| 2005/0125350 A1 | 6/2005 | Tidwell et al. |
| 2005/0130704 A1 | 6/2005 | McParland et al. |
| 2005/0137963 A1 | 6/2005 | Ricketts et al. |
| 2005/0144067 A1 | 6/2005 | Farahat et al. |
| 2005/0154617 A1 | 6/2005 | Ruggieri et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0159996 A1 | 7/2005 | Lazaraus et al. |
| 2005/0192008 A1 | 9/2005 | Desai et al. |
| 2005/0197953 A1 | 9/2005 | Broadbent et al. |
| 2005/0197954 A1 | 9/2005 | Maitland et al. |
| 2005/0201272 A1 | 9/2005 | Wang et al. |
| 2005/0203768 A1 | 9/2005 | Florance |
| 2005/0204381 A1 | 9/2005 | Ludvig et al. |
| 2005/0209922 A1 | 9/2005 | Hofmeister |
| 2005/0222900 A1 | 10/2005 | Fuloria et al. |
| 2005/0222906 A1 | 10/2005 | Chen |
| 2005/0251820 A1 | 11/2005 | Stefanik et al. |
| 2005/0256809 A1 | 11/2005 | Sadri |
| 2005/0257250 A1 | 11/2005 | Mitchell et al. |
| 2005/0262014 A1 | 11/2005 | Fickes |
| 2005/0267840 A1 | 12/2005 | Holm-Blagg et al. |
| 2005/0273431 A1 | 12/2005 | Abel et al. |
| 2005/0273442 A1 | 12/2005 | Bennett et al. |
| 2005/0273849 A1 | 12/2005 | Araujo et al. |
| 2005/0278542 A1 | 12/2005 | Pierson et al. |
| 2005/0278743 A1 | 12/2005 | Flickinger et al. |
| 2005/0288954 A1 | 12/2005 | McCarthy et al. |
| 2005/0288998 A1 | 12/2005 | Verma et al. |
| 2006/0004626 A1 | 1/2006 | Holmen et al. |
| 2006/0004731 A1 | 1/2006 | Seibel et al. |
| 2006/0010055 A1 | 1/2006 | Morita et al. |
| 2006/0014129 A1 | 1/2006 | Coleman et al. |
| 2006/0020611 A1 | 1/2006 | Gilbert et al. |
| 2006/0031158 A1* | 2/2006 | Orman .................. G06Q 30/02 705/38 |
| 2006/0031747 A1 | 2/2006 | Wada et al. |
| 2006/0032909 A1 | 2/2006 | Seegar |
| 2006/0041443 A1 | 2/2006 | Horvath |
| 2006/0041464 A1 | 2/2006 | Powers et al. |
| 2006/0059073 A1 | 3/2006 | Walzak |
| 2006/0059110 A1 | 3/2006 | Madhok et al. |
| 2006/0074986 A1 | 4/2006 | Mallalieu et al. |
| 2006/0080126 A1 | 4/2006 | Greer et al. |
| 2006/0080230 A1 | 4/2006 | Freiberg |
| 2006/0080233 A1 | 4/2006 | Mendelovich et al. |
| 2006/0080251 A1 | 4/2006 | Fried et al. |
| 2006/0080263 A1 | 4/2006 | Willis et al. |
| 2006/0089842 A1 | 4/2006 | Medawar |
| 2006/0095363 A1 | 5/2006 | May |
| 2006/0095923 A1 | 5/2006 | Novack et al. |
| 2006/0100954 A1 | 5/2006 | Schoen |
| 2006/0122921 A1 | 6/2006 | Comerford et al. |
| 2006/0123461 A1 | 6/2006 | Lunt et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0136330 A1 | 6/2006 | DeRoy et al. |
| 2006/0149674 A1 | 7/2006 | Cook et al. |

(56) References Cited

U.S. PATENT DOCUMENTS

| | | |
|---|---|---|
| 2006/0155624 A1 | 7/2006 | Schwartz |
| 2006/0155639 A1 | 7/2006 | Lynch et al. |
| 2006/0161435 A1 | 7/2006 | Atef et al. |
| 2006/0163347 A1 | 7/2006 | Foss et al. |
| 2006/0173726 A1 | 8/2006 | Hall et al. |
| 2006/0173772 A1 | 8/2006 | Hayes et al. |
| 2006/0173776 A1 | 8/2006 | Shalley et al. |
| 2006/0178957 A1 | 8/2006 | LeClaire |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0195351 A1 | 8/2006 | Bayburtian |
| 2006/0195390 A1 | 8/2006 | Rusk et al. |
| 2006/0195866 A1 | 8/2006 | Thukral |
| 2006/0204051 A1 | 9/2006 | Holland, IV |
| 2006/0206379 A1 | 9/2006 | Rosenberg |
| 2006/0212350 A1 | 9/2006 | Ellis et al. |
| 2006/0212353 A1 | 9/2006 | Roslov et al. |
| 2006/0212386 A1 | 9/2006 | Willey et al. |
| 2006/0218069 A1 | 9/2006 | Aberman et al. |
| 2006/0224696 A1 | 10/2006 | King et al. |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0229996 A1 | 10/2006 | Keithley et al. |
| 2006/0230415 A1 | 10/2006 | Roeding |
| 2006/0233332 A1 | 10/2006 | Toms |
| 2006/0239512 A1 | 10/2006 | Petrillo |
| 2006/0241923 A1 | 10/2006 | Xu et al. |
| 2006/0242039 A1 | 10/2006 | Haggerty et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242050 A1 | 10/2006 | Haggerty et al. |
| 2006/0253323 A1 | 11/2006 | Phan et al. |
| 2006/0253328 A1 | 11/2006 | Kohli et al. |
| 2006/0253358 A1 | 11/2006 | Delgrosso et al. |
| 2006/0259364 A1 | 11/2006 | Strock et al. |
| 2006/0262929 A1 | 11/2006 | Vatanen et al. |
| 2006/0265243 A1 | 11/2006 | Racho et al. |
| 2006/0265323 A1 | 11/2006 | Winter et al. |
| 2006/0267999 A1 | 11/2006 | Cash et al. |
| 2006/0271456 A1 | 11/2006 | Romain et al. |
| 2006/0271457 A1 | 11/2006 | Romain et al. |
| 2006/0271552 A1 | 11/2006 | McChesney et al. |
| 2006/0271633 A1 | 11/2006 | Adler |
| 2006/0276171 A1 | 12/2006 | Pousti |
| 2006/0277141 A1 | 12/2006 | Palmer |
| 2006/0282328 A1 | 12/2006 | Gerace et al. |
| 2006/0282359 A1 | 12/2006 | Nobili et al. |
| 2006/0282856 A1 | 12/2006 | Errico et al. |
| 2006/0287764 A1 | 12/2006 | Kraft |
| 2006/0287766 A1 | 12/2006 | Kraft |
| 2006/0287767 A1 | 12/2006 | Kraft |
| 2006/0287915 A1 | 12/2006 | Boulet et al. |
| 2006/0287919 A1 | 12/2006 | Rubens et al. |
| 2006/0288090 A1 | 12/2006 | Kraft |
| 2006/0293921 A1 | 12/2006 | McCarthy et al. |
| 2006/0293932 A1 | 12/2006 | Cash et al. |
| 2006/0293954 A1 | 12/2006 | Anderson et al. |
| 2006/0293955 A1 | 12/2006 | Wilson et al. |
| 2006/0293979 A1 | 12/2006 | Cash et al. |
| 2006/0294199 A1 | 12/2006 | Bertholf |
| 2007/0005508 A1 | 1/2007 | Chiang |
| 2007/0011020 A1 | 1/2007 | Martin |
| 2007/0011026 A1 | 1/2007 | Higgins et al. |
| 2007/0011039 A1 | 1/2007 | Oddo |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0016522 A1 | 1/2007 | Wang |
| 2007/0022032 A1 | 1/2007 | Anderson et al. |
| 2007/0022141 A1 | 1/2007 | Singleton et al. |
| 2007/0027778 A1 | 2/2007 | Schellhammer et al. |
| 2007/0030282 A1 | 2/2007 | Cash et al. |
| 2007/0033227 A1 | 2/2007 | Gaito et al. |
| 2007/0038483 A1 | 2/2007 | Wood |
| 2007/0038516 A1 | 2/2007 | Apple et al. |
| 2007/0038568 A1 | 2/2007 | Greene et al. |
| 2007/0043654 A1 | 2/2007 | Libman |
| 2007/0055598 A1 | 3/2007 | Arnott et al. |
| 2007/0055599 A1 | 3/2007 | Arnott |
| 2007/0061195 A1 | 3/2007 | Liu et al. |
| 2007/0061243 A1 | 3/2007 | Ramer et al. |
| 2007/0067206 A1 | 3/2007 | Haggerty et al. |
| 2007/0067207 A1 | 3/2007 | Haggerty et al. |
| 2007/0067208 A1 | 3/2007 | Haggerty et al. |
| 2007/0067209 A1 | 3/2007 | Haggerty et al. |
| 2007/0067297 A1 | 3/2007 | Kublickis |
| 2007/0067437 A1 | 3/2007 | Sindambiwe |
| 2007/0072190 A1 | 3/2007 | Aggarwal |
| 2007/0078741 A1 | 4/2007 | Haggerty et al. |
| 2007/0078835 A1 | 4/2007 | Donnelli |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094137 A1 | 4/2007 | Phillips et al. |
| 2007/0100719 A1 | 5/2007 | Chwast et al. |
| 2007/0106582 A1 | 5/2007 | Baker et al. |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0121843 A1 | 5/2007 | Atazky et al. |
| 2007/0156515 A1 | 7/2007 | Hasselback et al. |
| 2007/0156589 A1 | 7/2007 | Zimler et al. |
| 2007/0156718 A1 | 7/2007 | Hossfeld et al. |
| 2007/0157110 A1 | 7/2007 | Gandhi et al. |
| 2007/0168246 A1 | 7/2007 | Haggerty et al. |
| 2007/0168267 A1 | 7/2007 | Zimmerman et al. |
| 2007/0169189 A1 | 7/2007 | Crespo et al. |
| 2007/0174122 A1 | 7/2007 | Howard et al. |
| 2007/0179798 A1 | 8/2007 | Inbarajan |
| 2007/0192165 A1 | 8/2007 | Haggerty et al. |
| 2007/0192248 A1 | 8/2007 | West |
| 2007/0192409 A1 | 8/2007 | Kleinstern et al. |
| 2007/0205266 A1 | 9/2007 | Carr et al. |
| 2007/0208619 A1 | 9/2007 | Branam et al. |
| 2007/0208640 A1 | 9/2007 | Banasiak et al. |
| 2007/0208653 A1 | 9/2007 | Murphy |
| 2007/0214000 A1 | 9/2007 | Shahrabi et al. |
| 2007/0220553 A1 | 9/2007 | Branam et al. |
| 2007/0220611 A1 | 9/2007 | Socolow et al. |
| 2007/0226093 A1 | 9/2007 | Chan et al. |
| 2007/0226114 A1 | 9/2007 | Haggerty et al. |
| 2007/0226130 A1 | 9/2007 | Haggerty et al. |
| 2007/0233591 A1 | 10/2007 | Newton |
| 2007/0233857 A1 | 10/2007 | Cheng et al. |
| 2007/0244732 A1 | 10/2007 | Chatterji et al. |
| 2007/0244807 A1 | 10/2007 | Andringa et al. |
| 2007/0260539 A1 | 11/2007 | Delinsky |
| 2007/0266439 A1 | 11/2007 | Kraft |
| 2007/0271582 A1 | 11/2007 | Ellis et al. |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288338 A1 | 12/2007 | Hoadley |
| 2007/0288355 A1 | 12/2007 | Roland et al. |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0299759 A1 | 12/2007 | Kelly |
| 2007/0299770 A1 | 12/2007 | Delinsky |
| 2007/0299771 A1 | 12/2007 | Brody |
| 2008/0005313 A1 | 1/2008 | Flake et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0021802 A1 | 1/2008 | Pendleton |
| 2008/0028067 A1 | 1/2008 | Berkhin et al. |
| 2008/0033852 A1 | 2/2008 | Megdal et al. |
| 2008/0052224 A1 | 2/2008 | Parker |
| 2008/0059317 A1 | 3/2008 | Chandran et al. |

(56) References Cited

U.S. PATENT DOCUMENTS

| | | |
|---|---|---|
| 2008/0059352 A1 | 3/2008 | Chandran |
| 2008/0059364 A1 | 3/2008 | Tidwell et al. |
| 2008/0059449 A1 | 3/2008 | Webster et al. |
| 2008/0065530 A1 | 3/2008 | Talbert et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0077526 A1 | 3/2008 | Arumugam |
| 2008/0086368 A1 | 4/2008 | Bauman et al. |
| 2008/0091535 A1 | 4/2008 | Heiser et al. |
| 2008/0097768 A1 | 4/2008 | Godshalk |
| 2008/0097928 A1 | 4/2008 | Paulson |
| 2008/0103800 A1 | 5/2008 | Domenikos et al. |
| 2008/0103972 A1 | 5/2008 | Lanc |
| 2008/0109740 A1 | 5/2008 | Prinsen et al. |
| 2008/0120155 A1 | 5/2008 | Pliha |
| 2008/0120569 A1 | 5/2008 | Mann et al. |
| 2008/0126233 A1 | 5/2008 | Hogan |
| 2008/0126476 A1 | 5/2008 | Nicholas et al. |
| 2008/0133322 A1 | 6/2008 | Kalia et al. |
| 2008/0133325 A1 | 6/2008 | De et al. |
| 2008/0134042 A1 | 6/2008 | Jankovich |
| 2008/0140507 A1 | 6/2008 | Hamlisch et al. |
| 2008/0140549 A1 | 6/2008 | Eder |
| 2008/0147454 A1 | 6/2008 | Walker et al. |
| 2008/0154766 A1 | 6/2008 | Lewis et al. |
| 2008/0162383 A1 | 7/2008 | Kraft |
| 2008/0167883 A1 | 7/2008 | Khazaneh |
| 2008/0167936 A1 | 7/2008 | Kapoor |
| 2008/0167956 A1 | 7/2008 | Keithley |
| 2008/0172324 A1 | 7/2008 | Johnson |
| 2008/0175360 A1 | 7/2008 | Schwarz et al. |
| 2008/0177655 A1 | 7/2008 | Zalik |
| 2008/0177836 A1 | 7/2008 | Bennett |
| 2008/0183564 A1 | 7/2008 | Tien et al. |
| 2008/0184289 A1 | 7/2008 | Cristofalo et al. |
| 2008/0195425 A1 | 8/2008 | Haggerty et al. |
| 2008/0195445 A1 | 8/2008 | Haggerty et al. |
| 2008/0195548 A1 | 8/2008 | Chu et al. |
| 2008/0201257 A1 | 8/2008 | Lewis et al. |
| 2008/0205774 A1 | 8/2008 | Brinker et al. |
| 2008/0208788 A1 | 8/2008 | Merugu et al. |
| 2008/0215470 A1 | 9/2008 | Sengupta et al. |
| 2008/0221934 A1 | 9/2008 | Megdal et al. |
| 2008/0221947 A1 | 9/2008 | Megdal et al. |
| 2008/0221970 A1 | 9/2008 | Megdal et al. |
| 2008/0221971 A1 | 9/2008 | Megdal et al. |
| 2008/0221973 A1 | 9/2008 | Megdal et al. |
| 2008/0222015 A1 | 9/2008 | Megdal et al. |
| 2008/0222016 A1 | 9/2008 | Megdal et al. |
| 2008/0222027 A1 | 9/2008 | Megdal et al. |
| 2008/0222706 A1 | 9/2008 | Renaud et al. |
| 2008/0228538 A1 | 9/2008 | Megdal et al. |
| 2008/0228539 A1 | 9/2008 | Megdal et al. |
| 2008/0228540 A1 | 9/2008 | Megdal et al. |
| 2008/0228541 A1 | 9/2008 | Megdal et al. |
| 2008/0228556 A1 | 9/2008 | Megdal et al. |
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0255897 A1 | 10/2008 | Megdal et al. |
| 2008/0255992 A1 | 10/2008 | Lin |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0276271 A1 | 11/2008 | Anderson et al. |
| 2008/0281737 A1 | 11/2008 | Fajardo |
| 2008/0288382 A1 | 11/2008 | Smith et al. |
| 2008/0294540 A1 | 11/2008 | Celka et al. |
| 2008/0301727 A1 | 12/2008 | Cristofalo et al. |
| 2008/0312969 A1 | 12/2008 | Raines et al. |
| 2009/0006185 A1 | 1/2009 | Stinson |
| 2009/0006475 A1 | 1/2009 | Udezue et al. |
| 2009/0007231 A1 | 1/2009 | Kaiser et al. |
| 2009/0012889 A1 | 1/2009 | Finch |
| 2009/0018996 A1 | 1/2009 | Hunt et al. |
| 2009/0024505 A1 | 1/2009 | Patel et al. |
| 2009/0037247 A1 | 2/2009 | Quinn |
| 2009/0037323 A1 | 2/2009 | Feinstein et al. |
| 2009/0043637 A1 | 2/2009 | Eder |
| 2009/0044246 A1 | 2/2009 | Sheehan et al. |
| 2009/0044279 A1 | 2/2009 | Crawford et al. |
| 2009/0055322 A1 | 2/2009 | Bykov et al. |
| 2009/0076883 A1 | 3/2009 | Kilger et al. |
| 2009/0089190 A1 | 4/2009 | Girulat |
| 2009/0089205 A1 | 4/2009 | Bayne |
| 2009/0094640 A1 | 4/2009 | Anderson et al. |
| 2009/0099960 A1 | 4/2009 | Robida et al. |
| 2009/0106150 A1 | 4/2009 | Pelegero et al. |
| 2009/0106846 A1 | 4/2009 | Dupray et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0119299 A1 | 5/2009 | Rhodes |
| 2009/0125369 A1 | 5/2009 | Kloostra et al. |
| 2009/0126013 A1 | 5/2009 | Atwood et al. |
| 2009/0132347 A1 | 5/2009 | Anderson et al. |
| 2009/0132559 A1 | 5/2009 | Chamberlain et al. |
| 2009/0133058 A1 | 5/2009 | Kouritzin et al. |
| 2009/0144102 A1 | 6/2009 | Lopez |
| 2009/0144160 A1 | 6/2009 | Haggerty et al. |
| 2009/0144201 A1 | 6/2009 | Gierkink et al. |
| 2009/0158030 A1 | 6/2009 | Rasti |
| 2009/0171723 A1 | 7/2009 | Jenkins |
| 2009/0172035 A1 | 7/2009 | Lessing et al. |
| 2009/0177480 A1 | 7/2009 | Chen et al. |
| 2009/0182653 A1 | 7/2009 | Zimiles |
| 2009/0199264 A1 | 8/2009 | Lang |
| 2009/0210886 A1 | 8/2009 | Bhojwani et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0240609 A1 | 9/2009 | Cho et al. |
| 2009/0240624 A1 | 9/2009 | James et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0249440 A1 | 10/2009 | Platt et al. |
| 2009/0254476 A1 | 10/2009 | Sharma et al. |
| 2009/0271248 A1 | 10/2009 | Sherman et al. |
| 2009/0288109 A1 | 11/2009 | Downey et al. |
| 2009/0289110 A1 | 11/2009 | Regen et al. |
| 2009/0313163 A1 | 12/2009 | Wang et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0017300 A1 | 1/2010 | Bramlage et al. |
| 2010/0023434 A1 | 1/2010 | Bond |
| 2010/0037255 A1 | 2/2010 | Sheehan et al. |
| 2010/0043055 A1 | 2/2010 | Baumgart |
| 2010/0082476 A1 | 4/2010 | Bowman |
| 2010/0094704 A1 | 4/2010 | Subramanian et al. |
| 2010/0094758 A1 | 4/2010 | Chamberlain et al. |
| 2010/0094768 A1 | 4/2010 | Miltonberger |
| 2010/0100945 A1 | 4/2010 | Ozzie et al. |
| 2010/0107225 A1 | 4/2010 | Spencer et al. |
| 2010/0114663 A1 | 5/2010 | Casas et al. |
| 2010/0114744 A1 | 5/2010 | Gonen |
| 2010/0121767 A1 | 5/2010 | Coulter et al. |
| 2010/0122316 A1 | 5/2010 | Lyon |

(56) References Cited

U.S. PATENT DOCUMENTS

| | | |
|---|---|---|
| 2010/0130172 A1 | 5/2010 | Vendrow et al. |
| 2010/0138290 A1 | 6/2010 | Zschocke et al. |
| 2010/0145836 A1 | 6/2010 | Baker et al. |
| 2010/0169159 A1 | 7/2010 | Rose et al. |
| 2010/0169264 A1 | 7/2010 | O'Sullivan |
| 2010/0174638 A1 | 7/2010 | Debie et al. |
| 2010/0185453 A1 | 7/2010 | Satyavolu et al. |
| 2010/0205662 A1 | 8/2010 | Ibrahim et al. |
| 2010/0217837 A1 | 8/2010 | Ansari et al. |
| 2010/0223168 A1 | 9/2010 | Haggerty et al. |
| 2010/0228657 A1 | 9/2010 | Kagarlis |
| 2010/0228658 A1 | 9/2010 | Ketelsen et al. |
| 2010/0229245 A1 | 9/2010 | Singhal |
| 2010/0250411 A1 | 9/2010 | Ogrodski |
| 2010/0250434 A1 | 9/2010 | Megdal et al. |
| 2010/0250469 A1 | 9/2010 | Megdal et al. |
| 2010/0253686 A1 | 10/2010 | Alsbury et al. |
| 2010/0257102 A1 | 10/2010 | Perlman |
| 2010/0268660 A1 | 10/2010 | Ekdahl |
| 2010/0274739 A1 | 10/2010 | Haggerty et al. |
| 2010/0293114 A1 | 11/2010 | Khan et al. |
| 2010/0299251 A1 | 11/2010 | Thomas |
| 2010/0299252 A1 | 11/2010 | Thomas |
| 2010/0299260 A1 | 11/2010 | Thomas |
| 2010/0312717 A1 | 12/2010 | Haggerty et al. |
| 2010/0324986 A1 | 12/2010 | Thomas |
| 2010/0325036 A1 | 12/2010 | Thomas |
| 2011/0004498 A1 | 1/2011 | Readshaw |
| 2011/0004514 A1 | 1/2011 | Thomas |
| 2011/0004546 A1 | 1/2011 | Thomas |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0029427 A1 | 2/2011 | Haggerty et al. |
| 2011/0035333 A1 | 2/2011 | Haggerty et al. |
| 2011/0047071 A1 | 2/2011 | Choudhuri et al. |
| 2011/0060654 A1 | 3/2011 | Elliott et al. |
| 2011/0060673 A1 | 3/2011 | Delinsky et al. |
| 2011/0060905 A1 | 3/2011 | Stack et al. |
| 2011/0071950 A1 | 3/2011 | Ivanovic |
| 2011/0076663 A1 | 3/2011 | Krallman et al. |
| 2011/0078073 A1 | 3/2011 | Annappindi et al. |
| 2011/0093383 A1 | 4/2011 | Haggerty et al. |
| 2011/0112950 A1 | 5/2011 | Haggerty et al. |
| 2011/0112958 A1 | 5/2011 | Haggerty et al. |
| 2011/0125595 A1 | 5/2011 | Neal et al. |
| 2011/0125632 A1 | 5/2011 | Neel |
| 2011/0126275 A1 | 5/2011 | Anderson et al. |
| 2011/0137789 A1 | 6/2011 | Kortina et al. |
| 2011/0164746 A1 | 7/2011 | Nice et al. |
| 2011/0166988 A1 | 7/2011 | Coulter |
| 2011/0173116 A1 | 7/2011 | Yan et al. |
| 2011/0178841 A1 | 7/2011 | Rene et al. |
| 2011/0178899 A1 | 7/2011 | Huszar |
| 2011/0184851 A1 | 7/2011 | Megdal et al. |
| 2011/0213641 A1 | 9/2011 | Metzger, II et al. |
| 2011/0218826 A1 | 9/2011 | Birtel et al. |
| 2011/0219421 A1 | 9/2011 | Ullman et al. |
| 2011/0238566 A1 | 9/2011 | Santos |
| 2011/0258050 A1 | 10/2011 | Chan et al. |
| 2011/0258142 A1 | 10/2011 | Haggerty et al. |
| 2011/0264581 A1 | 10/2011 | Clyne |
| 2011/0270618 A1 | 11/2011 | Banerjee et al. |
| 2011/0270779 A1 | 11/2011 | Showalter |
| 2011/0282779 A1 | 11/2011 | Megdal et al. |
| 2011/0295733 A1 | 12/2011 | Megdal et al. |
| 2011/0295768 A1 | 12/2011 | Haggerty et al. |
| 2011/0307397 A1 | 12/2011 | Benmbarek |
| 2012/0005070 A1 | 1/2012 | McFall et al. |
| 2012/0011056 A1 | 1/2012 | Ward et al. |
| 2012/0011158 A1 | 1/2012 | Avner et al. |
| 2012/0016948 A1 | 1/2012 | Sinha |
| 2012/0029956 A1 | 2/2012 | Ghosh et al. |
| 2012/0035980 A1 | 2/2012 | Haggerty et al. |
| 2012/0046979 A1 | 2/2012 | Chatterji et al. |
| 2012/0047219 A1 | 2/2012 | Feng et al. |
| 2012/0054090 A1 | 3/2012 | Haggerty et al. |
| 2012/0054592 A1 | 3/2012 | Jaffe et al. |
| 2012/0066065 A1 | 3/2012 | Switzer |
| 2012/0066106 A1 | 3/2012 | Papadimitriou |
| 2012/0084230 A1 | 4/2012 | Megdal et al. |
| 2012/0101938 A1 | 4/2012 | Kasower |
| 2012/0101939 A1 | 4/2012 | Kasower |
| 2012/0106801 A1 | 5/2012 | Jackson |
| 2012/0110677 A1 | 5/2012 | Abendroth et al. |
| 2012/0116951 A1 | 5/2012 | Chung et al. |
| 2012/0123931 A1 | 5/2012 | Megdal et al. |
| 2012/0123968 A1 | 5/2012 | Megdal et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0173339 A1 | 7/2012 | Flynt et al. |
| 2012/0179536 A1 | 7/2012 | Kalb et al. |
| 2012/0185296 A1 | 7/2012 | Haggerty et al. |
| 2012/0185338 A1 | 7/2012 | Chwast et al. |
| 2012/0239497 A1 | 9/2012 | Nuzzi |
| 2012/0239515 A1 | 9/2012 | Batra et al. |
| 2012/0253852 A1 | 10/2012 | Pourfallah et al. |
| 2012/0254018 A1 | 10/2012 | Davies et al. |
| 2012/0265661 A1 | 10/2012 | Megdal et al. |
| 2012/0278767 A1 | 11/2012 | Stibel et al. |
| 2012/0290660 A1 | 11/2012 | Rao et al. |
| 2012/0324388 A1 | 12/2012 | Rao et al. |
| 2013/0006825 A1 | 1/2013 | Robida et al. |
| 2013/0066676 A1 | 3/2013 | Williams et al. |
| 2013/0080315 A1 | 3/2013 | Torrez et al. |
| 2013/0080467 A1 | 3/2013 | Carson et al. |
| 2013/0085804 A1 | 4/2013 | Leff et al. |
| 2013/0085902 A1 | 4/2013 | Chew |
| 2013/0103571 A1 | 4/2013 | Chung et al. |
| 2013/0110565 A1 | 5/2013 | Means et al. |
| 2013/0117087 A1 | 5/2013 | Coppinger |
| 2013/0132151 A1 | 5/2013 | Stibel et al. |
| 2013/0173359 A1 | 7/2013 | Megdal et al. |
| 2013/0173451 A1 | 7/2013 | Kornegay et al. |
| 2013/0173481 A1 | 7/2013 | Hirtenstein et al. |
| 2013/0191261 A1 | 7/2013 | Chandler et al. |
| 2013/0205135 A1 | 8/2013 | Lutz |
| 2013/0218638 A1 | 8/2013 | Kilger et al. |
| 2013/0268324 A1 | 10/2013 | Megdal et al. |
| 2013/0275331 A1 | 10/2013 | Megdal et al. |
| 2013/0332338 A1 | 12/2013 | Yan et al. |
| 2013/0332341 A1 | 12/2013 | Papadimitriou |
| 2013/0339249 A1 | 12/2013 | Weller et al. |
| 2014/0012633 A1 | 1/2014 | Megdal et al. |
| 2014/0012734 A1 | 1/2014 | Megdal et al. |
| 2014/0019331 A1 | 1/2014 | Megdal et al. |
| 2014/0025815 A1 | 1/2014 | Low |
| 2014/0032265 A1 | 1/2014 | Paprocki |
| 2014/0032300 A1 | 1/2014 | Zhang et al. |
| 2014/0032384 A1 | 1/2014 | Megdal et al. |
| 2014/0032723 A1 | 1/2014 | Nema |
| 2014/0061302 A1 | 3/2014 | Hammad |
| 2014/0096249 A1 | 4/2014 | Dupont et al. |
| 2014/0110477 A1 | 4/2014 | Hammad |
| 2014/0156501 A1 | 6/2014 | Howe |
| 2014/0164398 A1 | 6/2014 | Smith et al. |
| 2014/0244353 A1 | 8/2014 | Winters |
| 2014/0258089 A1 | 9/2014 | Pearson et al. |
| 2014/0279329 A1 | 9/2014 | Dancel |
| 2015/0026014 A1 | 1/2015 | Kasower |
| 2015/0228016 A1 | 8/2015 | Chandler |
| 2016/0125412 A1 | 5/2016 | Cannon |
| 2017/0228820 A1 | 8/2017 | Rohn et al. |
| 2017/0262758 A1 | 9/2017 | Boyapalle et al. |
| 2017/0323063 A1 | 11/2017 | Krause et al. |
| 2018/0082371 A1 | 3/2018 | Chandler |
| 2018/0218069 A1 | 8/2018 | Rege et al. |

(56) References Cited

U.S. PATENT DOCUMENTS

| | | |
|---|---|---|
| 2019/0102832 A1 | 4/2019 | Robida et al. |
| 2019/0156227 A1 | 5/2019 | Duke et al. |

FOREIGN PATENT DOCUMENTS

| | | |
|---|---|---|
| DE | 91 08 341 | 10/1991 |
| EP | 0 350 907 | 1/1990 |
| EP | 0 468 440 | 1/1992 |
| EP | 0 554 083 | 8/1993 |
| EP | 0 566 736 | 8/1993 |
| EP | 0 749 081 | 12/1996 |
| EP | 0 869 652 | 10/1998 |
| EP | 0 913 789 | 5/1999 |
| EP | 0 919 942 | 6/1999 |
| EP | 1 028 401 | 8/2000 |
| EP | 1 122 664 | 8/2001 |
| GB | 2 392 748 | 3/2004 |
| JP | 10-293732 | 11/1998 |
| JP | 2001-282957 | 10/2001 |
| JP | 2002-163449 | 6/2002 |
| JP | 2003-016261 | 1/2003 |
| JP | 2003-316950 | 11/2003 |
| KR | 10-0638324 | 10/2006 |
| TW | 256569 | 6/2006 |
| WO | WO 91/003789 | 3/1991 |
| WO | WO 94/006103 | 3/1994 |
| WO | WO 97/023838 | 7/1997 |
| WO | WO 98/049643 | 11/1998 |
| WO | WO 99/004350 | 1/1999 |
| WO | WO 99/022328 | 5/1999 |
| WO | WO 99/033012 | 7/1999 |
| WO | WO 99/046710 | 9/1999 |
| WO | WO 00/011574 | 3/2000 |
| WO | WO 00/055789 | 9/2000 |
| WO | WO 00/055790 | 9/2000 |
| WO | WO 01/010090 | 2/2001 |
| WO | WO 01/011522 | 2/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/057720 | 8/2001 |
| WO | WO 01/075754 | 10/2001 |
| WO | WO 01/080053 | 10/2001 |
| WO | WO 01/084281 | 11/2001 |
| WO | WO 02/027610 | 4/2002 |
| WO | WO 03/071388 | 8/2003 |
| WO | WO 03/101123 | 12/2003 |
| WO | WO 2004/046882 | 6/2004 |
| WO | WO 2004/114160 | 12/2004 |
| WO | WO 2005/022348 | 3/2005 |
| WO | WO 2005/124619 | 12/2005 |
| WO | WO 2006/099492 | 9/2006 |
| WO | WO 2006/110873 | 10/2006 |
| WO | WO 2006/135451 | 12/2006 |
| WO | WO 2007/004158 | 1/2007 |
| WO | WO 2007/106393 | 9/2007 |
| WO | WO 2007/106786 | 9/2007 |
| WO | WO 2007/106787 | 9/2007 |
| WO | WO 2007/149941 | 12/2007 |
| WO | WO 2008/022289 A2 | 2/2008 |
| WO | WO 2008/054403 | 5/2008 |
| WO | WO 2008/127288 | 10/2008 |
| WO | WO 2009/061342 | 5/2009 |
| WO | WO 2009/064840 | 5/2009 |
| WO | WO 2009/099448 | 8/2009 |
| WO | WO 2009/117518 | 9/2009 |
| WO | WO 2009/132114 | 10/2009 |
| WO | WO 2010/045160 | 4/2010 |
| WO | WO 2010/062537 | 6/2010 |
| WO | EO 2010/132492 | 11/2010 |
| WO | WO 2010/129257 | 11/2010 |
| WO | WO 2010/150251 | 12/2010 |
| WO | WO 2011/005876 | 1/2011 |
| WO | WO 2014/018900 | 1/2014 |
| WO | WO 2018/144612 | 8/2018 |

OTHER PUBLICATIONS

International Search Report and Written Opinion in PCT/US08/083939, dated Jan. 29, 2009.

International Search Report and Written Opinion for Application No. PCT/US2010/034434, dated Jun. 23, 2010.

International Preliminary Report on Patentability for Application No. PCT/US2010/034434, dated Feb. 4, 2014.

"Atlas on Demand, Concurrent, and Everstream Strike Video-On-Demand Advertising Alliance", www.atlassolutions.com, Jul. 13, 2006, 3 pages.

"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.

"Accenture Newsroom: Accenture Completes Acquisition of Media Audits: Acquisition Expands Company's Marketing Sciences and Data Services Capabilities," accenture.com, Dec. 12, 2005, 2 pages, http://accenture.tekgroup.conn/article_display.cfm?article_id=428.

"Arbitron 2006 Black Consumers," Arbitron Inc., lvtsg.com, Jul. 8, 2006, 2 pages, http://www.lvtsg.com/news/publish/Factoids/article_3648.shtml.

"Atlas on Demand and C-COR Join Forces to Offer Advertising Management Solution for on Demand TV: Global Provider of on Demand Systems Partners with Atlas to Develop and Market Comprehensive VOD Advertising Solution," www.atlassolutions.com, Jul. 25, 2005, 3 pages.

"Atlas on Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar" Jun. 22, 2006—3 pages, http://www.atlassolutions.com/news_20060622.aspx.

Adzilla, Press Release, "Zillacasting Technology Approved and Patent Pending," http://www.adzilla.com/newsroom/pdf/patent_051605.pdf, May 16, 2005, pp. 2.

AFX New Limited—AFX International Focus, "Nielsen moving to measure off-TV viewing," Jun. 14, 2006, 1 page.

Anderson, Eric, "System Administration: Monitoring, Diagnosing, and Repairing", Apr. 7, 1997, available at http://now.cs.berkeley.edu/Sysadmin/quals.

Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.

"Bank of America Direct Web-Based Network Adds Core Functionality to Meet Day-To-Day Treasury Needs", Business Wire, Oct. 25, 1999. pp. 2.

Bitran et al., "Mailing Decisions in Catalog Sales Industry", Management Science (JSTOR), vol. 42, No. 9, pp. 1364-1381, Sep. 1996.

Brown et al., "ALCOD IDSS:Assisting the Australian Stock Market Surveillance Team's Review Process," Applied Artificial Intelligence Journal, Dec. 1, 1996, pp. 625-641.

Bult et al., "Optimal Selection for Direct Mail," Marketing Science, 1995, vol. 14, No. 4, pp. 378-394.

"Cable Solution Now, The Industry Standard for Information Management: Strata's TIM.net Crosses Important Threshold Dominant Solution for All Top 20 TV Markets," stratag.com, Apr. 28, 2006, 1 pages, http://stratag.com/news/cablepress042806.html.

Caliendo, et al., "Some Practical Guidance for the Implementation of Propensity Score Matching", IZA: Discussion Paper Series, No. 1588, Germany, May 2005, pp. 32.

"Chase Gets Positive", Bank Technology News, May 6, 2000, vol. 14, No. 5, p. 33.

"Claritas Forms Life Insurance Consortium with Worldwide Financial Services Association: Initiative with LIMRA International is First of its Kind to Provide Actual Sales Information at Small Geographic Areas," claritas.com, Feb. 9, 2006, 3 pages, http.

(56) References Cited

OTHER PUBLICATIONS

"Claritas Introduces PRIZM NE Consumer Electronic Monitor Profiles: New Information Product Provides Insight Into the Public's Purchasing Behaviors of Consumer Electronics," claritas.com May 30, 2006, 3 pages.

"Cole Taylor Bank Chooses Integrated E-Banking/E-Payments/ Reconciliation Solution From Fundtech", Business Wire, Oct. 21, 1999, pp. 2.

CreditAnalyst, Digital Matrix Systems, as printed out Mar. 4, 2008, pp. 2.

Click Z, "ISPs Collect User Data for Behavioral Ad Targeting," dated Jan. 3, 2008, printed from http://www.clickz.com/showPage.html?p.=clickz Apr. 16, 2008.

CNET news.com, "Target me with your ads, please," dated Dec. 5, 2007, printed from http://www.news.com/2102-1024_3-6221241.html?tag+st.util.print Mar. 18, 2008.

Creamer, Matthew; Consulting in marketing; Accenture, Others Playing Role in Firms' Processes, Crain's Chicago Business, Jun. 12, 2006, 2 pages.

Delany, Kevin J., et al. , Firm Mines Offline Data to Target Online as downloaded from http://www.commercialalert.org on Apr. 22, 2008, Commercial Alert, Oct. 17, 2007.

demographicsnow.com, sample reports, "Age Rank Report", Jul. 17, 2006, 3 pages.

demographicsnow.com, sample reports, "Consumer Expenditure Summary Report", Jul. 17, 2006, 3 pages.

demographicsnow.com, sample reports, "Income Comparison Report", Jul. 17, 2006, 4 pages.

Egol, Len; "What's New in Database Marketing Software," Direct, Aug. 1994, vol. 6, No. 8, p. 39(4).

"Epsilon Leads Discussion on Paradigm Shift in TV Advertising," epsilon.com, Jun. 24, 2004, 2 pages, http://www.epsilon.com/who-pr_tvad040624.html.

"Experian Launches Portfolio Monitor—Owner NoticesSM", News Release, Feb. 2003, Costa Mesa, CA.

Fanelli, Marc, "Building a Holistic Customer View", MultiChannel Merchant, Jun. 26, 2006, pp. 2.

Frontporch, "Ad Networks-Partner with Front Porch!," www.frontporch.com printed Apr. 2008 in 2 pages.

Frontporch, "New Free Revenue for Broadband ISPs!", http://www.frontporch.com/html/bt/FPBroadbandISPs.pdf printed May 28, 2008 in 2 pages.

"FTC Testifies: Identity Theft on the Rise", FTC News Release, Mar. 7, 2000, pp. 3.

Gilje, Shelby, "Keeping Tabs on Businesses That Keep Tabs on Us", NewsRoom, The Seattle Times, Section: Scene, Apr. 19, 1995, pp. 4.

Gonul, et al., "Optimal Mailing of Catalogs: A New Methodology Using Estimable Structural Dynamic Programming Models", 14 pages, Management Science, vol. 44, No. 9, Sep. 1998.

Halliday, Jean, "Ford Recruits Accenture for Marketing Plan," Automotive News Feb. 13, 2006, 2 pages, Crain Communications.

Haughton et al., "Direct Marketing Modeling with CART and CHAID", Journal of Direct Marketing, Fall 1997, vol. 11, No. 4, pp. 42-52.

Helm, Burt, "Nielsen's New Ratings Yardstick," businessweek.com, Jun. 20, 2006, 3 pages, http://www.businessweek.conn/technology/content/jun2006/tc20060620_054223.htm.

Hill, Kerry, "Identity Theft Your Social Security Number Provides Avenue for Thieves", NewsRoom, Wisconsin State Journal, Sep. 13, 1998, pp. 4.

Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.

Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, http://us.infores.com/page/news/pr/pr_archive?mode=single&pr_id=117, printed Oct. 4, 2007 in 2 pages.

"Intelligent Miner Applications Guide", IBM Corp., Apr. 2, 1999, Chapters 4-7, pp. 33-132.

"IRI and Acxiom Introduce More Efficient and Actionable Approach to Consumer Segmentation and Targeted Marketing," eu-marketingportal.de, Jan. 26, 2006, 2 pages, http://www.eu-marketingportal.de.

Jost, Allen; Neural Networks, Credit World, Mar./Apr. 1993, vol. 81, No. 4, pp. 26-33.

Lamons, Bob, "Be Smart: Offer Inquiry Qualification Services," Marketing News, ABI/Inform Global, Nov. 6, 1995, vol. 29, No. 23, pp. 13.

Longo, Tracey, "Managing Money: Your Family Finances", Kiplinger's Personal Finance Magazine, Jun. 1, 1995, vol. 49, No. 6, pp. 4.

"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.

Morrissey, Brian, "Aim High: Ad Targeting Moves to the Next Level", Adweek, dated Jan. 21, 2008 as downloaded from http://www.adweek.com/aw/magazine/article_display.isp?vnu on Apr. 16, 2008.

Muus, et al., "A Decision Theoretic Framework for Profit Maximization in Direct Marketing", Sep. 1996, pp. 20.

NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.

"New Privista Product Provides Early Warning System to Combat Identity Theft", PR Newswire, Oct. 24, 2000, PR Newswire Association, Inc., New York.

Otter, et al., "Direct Mail Selection by Joint Modeling of the Probability and Quantity of Response", Jun. 1997, pp. 14.

"Parse", Definition from PC Magazine Encyclopedia, <http://www/pcmag.com/encyclopedia_term_0,2542,t=parse&i=48862,00.asp> as downloaded Mar. 5, 2012.

Phorm, "BT PLC TalkTalk and Virgin Media Inc. confirm exclusive agreements with Phorm", Press Release, http://www.phorm.com/about/launch_agreement.php, Feb. 14, 2008, pp. 2.

Phorm, "The Open Internet Exchange, 'Introducing the OIX'", http://www.phorm.com/oix/ printed May 29, 2008 in 1 page.

Polatoglu et al., "Theory and Methodology, Probability Distributions of Cost, Revenue and Profit over a Warranty Cycle", European Journal of Operational Research, Jul. 1998, vol. 108, Issue 1, pp. 170-183.

Predictive Behavioral Targeting http://www.predictive-behavioral-targeting.com/index.php.Main_Page as printed Mar. 28, 2008 in 4 pages.

RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.

Reinbach, Andrew; MCIF aids banks in CRA Compliance, Bank Systems & Technology, Aug. 1995, vol. vol. 32, Issue No. 8, Pages pp. 27.

Schmittlein et al., "Customer Base Analysis: An Industrial Purchase Process Application", Marketing Science, vol. 13, No. 1 (Winter 1994), pp. 41-67.

"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsrnag.com/press.releases/index.php?duty=Show&id=1.

"SRC Delivers Industry's First Drive Time Engine Developed to Follow Actual Road Networks," thomasnet.com, May 21, 2006, 4 pages, http://news.thomasnet.com/companystory/485722.

Sweat, Jeff; "Know Your Customers," Information Week, Nov. 30, 1998, pp. 20.

Tao, Lixin, "Shifting Paradigms with the Application Service Provider Model"; Concordia University, IEEE, Oct. 2001, Canada.

Thoemmes, Felix, "Propensity Score Matching in SPSS", Center for Educational Science and Psychology, University of Tubingen, Jan. 2012.

(56) References Cited

OTHER PUBLICATIONS

UPI, "Nielsen Media Research goes electronic," Jun. 14, 2006, 1 page.

"VOD Integration Now Available in Strata: Buyers / Sellers Benefit from VOD Component on Popular Platform," stratag.com, Feb. 21, 2006, 1 page, http://www.stratag.com/news/mediapress022106.html.

Whitney, Daisy; Atlas Positioning to Shoulder VOD Ads; Campaign Management Tools Optimize Inventory, TelevisionWeek, May 23, 2005, 3 pages.

Zoot—Instant Rules GUI, <www.zootweb.com/instant_rules_GUI.html> as printed Mar. 3, 2008.

Zoot—Pre-Built Standard Attributes, <www.zootweb.com/credit_attributes.html> as printed Mar. 3, 2008.

Zoot—Rules Management GUI, <www.zootweb.com/business_rules_GUI.html> as printed Mar. 3, 2008.

U.S. Appl. No. 11/231,339, U.S. Pat. No. 8,732,004, Automated Analysis of Data to Generate Prospect Notifications Based on Trigger Events, filed Sep. 20, 2005.

Application as filed in U.S. Appl. No. 09/653,595, dated Aug. 31, 2000.

EFunds Introduces QualiFileSM, Deluxe Corporation, eFunds Press Release and Product Launch, Sep. 23, 1999, Milwaukee, WI.

Experian, Custom Strategist and Qualifile from Funds, 2000, in 2 pages.

Provisional Application as filed in U.S. Appl. No. 60/168,272, dated Dec. 1, 1999 in 14 pages.

Provisional Application as filed in U.S. Appl. No. 60/168,276, dated Dec. 1, 1999 in 82 pages.

Provisional Application as filed in U.S. Appl. No. 60/213,367, dated Jun. 23, 2000 in 20 pages.

U.S. Appl. No. 12/705,489, filed Feb. 12, 2010, Bargoli et al.

U.S. Appl. No. 12/705,511, filed Feb. 12, 2010, Bargoli et al.

U.S. Appl. No. 60/146,074, filed Jul. 28, 1999, Tomkow.

U.S. Appl. No. 60/172,479, filed Dec. 17, 1999, Tomkow.

Abrahams, "The New View in Mortgage Prepayments: Insight from Analysis at the Loan-By-Loan Level," The Journal of Fixed Income, Jun. 1997, vol. 7, No. 1, pp. 8-21.

"Aggregate and Analyze Social Media Content: Gain Faster and Broader Insight to Market Sentiment," SAP Partner, Mantis Technology Group, Apr. 2011, pp. 4.

Akl, Selim G., "Digital Signatures: A Tutorial Survey," Computer, Feb. 1983, pp. 15-24.

AISG's National Underwriting Database, A-PLUS, is Now the Largest in the Industry, Business Wire, Aug. 7, 1997.

Announcing TrueProfiler, http://web.archive.org/web/20021201123646/http://www.truecredit.com/index.asp, dated Dec. 1, 2002, 2 pages.

AT&T Expected to Turn Up Heat in Card Wars, American Banker, vol. 158, No. 101; May 27, 1993; pp. 1-3.

Avery et al., "Consumer Credit Scoring: Do Situational Circumstances Matter?" Journal of Banking & Finance, vol. 28, 2004, pp. 835-856.

Awoonor-Williams, Princess Josephine, Ph.D. "Gender and Credit: An Analysis of Women's Experience in the Credit Market", ProQuest Dissertations and Theses, 2004, pp. 148.

Balance Transfers Offer Opportunities, Risk Credit Risk Management Report, vol. 6, No. 2, Phillips Business Information, Jan. 29, 1996.

Bancroft, John, "Tools Help Managers with Risk Management," Real Estate Finance Today, May 26, 1997, pp. 11-12.

Bank of America Launches Total Security Protection™; Features Address Cardholders' Financial Safety Concerns; Supported by $26 Million National Advertising Campaign; Free Educational Materials, PR Newswire, Oct. 9, 2002, pp. 2.

Bank Technology News, "The Road to Better Credit-Card Marketing," Sep. 1995, pp. 1-4.

Barone, Robert P., "The Integrated Approach to Branch Service Delivery," American Banker, Aug. 6, 2011. http://www.highbeam.com/doc/1G1-11128400.html.

Bilotta, Caryn, "Understanding Credit Scores," Pittsburgh Post—Gazette, May 9, 2010.

Blackbaud.com, www.blackbaud.com, various pages, retrieved Jan. 22, 2009 from www.archive.org, 23 pages.

Burr Ph.D., et al., "Utility Payments as Alternative Credit Data: A Reality Check", Asset Builders of America, Inc., Oct. 5, 2006, pp. 1-18, Washington, D.C.

Cantor, R. and Packer, F., "The Credit Rating Industry," FRBNY Quarterly Review, Summer-Fall, 1994, pp. 1-24.

Card Marketing, Use the Latest CRM Tools and Techniques, www.CardForum.com, vol. 5 No. 10, Dec. 2001.

ChannelWave.com, PRM Central—About PRM, http://web.archive.org/web/20000510214859/http://www.channelwave.com as printed on Jun. 21, 2006, May 2000 Archive.

Chatterjee et al., "Expenditure Patterns and Aggregate Consumer Behavior, Some Experiments with Australian and New Zealand Data", The Economic Record, vol. 70, No. 210, Sep. 1994, pp. 278-291.

Chung, Charles; Internet Retailer, "Multi-channel retailing requires the cleanest data—but don't expect it from the customer", Jan./Feb. 2002.

Chen, et al., "Modeling Credit Card 'Share of Wallet': Solving the Incomplete Information Problem", New York University: Kauffman Management Center, http://www.rhsmith.umd.edu/marketing/pdfs_docs/seminarsspr05/abstract%20-%20chen.pdf, Spring 2005, 48 pages.

Chores & Allowances, "Do Kids Have Credit Reports?" Oct. 15, 2007, http://choresandallowances.blogspot.com/2007/10/do-kids-have-credit-reports.html, pp. 5.

CISCO: What-If Simulator, http://www.ciscocredit.com/whatifsim.html printed Oct. 12, 2012 in 2 pages.

CISCO: Your Mortgage Credit Reporting Specialists, http://www.ciscocredit.com/cc_Services.html#what printed Oct. 12, 2012 in 4 pages.

CreditToolkit, Digital Matrix Systems, as printed out Mar. 4, 2008, pp. 2.

CreditXpert, http://www.creditxpert.com/Products/individuals.asp printed Oct. 12, 2012 in 1 page.

"Credit Information Bureaus and 'CIBIL'", as printed from http://www.icicibank.com/cibil.html, Aug. 22, 2012, pp. 3.

CreditKarma: How Credit Karma Works, http://www.creditkarma.com/help/howitworks printed Oct. 12, 2012 in 2 pages.

Credit Source Online: The Secrets of Raising Your Credit Score, http://www.creditsourceonline.com/secrets-of-raising-your-credit-score.html printed Oct. 12, 2012 in 4 pages.

ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.

"Consumer Reports Finds American-Made Vehicles Close Reliability Gap with European-Made Vehicles-As Japanese Continue to Set New Benchmarks for the Industry." Consumer Reports, http://www.consumerreports.org/content/Pressroom/Presseng/PDF/eng0304rel.pdf, Apr. 2003, pp. 2.

Cowie, Norman, "Warning Bells & 'The Bust-Out'", Business Credit, Jul. 1, 2000, pp. 5.

Credit Card Management, "Neural Nets Shoot for Jackpot," Dec. 1995, pp. 1-6.

Credit Risk Management Report, Potomac, Mar. 9, 1998, vol. 8, No. 4.

CreditXpert Inc., CreditXpert 3-Bureau Comparison™, http://web.archive.org/web/20030608171018/http://creditxpert.com/CreditXpert%203-Bureau%20Comparison(TM)%20sample.pdf, 2002.

CreditXpert Inc., CreditXpert Credit Score & Analysis™, http://web.archive.org/web/20030611070058/http://www.creditxpert.com/CreditXpert%20Score%20&%20Analysis%20and%20Credit%20Wizard%20sample.pdf, 2000.

CreditXpert Inc., CreditXpert Essentials™, Advisor View—Experian on Jul. 7, 2003, http://www.creditxpert.com/cx_ess_app.pdf.

CreditXpert Inc., CreditXpert Essentials™, Advisor View—TransUnion on Oct. 10, 1999, http://www.creditxpert.com/cx_ess_app.pdf.

(56) References Cited

OTHER PUBLICATIONS

CreditXpert Inc., CreditXpert Essentials™, Applicant View—TransUnion on Oct. 10, 1999, http://www.creditxpert.com/cx_ess_app.pdf.
CreditXpert Inc., CreditXpert What-If Simulator™, http://web.archive.org/web/20030630132914/http://creditxpert.com/CreditXpert%20What-If%20Simulator(TM)%20sample.pdf, 2002.
Culhane, Patrick, "Data: Powerfully Linking Service and Profitability," Jul./Aug. 1996, Bank Management, vol. 72, No. 4, pp. 8-12.
Dash, Julekha, "Java on the Street," Software Magazine, vol. 17, No. 11, p. 27, Oct. 1, 1997.
"Database Marketing: A new Approach to the Old Relationships," Chain Storage Executive Edition, Dialogue, Sep. 1991, pp. 2.
Dataman Group, "Summarized Credit Statistics," http://web.archive.org/web/20010822113446/htto://www.datamangroup.com/summarized_credit.asp, Aug. 22, 2001.
David, Alexander, "Controlling Information Premia by Repackaging Asset-Backed Securities," The Journal of Risk and Insurance, Dec. 1997, 26 pages.
Davies, Donald W., "Applying the RSA Digital Signature to Electronic Mail," Computer, Feb. 1983, pp. 55-62.
Davis, Lisa, "Safety in Numbers," Business North Carolina, vol. 15, No. 9, p. 24, Sep. 1, 1995.
"Debt Settlement: Watch Video on how to Pay Your Debt Faster", http://www.debtconsolidationcare.com/debt-settlement.html printed Jan. 9, 2013 in 6 pages.
DeGruchy, et al., "Geodemographic Profiling Benefits Stop-Smoking Service;" The British Journal of Healthcare Computing & Information Management; Feb. 2007; 24, 7; pp. 29-31.
Demby, Elayne, "Special Report: Letting Consumers Know the Score—and More", Collections and Credit Risk, New York, Feb. 2003, vol. 8, Issue 2, p. 53, pp. 3.
Department of Real Estate, http://web.archive.org/web/20040619190012/http://www.dre.ca.gov/pubs_sub.htm, Jun. 19, 2004, in 5 pages.
Department of Real Estate, "Reference Book," http://web.archive.org/web/20041011063158/http://www.dre.ca.gov/pdf_docs/ref17.pdf, Jun. 18, 2004, Chapter 17, pp. 311-382.
Dillon, William R., John B. White, Vithala R. Rao, and Doug Filak; "Good Science"; Marketing Research; vol. 9, Iss. 4; Winter 1997; pp. 1-11.
"Divergent Paths in Early Pacts with Credit Bureaus"; American Banker; May 30, 2002; pp. 2; vol. 167; No. 3.
Dymi, Amilda, Need for Leads Spurs Some Upgrades, Origination News-Special Report, May 1, 2008, vol. vol. 17, Issue No. 8, Pages p. 24, Atlanta, Copyright 2008 SourceMedia, Inc.
Ecredable: Discover your AMP Credit Rating™, http://www.ecredable.com/how-it-works/amp-credit-rating printed Oct. 12, 2012 in 2 pages.
EFunds Corporation, "Data & Decisioning: Debit Report" printed Apr. 1, 2007, http://www.efunds.com/web/industry-solutions/financial-services/frm-debit-report/htm in 1 page.
Equifax: Consumer Bureau, http://www.equifax.co.in/financial-services/consumer_bureau/en_in#RiskScore printed Oct. 12, 2012 in 3 pages.
Ettorre, "Paul Kahn on Exceptional Marketing," Management Review, vol. 83, No. 11, Nov. 1994, pp. 48-51.
"Equifax and FICO Serve Consumers", Mar. 2001.
Experian, http://www.experian.com/ printed Oct. 12, 2012 in 1 page.
Experian Announces PLUS Score; Experian Press Release dated Oct. 16, 2003; Experian Global Press Office.
Experian and AGS Select SRC to Deliver Complete Marketing Solutions; Partnership First to Marketplace with Census2000 Data. PR Newswire. New York: Mar. 21, 2001. p. 1.
Experian-Scorex Announces New Credit Simulation Tool, PR Newswire, Costa Mesa, CA, Jun. 13, 2005.
Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
Fair Isaac Corporation, myFICO: Calculators: Credit Assessment, [online] [retrieved on Jun. 8, 2005] Retrieved from the internet http://www.myfico.com/CreditEducation/Calculators/CreditAssessnnent.aspx, 2005.
Fair Isaac Corporation, myFICO: Help: FICO Score Simulator, [online] [retrieved on Jun. 8, 2005] Retrieved from the internet http://www.myfico.com/Help/Simulator.aspx?fire=5, 2005.
Fair Isaac Corporation, myFICO: Products: Suze Orman's FICO Kit Platinum, [online] [retrieved on Jun. 8, 2005] Retrieved from the internet http://www.myfico.com/Products/FICOKit/Description.aspx, 2005.
Fair Isaac Corporation, myFICO: Products: Suze Orman's FICO® Kit Platinum: FICO Score Check, [online] [retrieved on Jun. 7, 2005] Retrieved from the internet http://www.myfico.com/Products/FICOKit/Sample03.html, 2005.
Fair Isaac Corporation, myFICO: Sample: FICO Score Simulator: "Max Out" Your Credit Cards, [online] [retrieved on Jun. 8, 2005] Retrieved from the internet http://www.myfico.com/Content/Samples/Sample_ScoreSimulatorResults.asp?Simulation=4&ReportID.
Fair Isaac Corporation, myFICO: Sample: FICO Score Simulator: Miss Payments, [online] [retrieved on Jun. 8, 2005] Retrieved from the internet http://www.myfico.com/Content/Samples/Sample_ScoreSimulatorResults.asp?miss payment=radiobutton&Simulation=.
Fair Isaac Corporation, myFICO: Sample: FICO Score Simulator: Pay Down Delinquent Balances First, [online] [retrieved on Jun. 8, 2005] Retrieved from the internet http://www.myfico.com/Content/Samples/Sample_ScoreSimulatorResults.asp?textfieldCC=750.
Fair Isaac Corporation, myFICO: Sample: FICO Score Simulator: Suggested Best Action, [online] [retrieved on Jun. 8, 2005] Retrieved from the internet http://www.mvfico.com/Content/Samples/Sample_ScoreSimulatorResults.asp?Simulation=111&ReportID=1&Pr.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
Fickenscher, Lisa, "Merchant American Express Seeks to Mine its Data on Cardholder Spending Patterns," American Banker, vol. 162, Issue 56, Mar. 24, 1997, pp. 1-2.
Financial Engines, http://corp.financialengines.com/ printed Oct. 12, 2012 in 1 page.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
Forrest, David, "Achieving Perfect Credit—Lesson 3: Assessing Your Situation," http://www.fool.com/senninars/ev/index.htm?sid=0029&lid=300, 2002, copyright 1995-2002, in 7 pages.
Frank, John., "Scoring Takes on a New Meaning," Credit Card Management, Sep. 1996, vol. 9, No. 6, pp. 155-159.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_to_pieasset.html, http://www.fundmanagersoftware.com/demo2.html.
GAO-03-661, Best Practices: Improved Knowledge of DOD Service Contracts Could Reveal Significant Savings, GAO, Jun. 2003.
Georges, et al., "KDD'99 Competition: Knowledge Discovery Contest", SAS Institute, 1999, 6 pages.
Gibbs, Adrienne; "Protecting Your Children from Identity Theft," Nov. 25, 2008, http://www.creditcards.com/credit-card-news/identity-ID-theft-and-kids-children-1282.php, pp. 4.
Giudici, Paolo, "Bayesian Data Mining, with Application to Benchmarking and Credit Scoring," Applied Stochastic Models in Business and Industry, 2001, vol. 17, pp. 69-81.

(56) References Cited

OTHER PUBLICATIONS

"Green Tree Investors May Go to Court," Mar. 4, 1998, http://web.archive.org/web/20001101080021/http://www.channel4000.com/news/stories/news-980304-120038.html.
"Groups Demand Government Action on Online Marketing to Children," American Marketplace, Apr. 4, 1996, vol. 17, No. 7, p. 53.
Hartfeil, Guenther, "Bank One Measures Profitability of Customers, Not Just Products," Journal of Retail Banking Services, Aug. 1996, vol. 18, No. 2, pp. 23-29.
Healy, Thomas J., "The New Science of Borrower Behavior," Mortgage Banking, vol. 58, No. 5, pp. 26-35, Feb. 1, 1998.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug. 3, 2014 in 2 pages.
Ideon, Credit-Card Registry that Bellyflopped this Year, Is Drawing some Bottom-Fishers, The Wall Street Journal, Aug. 21, 1995, pp. C2.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
"Industry News, New Technology Identifies Mortgage Fraud: Basepoint Analytics Launches FraudMark", Inman News, American Land Title Association, Oct. 5, 2005, pp. 1.
Instant Access to Credit Reports Now Available Online with DMS' CreditBrowser-based system also Simplifies Credit Decisioning and Offers a Central Point of Control, Business Wire, p. 0264, Dallas, May 23, 2000.
Internal Revenue Service Data Book 2000, Issued Aug. 2001, Revised May 2003.
Jacob et al., A Case Study of Checking Account Inquiries and Closures in Chicago, The Center for Financial Services Innovation, Nov. 2006.
"JPMorgan Worldwide Securities Services to Acquire Paloma's Middle and Back Office Operations," Webpage printed from http://www.jpmorgan.com on Apr. 1, 2009.
"Judging Credit: Consumers Need Better Finance Tools", News Journal, Daytona Beach, FL, Dec. 28, 2002.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Kulkosky, Edward, "Credit Scoring Appeal Transcends Underwriting," American Banker, vol. 161, No. 93, p. 8, May 15, 1996.
Lan, Joe, "The Top Portfolio Management Software," http://www.aaii.com/computerizedinvesting/articie/the-top-portfolio-management-software, Includes Discussion thread, Fourth Quarter 2011, pp. 17.
LeadVerifier: Why Should You Use LeadVerifier?, downloaded from www.leadverifier.com/LeadVerifier_Why.asp, dated Feb. 7, 2006 on www.archive.org.
Lee, W.A., "Experian Eyes Payments, Mulls Deals" American Banker: The Financial Services Daily, 2pgs., New York, NY, May 30, 2003.
Lee, W.A.; "Experian, on Deal Hunt, Nets Identity Theft Insurer", American Banker: The Financial Services Daily, Jun. 4, 2003, New York, NY, 1 page.
Lee, W.A.; "Fair Isaac Taps Institutions for Credit Score Distribution", American Banker: The Financial Services Daily, New York, NY, Apr. 9, 2002, vol. 167, Issue 67, 1 page.
Lee, W.A., "Money, Quicken, and the Value of Alliances", American Banker: The Financial Services Daily, 2pgs., New York, NY, Jul. 28, 2003.
LendingTree.com, "Lender Ratings & Reviews," http://web.archive.org/web/20091015043716/http://www.lendingtree.com/lender-reviews/, Oct. 15, 2009, in 21 pages.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
LifeLock, "How LifeLock Works," http://www.lifelock.com/lifelock-for-people printed Mar. 14, 2008 in 1 page.
LifeLock, "Identity Theft F.A.Q." http://web.archive.org/web/20080215093614/http://www.identitytheftkiller.com/promo/faq.php, Feb. 15, 2008, pp. 8.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, Various Pages, www.lifelock.com/, 2007.
Littwin, Angela, "Beyond Usury: A Study of Credit-Card Use and Preference Among Low-Income Consumers", Texas Law Review, vol. 86, No. 3, pp. 451-506; Feb. 2008.
Loshin, Intelligent Enterprise: Better Insight for Business Decisions, "Value-Added Data: Merge Ahead", Feb. 9, 2000, vol. 3, No. 3, 5 pages.
Lund, Graham, "Credit Bureau Data: Maximizing the Benefits," Credit Management, May 2004, ProQuest Central, pp. 44-45.
McManus et al.; "Street Wiser," American Demographics; ABI/Inform Global; Jul./Aug. 2003; 25, 6; pp. 32-35.
McNamara, Paul, "Start-up's pitch: The Envelope, please," Network World, Apr. 28, 1997, vol. 14, No. 17, p. 33.
Merugu, et al.; "A New Multi-View Regression Method with an Application to Customer Wallet Estimation," The 12th International Conference on Knowledge Discovery and Data Mining, Aug. 20-23, 2006, Philadelphia, PA.
Miller, Margaret, "Credit Reporting Systems Around the Globe: The State of the Art in Public and Private Credit Registries", Jun. 2000, pp. 32, htto://siteresources.worldbank.org/INTRES/Resources/469232-1107449512766/Credit_Reporting_Systems_Around_the_Globe.pdf.
Montgomery County Housing Report, Residential Market Report, Jan. 2004 in 6 pages.
MyFico, http://www.myfico.com/products/ficoone/sample/sample_scoresimulator.aspx printed Oct. 12, 2012 in 3 pages.
"New for Investors: Asset Allocation, Seasoned Returns and More," Prosper, http://blog.prosper.com/2011/10/27/new-for-investors-asset-allocation-seasoned-returns-and-more/, pp. 4.
Novack, Janet, "The Coming Fight over FICO," Forbes, Dec. 18, 1995, vol. 156, No. 14, p. 96.
Occasional CF Newsletter; http://www.halhelms.com/index.cfm?fuseaction=newsletters.oct1999; Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Perlich et al., "High Quantile Modeling for Customer Wallet Estimation with Other Applications," The 13th International Conference on Knowledge Discovery and Data Mining, Aug. 12-15, 2007, San Jose, CA.
"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997.(retrieved Nov. 7, 2013) in 2 pages.
Powerforms: Declarative Client-Side for Field Validation, ISSN 1386-145x, Dec. 2000.
PR Web: Press Release Newswire, Anchor Launches LeadVerifier to Verify, Correct and Enhance Internet Leads, Jul. 19, 2005, pp. 2 pages, Farmingdale, NY.

(56) References Cited

OTHER PUBLICATIONS

"PremierGuide Announces Release 3.0 of Local Search Platform", Business Wire, Mar. 4, 2004, Palo Alto, CA, p. 5574.
"ProClarity and Microsoft to Host Free Seminar Series on Retail Analytics with Independent Analyst Firm-ProClarity to Share Best Forrester Analysts to Discuss Trends and the Future of the Retail"; Business Wire; pp. 2; Aug. 13, 2003.
"Qualifying for Debt Settlement", http://www.certifieddebt.com/debt/settlement-qualifications.shtml.printed Jan. 9, 2013 in 2 pages.
Quantix Software, "Investment Account Manager," available at https://www.youtube.com/watch?v=1UwNTEER1Kk, as published Mar. 21, 2012.
Ratner, Juliana, "GMAC to Sell Risk-Management Advice; Target is 150 Biggest Home Loan Servicers," American Banker, vol. 161, No. 53, p. 16, Mar. 19, 1996.
"Recognition and use by Appraisers of Energy-Performance Benchmarking Tools for Commercial Buildings," prepared by the Institute for Market Transformation, NYSERDA, Feb. 2003, pp. 6.
"Resolve Debt for Less: With Help from Freedom Financial" http://www.debtsettlementusa.com/ printed Jan. 9, 2013 in 6 pages.
"RF/Spectrum to Offer Score," National Mortgage News, Special Report; Credit Reporting & Scaring, Jun. 9, 1997, p. 40.
Risk Monitors, "New GMAC Unit Focuses on Portfolio Risk," PR Newswire, Mar. 13, 1996, pp. 2. http://www.thefreelibrary.com/NEW+GMAC+UNIT+FOCUSES+0N+PORTFOLIO+RISK-a018092212.
Rosset et al., "Wallet Estimation Models", IBM TJ Watson Research Center, 2005, Yorktown Heights, NY, pp. 12.
Rossi et al.; "The Value of Purchasing History Data in Target Marketing"; Marketing Science, Apr. 1996, vol. 15, No. 4, pp. 321-340.
Saunders, A., "Data Goldmine," Management Today, London: Mar. 1, 2004, 6 pages.
Screenshot for Investment Account Manager v.2.8.3, published at http://www.aaii.com/objects/get/1642.gif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
"Shareholders Sue Green Tree Financial," Dated Dec. 4, 1997, http://web.archive.org/web/20000419070107/http://www.wcco.com/news/stories/news-971204-092238.html.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Smith, Richard M., "The Web Bug FAQ", Nov. 11, 1999, Version 1.0, pp. 4.
Stanton, T.H., "Credit Scoring and Loan Scoring as Tools for Improved Management of Federal Credit Programs", Financier, Philadelphia, Summer 1999, vol. 6, 36 pages.
Steele, Georgia, "Fair, Isaac Seeks Mortgage Tech Opportunities," National Mortgage News, Special Report; B& C Lending, Mar. 23, 1998, p. 34.
Stein, Benchmarking Default Prediction Models: Pitfalls and Remedies in Model Validation, Moody's KMV, Revised Jun. 13, 2002, Technical Report #020305; New York.
Sullivan, Deidre, "Scoring Borrower Risk," Mortgage Banking, Nov. 1994, vol. 55, No. 2, pp. 94-98.
Sumner, Anthony, "Tackling the Issue of Bust-Out Fraud", Retail Banker International, Jul. 24, 2007, pp. 4.
TARGUSinfo: Lead Verification, Verify Your Leads With Unique Accuracy and Ease, downloaded from www.tamusinfo.com/solutions/verify/Default.asp, as printed Aug. 1, 2006.
TARGUSinfo: Solutions: Services: Verify Express—Verify, Correct and Enhance Customer Provided Data, downloaded from http://web.archive.org/web/20051028122545/http://www.targusinfo.com/solutions/services/verify/, Oct. 28, 2005, as printed Apr. 30, 2011, 27 pgs.
Taylor, Marshall, "Loan-Level Pricing Draws Interest From Investors," Real Estate Finance Today, Jul. 7, 1997, vol. 14, No. 14. p. 10.
"The Best of the Best," Mortgage Technology, Nov. 1, 2003, vol. 10, No. 8, pp. 34-53.
TransUnion: VantageScore®—Consistency in Credit Scoring, http://www.transunion.com/personal-credit/credit-reports/vantage-score. page printed Oct. 12, 2012 in 2 pages.
Trulia, "Trulia Estimates," http://www.trulia.com/trulia_estimates/, printed Feb. 18, 2014 in 2 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Tuman, Diane, "What is a Zestimate?" Apr. 10, 2013, http://www.zillow.com/wikipages/What-is-a-Zestimate/, printed Feb. 18, 2014 in 5 pages.
Vamosi, Robert, "How to Handle ID Fraud's Youngest Victims," Nov. 21, 2008, http://news.cnet.com/8301-10789_3-10105303-57.html.
Verstraeten, Geert, Ph.D.; Issues in predictive modeling of individual customer behavior: Applications in targeted marketing and consumer credit scoring; Unversiteit Gent (Belgium) 2005.
Wahl, Martin, "The Stampede to Subprime," Mortgage Banking, vol. 58, No. 1, p. 26(7), Oct. 1, 1997.
Watts, Craig, "Consumers Now Can Know What Loan Rate Offers to Expect Based on Their FICO Credit Score at MyFICO.com," Mar. 6, 2002, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, http://www.myfico.com/PressRoom/PressReleases/2002_05_21.aspx.
Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
West, David, "Neural Network Credit Scoring Models", Computers & Operations Research, vol. 27, 2000, pp. 1131-1152.
"What is MOSAIC™;" from www.appliedgeographic.com/mosaic.html dated Feb. 15, 2004 as accessed from http://web.archive.org/web/20040215224329/http://www.appliedgeographic.com/mosaic.html, Mar. 9, 2012.
White, Ron, "How Computers Work", Millennium Edition, Que Corporation, Indianapolis, IN, Sep. 1999. [Uploaded in 2 parts].
Wyatt, Craig, "Usage Models just for Merchants," Credit Card Managemen, Sep. 1995, vol. 8, Issue 6, pp. 1-4.
Wyner, "Customer valuation: Linking behavior and economics", Aug. 1996, Marketing Research: A Magazine of Management & Applications vol. 8, No. 2 pp. 36-38.
Yang, et al., "An Analysis of the Ex Ante Probabilities of Mortgage Prepayment and Default," Real Estate Economics, vol. 26, No. 4, pp. 651-676, Dec. 1998.
Yücesan et al., "Distributed web-based simulation experiments for optimization", Simulation Practice and Theory 9 (2001), pp. 73-90.
Zimmerman et al., "A Web-Based Platform for Experimental Investigation of Electric Power Auctions," Decision Support Systems 24 (1999), pp. 193-205.
Declaration of Paul Clark, DSc. for Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.

(56) References Cited

OTHER PUBLICATIONS

First Amended Complaint in Civil Action No. 2:12-cv-511-JRG (*Rpost Holdings, Inc. and Rpost Communications Limited V. Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited V. Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
Official Communication in Canadian Patent Application No. 2,381,349, dated May 17, 2013.
Official Communication in Canadian Patent Application No. 2,381,349, dated Jul. 31, 2014.
International Preliminary Examination Report in International Application No. PCT/US00/21453 dated, Jun. 26, 2001.
International Search Report and Written Opinion, PCT/US2008/064594, dated Oct. 30, 2008.
International Preliminary Report and Written Opinion in PCT/US2008/064594, dated Dec. 10, 2009.
International Search Report and Written Opinion for Application No. PCT/US09/60393, dated Dec. 23, 2009.
International Search Report and Written Opinion for Application No. PCT/US2013/052342, dated Nov. 21, 2013.
International Preliminary Report on Patentability for Application No. PCT/US2013/052342, dated Feb. 5, 2015.
Downing, Jr.; Richard, "Changes to the Credit Reporting Act," Mortgage Banking, Apr. 1, 1998, vol. 58, No. 7, pp. 82-85.
Fair Isaac Corporation, myFICO: Products: Suze Orman's FICO®. Kit Platinum: Look for Errors, as printed Jun. 7, 2005 in 3 pages http://www.myfico.com/Products/FICOKit/Sample02.html.
Fair Isaac Corporation, myFICO: Products:Suze Orman's FICO® Kit Platinum: Your FICO Score, as printed Jun. 7, 2005 in 1 page, http://www.myfico.com/Products/FICOKit/Sample01.html.
Fair Isaac Corporation, myFICO: Sample: FICO Score Simulator, as printed Jun. 8, 2005 in 5 pages, http://www.myfico.com/Content/Samples/Sample_ScoreSimulator.asp.
Fair Isaac Corporation, myFICO: Sample: FICO Score Simulator: Pay Down the Balances on All Your Credit Cards, as printed Jun. 8, 2005 in 2 pages, http://www.myfico.com/Content/Samples/Sample_ScoreSimulatorResults.aso?textfieldCC1=750&SelectMonths=1&PayOption=radiobutton&textfieldCC=750&Simulation=3&ReportID=1&ProductID=&Execute.x=57&Execute.y=22.
Fair Isaac Corporation, myFICO: Sample: FICO Score Simulator: Pay Your Bills on Time, as printed Jun. 8, 2005 in 2 pages, http://www.myfico.com/Content/Samples/Sample_ScoreSimulator-Results.asp?select1=1&Simulation=1&ReportID=1&ProductID=&PayBillsOnTime.x=93&PayBillsOnTime.y=23.
Fair Isaac Corporation, myFICO: Sample: FICO Score Simulator: Seek New Credit, as printed Jun. 8, 2005 in 2 pages, http://www.myfico.com/Content/Samples/Sample_ScoreSimulatorResults.asp?new_credit=radiobutton&textfield5A=3000&tectfield5B=&textfield5C=&Simulation=5&ReportID=1&ProductID=&NewCredit.x=62&NewCredit.y=20.
Fair Isaac Corporation, myFICO: Sample: FICO Score Simulator: Transfer Credit Card Balances, as printed Jun. 8, 2005 in 2 pages, http://www.myfico.com/Content/Samples/Sample_ScoreSimulator-Results.asp?textfield222=5000&Simulation=6&ReportID=1&ProductID=&TransferBalance.x=86&TransferBalance.y=24.
FamilySecure.com; "Identity Theft Protection for the Whole Family | FamilySecure.com" http://www.familysecure.com/, as retrieved on Nov. 5, 2009.
International Preliminary Report on Patentability and Written Opinion for Application No. PCT/US2005/041814, dated Aug. 29, 2007.

Jones, Yvonne, "Consumers Understood the Basics but Could Benefit from Targeted Educational Efforts," GAO U.S, Government Accountability Office, Mar. 16, 2005, pp. 128, http://www.gao.gov/products/GAO-05-223.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Merriam Webster's Collegiate Dictionary, 10th Edition, 1999, p. 79.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
Wood, Greg, "Top Streaming Technologies for Data Lakes and Real-Time Data", http://blog.zaloni.comitop-streaming-technologies-for-data-lakes-and-real-time-data, Sep. 20, 2016 in 3 pages.
Apte, et al., "A Probabilistic Estimation Framework for Predictive Modeling Analytics," IBM Systems Journal, 2002, vol. 41, No. 3, pp. 438-448.
"Fraud Alert | Learn How". Fight Identity Theft. http://www.fightidentitytheft.com/flag.html, accessed on Nov. 5, 2009.
Gopalan, R., "Panning for Sales-Force Gold", Intelligent Enterprise, Dec. 21, 1999, vol. 2, No. 18, pp. 38-43.
LifeLock, "Personal Identity Theft Protection & Identity Theft Products," http://www.lifelock.com/lifelock-for-people, accessed Nov. 5, 2007.
"NewsHound: NewsHound User Guide Internet E-Mail", of record as early as May 2, 1997, pp. 11.
"Normalize," http://www.merriam-webster.com/dictionary/normalize printed Jun. 14, 2010.
Schmidt, David, "Environmental Impact: The Changing Credit Reporting Landscape," Business Credit, Apr. 2003, vol. 105, No. 4, pp. 14.
Sealey, Geraldine, "Child ID Theft Can Go Unnoticed for Years", http://abcnews.go.com/US/story?id=90257, Sep. 12, 2003 in 9 pages.
TheMorningCall.Com, "Cheap Ways to Foil Identity Theft," www.mcall.com/business/columnists/all-karp.5920748jul01,0 . . . , published Jul. 1, 2007.
Todorova, Aleksandra, "Protecting Your Child's Identity", Smart Money, Published Aug. 2, 2007, pp. 1-5.
Application as filed in U.S. Appl. No. 10/452,155, dated May 30, 2003.
Preliminary Amendment in U.S. Appl. No. 10/452,155, dated Sep. 15, 2003.
Office Action in U.S. Appl. No. 10/452,155, dated Jan. 25, 2008.
Examiner Interview Summary in U.S. Appl. No. 10/452,155, dated Jul. 23, 2008.
Office Action in U.S. Appl. No. 10/452,155, dated Oct. 2, 2008.
Examiner Interview Summary in U.S. Appl. No. 10/452,155, dated Jan. 14, 2009.

(56) References Cited

OTHER PUBLICATIONS

Examiner Interview Summary in U.S. Appl. No. 10/452,155, dated Jul. 21, 2009.
Notice of Allowance in U.S. Appl. No. 10/452,155, dated Aug. 19, 2009.
International Search Report for Application No. PCT/US2005/041814, dated Aug. 29, 2007.
International Search Report and Written Opinion for Application No. PCT/US2018/016258, dated May 16, 2018.
International Search Report and Written Opinion for Application No. PCT/US2018/061877, dated Mar. 8, 2019.
Application as filed in U.S. Appl. No. 09/790,453, dated Feb. 22, 2001.
Office Action in U.S. Appl. No. 09/790,453, dated Jan. 20, 2006.
Office Action in U.S. Appl. No. 09/790,453, dated Jul. 11, 2006.
Office Action in U.S. Appl. No. 09/790,453, dated Dec. 1, 2006.
Office Action in U.S. Appl. No. 09/790,453, dated May 10, 2007.
Office Action in U.S. Appl. No. 09/790,453, dated Mar. 21, 2008.
Application as filed in U.S. Appl. No. 10/183,135, filed Jun. 25, 2002.
Office Action in U.S. Appl. No. 10/183,135, dated Oct. 22, 2007.
Final Office Action in U.S. Appl. No. 10/183,135, dated Apr. 14, 2008.
Office Action in U.S. Appl. No. 10/183,135, dated Aug. 21, 2008.
Office Action in U.S. Appl. No. 10/183,135, dated Feb. 26, 2009.
Office Action in U.S. Appl. No. 10/183,135, dated Aug. 18, 2009.
Office Action in U.S. Appl. No. 10/183,135, dated Feb. 19, 2010.
Final Office Action in U.S. Appl. No. 10/183,135, dated Sep. 22, 2010.
Office Action in U.S. Appl. No. 10/183,135, dated Mar. 25, 2011.
Notice of Allowance in U.S. Appl. No. 10/183,135, dated Aug. 15, 2011.
Office Action in U.S. Appl. No. 11/169,769, dated Mar. 24, 2010.
Application as Filed in U.S. Appl. No. 11/363,984, dated Feb. 27, 2006.
Office Action in in U.S. Appl. No. 11/363,984, dated Dec. 26, 2008.
Langer, Jeffrey I. et al., "Creditor List Screening Practices: Certain Implications Under the Fair Credit Reporting Act and the Equal Credit Opportunity Act," The Business Lawyer; vol. 43, pp. 1123-1141, May 1988.

\* cited by examiner

MASTER PRE-SCREEN LIST 240

| CONSUMER PIN | CONSUMER NAME | CLIENT1/ CAMPAIGN1 | CLIENT1/ CAMPAIGN2 | ... | CLIENT N/ CAMPAIGN M | APPENDED CONSUMER DATA |
|---|---|---|---|---|---|---|
| 101332 | John Doe | X | X | | | Mailing Address, Phone Number, Credit Score, Credit Balance |
| 127691 | Mary Doe | X | X | | | Mailing Address, Phone Number, Credit Score, Credit Balance |
| 032596 | Henry Lee | X | X | | | Phone Number, Credit Balance |
| 558971 | Tom Smith | X | | | X | Mailing Address, Credit Score, Payments left on Auto Loan |
| 872361 | Jill Johnson | X | | | | Mailing Address, Credit Score |

FIG. 3

DAILY OCCURRENCES LIST

| INFORMANT ID | OCCURRENCE TYPE | CONSUMER NAME | CONSUMER PIN |
|---|---|---|---|
| ABC BANK | | | |
| | Mortgage Inquiry | Tom Smith | 558971 |
| | | Jill Johnson | 872361 |
| | | Alan Brown | 058219 |
| | Home Equity Inquiry | John Doe | 101173 |
| | | Tina Doe | 689275 |
| | | Grant Perkins | 121171 |
| CORNER AUTO LOT | | | |
| | Auto Equity Inquiry | Donna Brown | 259937 |
| | | Sara Bronson | 091885 |
| | | | |
| | | | |
| | | | |
| | | | |
| | | | |
| | | | |

FIG. 4

PROSPECT TRIGGERS HISTORICAL LOG

270

| CONSUMER PIN | CLIENT/CAMPAIGN ID | TRIGGER NOTIFICATION SENT |
|---|---|---|
| 509937 | Bank123/ Home Equity 1 | 06-17-04 |
| 509937 | CarsRUs/ Fall 2004 Auto Loan | 08-07-04 |
| 173102 | CarsRUs/ Fall 2004 Auto Loan | 12-01-03 |
| 173102 | Bank123/ Home Equity 2 | 06-22-04 |
| 173102 | AutoNow/ Pre-Sale Mailer | 09-24-04 |
| 831924 | Bank123/ Home Equity 1 | 11-05-04 |
| 831924 | ABCBank/ Platinum Phone Campaign | 10-29-04 |
| 010100 | ABCBank/ Gold Phone Campaign | 6-23-04 |
| 830556 | Bank123/ Home Equity 1 | 10-11-04 |
| 830556 | CarsRUs/ Fall 2004 Auto Loan | 11-27-04 |
|  |  |  |
|  |  |  |

FIG. 5

AUTOMATED ANALYSIS OF DATA TO GENERATE PROSPECT NOTIFICATIONS BASED ON TRIGGER EVENTS

PRIORITY CLAIM

This application is a continuation of U.S. patent application Ser. No. 11/231,339, filed Sep. 20, 2005, issued as U.S. Pat. No. 8,732,004, and titled AUTOMATED ANALYSIS OF DATA TO GENERATE PROSPECT NOTIFICATIONS BASED ON TRIGGER EVENTS, which claims the benefit of priority under 35 U.S.C. § 119(e) of U.S. Provisional Application No. 60/612,313, filed on Sep. 22, 2004, and titled AUTOMATED ANALYSIS OF CONSUMER DATA TO GENERATE PROSPECT NOTIFICATIONS BASED ON TRIGGER EVENTS, the entireties of which are hereby both incorporated by reference herein into this application.

FIELD OF THE INVENTION

One embodiment of the invention relates to systems and methods for monitoring changes in a database and, in particular, for monitoring changes to a selected subset of records in the database.

BACKGROUND OF THE INVENTION

Consumer credit databases, such as those maintained by companies who calculate credit scores, are typically enormous in size and are continually updated to reflect very recent consumer activity details for hundreds of millions of consumers. Many lenders, merchants, and other providers of credit-related products desire to exploit the wealth of data available in these databases. In particular, credit-providers would find it very advantageous to exploit the databases in order to improve or replace, at least in part, their blanket marketing campaigns, in which the credit-providers send out advertisements, make cold phone calls, or otherwise contact large numbers of consumers, based on general selection criteria, with offers of their credit-related products and/or services, in hopes that at least a portion of the contacted consumers will respond to their offers. Unfortunately, such blanket advertisement campaigns often reach consumers who are not eligible for the offers or who are not actively interested in extensions of credit and are therefore less motivated to seriously consider a lender's offer. Industry research indicates that less than 0.1% of contacts made in such blanket campaigns result in a sale.

Information in the consumer credit databases could help the credit-providers identify potentially interested and credit-worthy customers. However, several technical, database-related obstacles have kept credit providers from fully utilizing the potential of the information available from the consumer credit databases. For one, the consumer credit databases are typically organized and optimized for quick extraction of simple bits of information about individual consumers, such as individual credit scores, while allowing the database to continually insert incoming consumer data into its records.

Out of an abundance of caution, credit-providers often prefer to have complex, computationally-expensive, and time-consuming analyses and classifications performed on the database records as part of their identification of prospective customers, in an effort to avoid making the firm offer of credit that is mandated by the Fair Credit Reporting Act (FCRA) to consumers who may later in the process be revealed as being undesirable credit risks.

Furthermore, even if a solution could be found to reconcile the conflicting needs for a constantly available database of individual consumer credit-related activity versus one that allows for time-consuming and complex analytical classifications of consumers, neither model allows the credit provider to make use of newly received information from the last twenty-four hours to identify consumers who are both eligible for a firm offer of credit and are currently interested in obtaining additional credit.

SUMMARY OF THE INVENTION

Embodiments of systems and methods are described for automatically analyzing information from an online consumer credit database in order to identify consumers who both meet a credit-provider's criteria for making a firm offer of credit and are also deemed, based on extremely recent indications in the database, known as trigger events, to be currently interested in obtaining credit. The systems and methods further generate timely notifications of the identified prospective customers to the credit-provider. In certain embodiments, the prospect notifications may be generated daily, multiple times per day, or at another advantageous frequency, and may thus more accurately identify consumers who are likely to be currently interested in specific products and/or services.

Systems and methods are described for identifying a subset of interest from a general population and for monitoring a database of daily activity logs associated with the general population in order to identify database entries indicative of an occurrence of a pre-defined trigger event that is associated with a member of the subset of interest. In particular, systems and methods are described that allow a massive database of daily activity logs to be monitored to identify trigger events that have occurred within the past twenty-four hours or other very recent time period. Embodiments are described that may be advantageously used by a provider of credit-related products and/or services who wishes to accurately target prospective customers, identified by the system, based on occurrence of a trigger event, as being in a decision-making phase of credit shopping, for purposes of making a timely and targeted offering relevant to the customers' current activities.

In one embodiment, where clients are entities such as lenders and other providers of credit-related products and services, a subset of the consumer population is identified as meeting a client's set of pre-screen criteria that define, for example, consumers to whom the client would be willing to make a firm offer of credit. Daily credit-related events associated with members of the subset are monitored so that when a pre-determined event, such as a credit-related inquiry, takes place with respect to a member of the subset, the lender is notified and may take a desired action. For example, the lender may wish to present an offer of pre-approved credit to the identified member(s) of the population subset for whom a trigger event has been identified.

An embodiment of an electronic system for providing notifications about credit-related events is described. The system includes: an electronic list of consumers, a database of credit-related information, an electronic set of campaign criteria, and an automated selection system. The electronic list of consumers identifies consumers who have been pre-screened to be eligible for a firm offer of credit. The database of credit-related information includes data about consumers that is updated at least daily to include information about events that have occurred since a last update of the database, wherein the events include events of at least one of the following types: newly-established consumer credit relationships, consumer credit inquiries, and consumer line-of-credit events. The electronic set of campaign criteria describes at least one type of event that is of interest to an entity associated with an offer of credit. The automated selection system is configured to monitor the database at least daily and to identify consumers on the list who are associated with newly-added inquiries or new credit relationships which are of the at least one type of event described in the set of campaign criteria. In some embodiments, the system includes a prospect list generation system that receives a list of the consumers identified each day by the selection system and that makes the list available to the entity associated with the offer of credit.

An embodiment of a computer-implemented method of providing notifications about credit-related occurrences is described. The method comprises: (a) obtaining an electronic list of consumers who meet a set of pre-screen criteria for an offer of credit; (b) monitoring a database of consumer credit-related events to identify credit-related occurrences associated with one or more consumers on the list, wherein the occurrences have been added to the database within a time period of interest; and (c) providing a notification of the consumers associated with the identified credit-related occurrences.

An embodiment of a method of providing notifications about credit-related events is described. The method includes obtaining a list of names of consumers who meet a set of pre-screen criteria for a credit offer and receiving information that identifies one or more types of credit-related events as indicating that a consumer is currently interested in obtaining credit. The method further includes monitoring a database of consumer credit-related events that is updated at least daily to identify credit-related events associated with one or more names on the list, wherein the events have been added to the database within a time period of interest, and providing a notification of the names associated with the identified credit-related events.

An embodiment of a system for providing notifications about credit-related events is described. The system includes: a pre-screen list generation system, a database of credit-related information about consumers, a set of campaign criteria, and a prospect list generation system. The pre-screen list generation system is configured to receive from a credit-provider a set of eligibility criteria. The pre-screen list generation system is further configured to use the eligibility criteria to identify consumers listed in a consumer database who are eligible for a firm offer of credit from the credit-provider and to generate a pre-screen list of the identified names. The database of credit-related information about consumers is updated at least daily to include information about events that have occurred since a last update of the database, wherein the events include newly-established consumer credit relationships and inquiries about a consumer's credit score. The set of campaign criteria describes at least one type of event that is of interest to the credit-provider as being indicative of a consumer's current interest in obtaining credit. The selection system is configured to monitor the database and capture results at least daily and to identify consumers on the pre-screen list who are associated with one or more events that have been added to the database since a last monitoring, the events being of a type described in the campaign criteria. The prospect list generation system receives a list of the consumers identified each day by the selection system and makes the list available to the entity wishing to offer credit.

Neither this summary nor the following detailed description defines or limits the invention. The invention is defined by the claims.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention.

FIG. 3 depicts an example of a master pre-screen list.

FIG. 4 depicts an example of a list of daily occurrences.

FIG. 5 depicts an example of a prospect triggers historical log.

DETAILED DESCRIPTION OF THE PREFERRED EMBODIMENT

The following description discloses several embodiments of a computer-implemented system for automatically analyzing large quantities of credit-related consumer data on a daily or other frequent basis in accordance with processing instructions that are customized to suit a client's promotional campaign. In a preferred embodiment, the system is configured to generate a daily list (or multiple lists per day) of consumer names and related data useful for efficiently executing an advertising campaign based on recent inputs to a database of consumer activity.

Figure 1A:
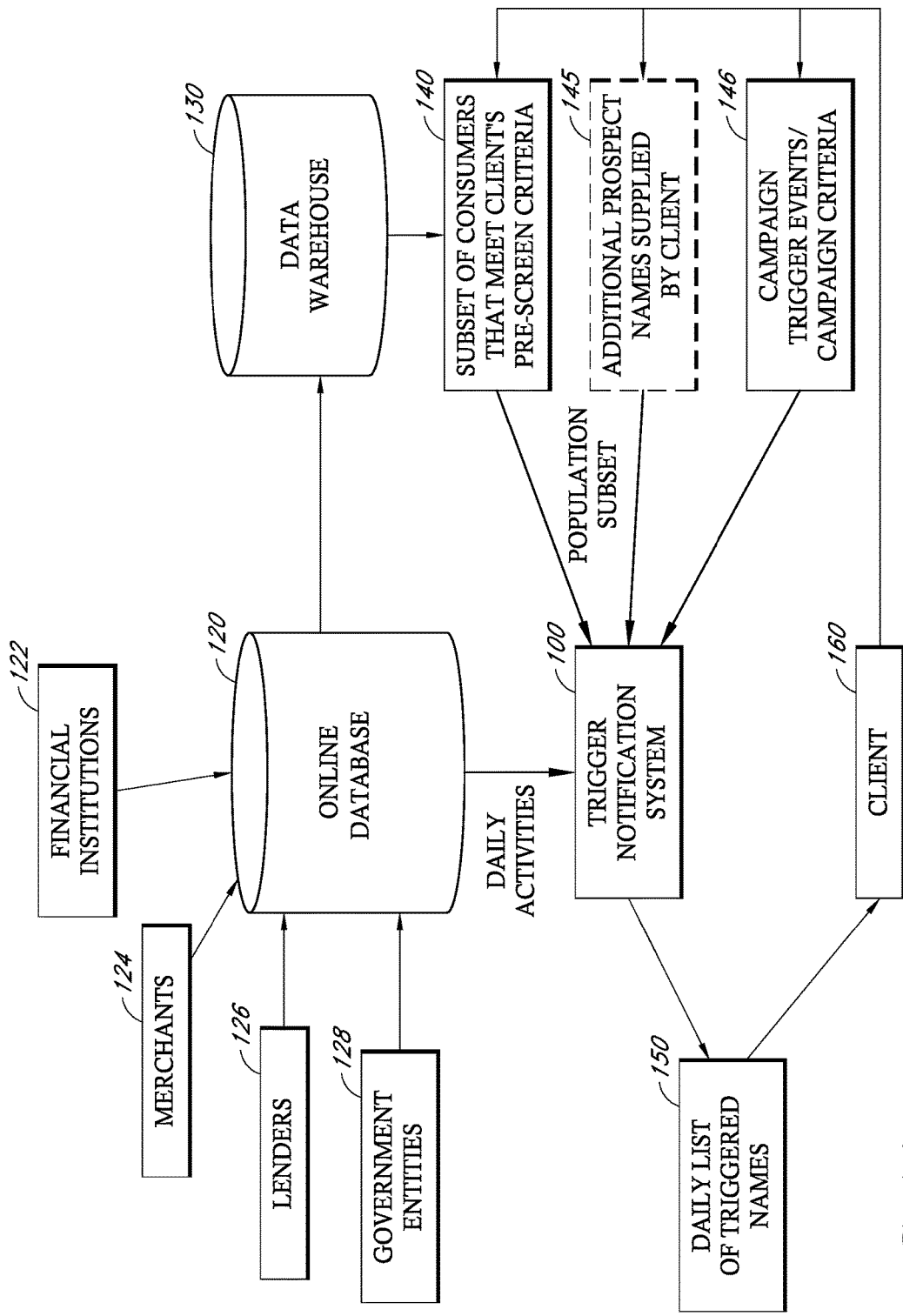
FIG. 1A is a block diagram that depicts a high-level overview of one embodiment of a system for generating prospect notifications.

FIG. 1A is a block diagram that depicts a high-level overview of one embodiment of a system for automatically analyzing consumer data to generate prospect notifications based on trigger events. Credit-providers may want to offer credit to consumers with whom they do not currently have a business relationship. In particular, credit providers would like to identify consumers who are both credit-worthy and currently interested in obtaining additional credit. The credit-providers undertake advertising campaigns to reach such consumers in which a specific type of credit offer is promoted. Although a credit-provider can currently purchase or otherwise acquire lists of consumer names and their contact information, these names may not represent likely prospects for the credit-provider's offers if the consumers on the list are not currently interested in obtaining additional credit.

However, if the credit-provider is able to identify one or more consumer activities that signal a greater likelihood of interest in obtaining credit on the part of a consumer who is in the market for credit, and if the credit-provider is able to receive timely information about the occurrence of such consumer activities, then the credit-provider can more effectively make use of resources expended during a promotional campaign by targeting consumers identified as having recently been involved in such activities. In other words, automatic recognition of an occurrence of such an identified consumer activity may serve as a trigger to notify a credit-provider or other interested party that an identified consumer is currently a good prospect for their promotional offer.

A computer system that is capable of processing massive quantities of data with the speed needed to identify daily triggers provides an important informational advantage to a credit-provider or other client of the system. A credit-provider may possess such a computer system, or, more frequently, may become a client of a business entity that has access to massive computer resources and to credit-related information and that offers such daily prospect trigger notifications.

Current government regulations that protect consumers from unwarranted financial surveillance and from unfair use of personal information may impose additional restrictions on the computer-implemented system for providing daily notifications based on prospect triggers notifications. For example, current federal regulations require that a firm offer of credit must be extended to every consumer whose name is included in a file that is generated by monitoring daily credit-related consumer activities. In order to be of commercial value to credit-providers, while at the same time complying with government regulations, the computer-implemented prospect trigger notification system first analyzes stored consumer data, which is frequently about consumers with whom the credit-provider does not currently have a business relationship, in order to exclude those consumers who do not meet a set of criteria that define consumers to whom the client is willing to extend a firm offer of credit.

FIG. 1A depicts a trigger notification system 100 that receives one or more lists 140, 145 which identify consumers who meet a client's set of pre-screen criteria for receiving a firm offer of credit. The trigger notification system 100 also receives, from an online database 120 that stores information about the credit-related activities of millions of consumers, a set of recently updates to the online database 120. The trigger notification system 100 compares the list of identified consumers with the list of recent activity updates, as will be described in greater detail in the present disclosure, to generate prospect notifications based on trigger events.

As depicted in FIG. 1A, an online database 120 stores data about a large population of consumers, for example, two hundred and sixty million consumers. The online database 120 dynamically receives and stores input from financial institutions 122, from merchants 124, from lenders 126, and from government entities 128 around the clock. In other embodiments, the online database 120 may additionally or alternatively receive input from other sources. The credit-related input may include information associated with credit relationships, credit inquiries, and public records. For example, entries in the online database 120 may include information about: changes to account balances, account payment histories including notices of overdue accounts, credit rating inquiries, new lines of credit opened, credit line limit increases, credit line over-limits, address changes, judgments, liens, and bankruptcies. In one embodiment, the database 120 serves as a primary source of information for generating consumer credit ratings.

The online database 120 may be implemented using one or more mainframe computers, mini-computers, personal computers configured as a server farm, or other suitably configured set of computers with sufficient storage and processing capacities.

In a preferred embodiment, the online database 120 is configured as a relational database comprising a plurality of tables, as will be described in greater detail with reference to FIG. 1B.

Information from the online database 120 is processed and used to generate a data warehouse 130 for a population of consumers. The information may represent a "snapshot" of the information in the online database 120 and may be periodically updated, such as monthly, weekly, twice weekly, or according to another desired schedule. The data warehouse 130 may process the data from the online database 120, and may include additional data not found in the online database 120, in order to facilitate in-depth analysis of the data for a variety of credit-related and other purposes without disturbing normal functioning of online database 120. For example, some or all of the data from the online database 120 may be verified for accuracy before being entered into the data warehouse 130. Additional information associated with individual consumers, such as demographic information, employment information, and other information of interest for credit-related purposes may be added to the data warehouse 130.

In a preferred embodiment, the data warehouse 130 is implemented as a relational database, although data in the data warehouse 130 may be organized differently than data in the online database 120. The data warehouse 130 may be implemented using one or more mainframe computers or other suitably configured set of computers with sufficient storage and processing capacities. Furthermore, although the online database 120 and the data warehouse 130 have each been depicted in FIG. 1A as a single, unified database, in various embodiments, one or both of the repositories 120, 130 may be distributed across a variety of hardware and/or software components that may be located in one location or in a plurality of physical locations.

One embodiment of the data warehouse 130 is described in the co-owned and co-pending U.S. patent application Ser. No. 11/103,659, filed on Apr. 11, 2005, and entitled SYSTEMS AND METHODS FOR OPTIMIZING DATABASE QUERIES, the disclosure of which is hereby incorporated herein by reference in its entirety.

As described above, a client 160 may be a business entity that wishes to undertake a sales campaign or other promotional activity. In order to generate a list of consumers with whom a credit-provider does not currently have a business relationship, but to whom the credit-provider is willing to make a firm offer of credit, a sub-population of interest is identified from the records of the data warehouse 130. In some embodiments, the sub-population of interest may be identified in order to generate a list of existing customers with whom a new credit relationship is desired.

For example, in a preferred embodiment, the client identifies a set of "pre-screen" criteria that define consumers who qualify for a firm offer of credit, such as for a car, home equity or other type of loan from the client. To continue the example, the client's pre-screen criteria may specify that consumers with credit ratings above a threshold value and who have had no repossessions on automobile loans are eligible for a firm offer of credit on an automobile loan. More frequently, clients may wish to specify pre-screen criteria that are much more complex in order to identify a desired target sub-set of the population.

Applying the client's pre-screen criteria to records in the data warehouse 130 generates a subset list 140 that includes a subset of consumer names from the data warehouse 130, for example, fifty million consumers out of two hundred and thirty million, who meet the client's pre-screen criteria. The subset list 140 may be regenerated monthly, or bi-weekly, or according to another periodic or other type of schedule, and may be based on an updated set of pre-screen criteria provided by the client 160. In some jurisdictions, government regulations require that pre-screen lists 140 be updated at a minimum frequency or more, such as at least every thirty or ninety days, in order to ensure that consumers are being selected for credit or other types of offers based on credit-related data that is current.

The trigger notification system 100, which is preferably implemented as a software package that is configured to run on general purpose computer equipment and to access records within the online database 120, receives a copy of a client's pre-screen subset list 140 and a set of one or more trigger events 146 of interest to the client 160. A trigger event is typically an event or occurrence that is logged in the online database 120 of daily consumer activities and that the client 160 wishes to use to identify consumers who may be actively shopping for specific products and/or services. For example, an inquiry regarding a consumer's credit score from a home mortgage provider may be an indication that the consumer is actively shopping for a mortgage. The trigger notification system 100 uses the subset list 140 and the client-provided set of trigger events 146 to monitor updates to the daily credit-related activity database 120 that are associated with consumers included in the pre-screen subset list 140.

A business entity that operates the trigger notification system 100 preferably serves many different clients 160, each interested in conducting its own promotional campaign(s), with its own pre-screen criteria and resultant subset list 140, as well as each with its own set of trigger events 146 and other campaign-related instructions. For ease of description, however, the descriptions of the systems and methods provided herein frequently refer to the client 160 in the singular. It will be appreciated that the business entity operating the trigger notification system 100 may provide the services described herein to a plurality of clients 160 at the same time.

The trigger notification system 100 monitors updates to the online database 120 associated with consumers on the subset list 140, as is described in greater detail with reference to FIGS. 6A and 6B. In particular, the trigger notification system 100 compares the updates from the online database 120 to the pre-screen subset list 140 and identifies those consumers from the subset list 140 who have been associated with a trigger event since a last monitoring of the online database 120. In some embodiments, the trigger notification system 100 makes use of date-stamps on records in the online database 120 in order to identify newly-occurring trigger events. In other embodiments, the trigger notification system 100 maintains records for consumers on the subset list 140, so that changes to a consumer's record may be noted.

The trigger notification system 100 compiles a list 150 of consumers from the subset list 140 whose associated records in the online database 120 indicate a current trigger event. The trigger notification system 100 preferably provides the client 160 with a daily, or more frequent, list of names 150 triggered within a recent short period of time, such as within the last twenty-four hours, so that the client 160 may quickly make use of the information that the identified consumers are currently good prospects for an offer of credit. In various embodiments, if requested by the client, the daily list of triggered names 150 may include, in addition to consumer names, identification of the one or more trigger events that occurred with respect to each consumer, as well as other identifying and/or contact information for the consumers on the list 150.

In some jurisdictions, legal regulations may further stipulate that, along with the daily list of triggered names 150, the trigger notification system 100 provides the client 160 with a consumer statement file, containing consumer statements of explanation associated with the contents of their credit files for any consumers included on the daily list of triggered names 150.

If requested by the client 160, the trigger notification system 100 may filter, sort, or otherwise modify the daily list of triggered names 150. For example, if a client 160 requests monitoring of more than one event trigger for the trigger notification system 100 to monitor, the trigger notification system 100 may group the identified consumer names 150 by the associated trigger. In situations where a given consumer is associated with more than one trigger event on the same day, the trigger notification system 100 may list the consumer in all appropriate groups or may list the consumer in only one group. For example, the client 160 may identify a hierarchy or other prioritized list of the trigger events and may request that triggered consumers be listed only with the trigger event of highest rank with which the consumer is associated on that day.

As another example, the client 160 may request that the trigger notification system 100 filter the daily set of triggered consumer names to exclude or identify a consumer who is repeatedly associated with a same trigger events within a given time span. For example, the client 160 may request that the trigger notification system 100 include the consumer's name in the daily list 150 only once or only once per week for a given trigger. Thus, if the online database 120 includes multiple inquiries associated with car loans for a given consumer over the span of two weeks, the consumer's name may appear on the daily list of triggered names 150 only the first time.

Furthermore, the client 160 may request that the trigger notification system 100 limit the daily list of triggered names 150 to only a pre-determined number of names, such as, for example, if the client 160 does not have the capacity to contact or otherwise make use of the full set of names in a timely manner. These and other modifications to the operation of the trigger notification system 100 will be appreciated by a skilled artisan as being within the scope of the invention as described herein.

In some embodiments, the client 160 communicates with the trigger notification system 100 via computer network, such as the Internet, and may be provided with a secure user interface, such as one or more web pages of a secure website that allow the client to input and/or modify triggers for use by the trigger notification system 100. In some embodiments, the client 160 may additionally or alternatively use a secure user interface, such as one or more web pages of a secure website to input and/or update the pre-screen criteria.

In some embodiments, the client 160 may also receive the daily list of triggered names 150 via secure Internet connection. In other embodiments, the client 160 and the trigger notification system 100 may communicate using T-1 or T-3 lines, or other dedicated or non-dedicated high-speed communications lines. Alternatively, clients 160 and the trigger notification system 100 may communicate using other data transmission systems and protocols. For example, clients 160 may receive their daily list of triggered names 150 as a text document or as a comma-delimited file transport protocol (FTP) transmission that may be downloaded into a spreadsheet application. In some embodiments, a portion of the communications between the client 160 and the trigger notification system 100 may be conducted in person, in writing, via telephone, or using other communication methods.

In some embodiments, the client 160 may provide a list of prospect names 145 for use by the trigger notification system 100. For example, the client 160 may provide a list 145 of current customers for whom the client 160 would like to identify additional credit relationship possibilities using the trigger notification system 120. As another example, the client 160 may provide a list 145 of consumers who have recently contacted them with credit-related questions but who have not entered into any business relationship with the client 160. As a third example, the client 160 may provide a list 145 that the client has purchased or otherwise acquired from another vendor. The trigger notification system 100 may use the client-provided list of prospect names 145 in addition to or as an alternative to the pre-screen subset list 140 as the list of names for whom triggered monitoring of the online database 120 is requested.

Government and other regulations may specify that consumers who wish not to be contacted for advertising purposes must be left off of contact lists generated for advertising purposes. In some jurisdictions, such consumers may express their desire by adding their name to an "opt-out/pander list" of people explicitly requesting not to be contacted with advertising offers. In various embodiments of the systems and methods described herein, verifying that such consumer names do not appear on the daily list of triggered names 150 supplied to the client 160 may be carried out by the trigger notifications system 100 and/or as part of the generation of the pre-screen subset list 140. Similarly, compliance with other regulations and legal requirements may be carried out by the trigger notification system 100 and/or by other components described herein.

In addition to or as an alternative to event-based triggers, the client 160 may identify other types of trigger occurrences of interest that may appear in the records of the online database 120. For example, the client 160 may be interested in identifying consumers whose credit balance is within a given amount or percentage of their credit limit or whose debt ratio has reached a threshold value. The client 160 may be interested in identifying consumers whose credit score has changed in value by a certain number of points or by a pre-determined percentage within a given time. Furthermore, in some embodiments, the client 160 may categorize consumers according to "credit score bands," to which they belong by virtue of their credit score, such that a consumer may belong to the "600-650" band or to the "650-700" band based on their credit score. In such embodiments, the client 160 may wish to be notified of consumers who have moved from one credit score band to another within the last twenty-four hours or other recent period.

In some embodiments, information obtained as a result of the trigger notifications system's 100 monitoring of the online database 120 may be used as an input to an automated decisioning or learning system, in addition to or as an alternative to being used to provide the client 160 with a daily list of triggered names 150. In such embodiments, the automated decisioning or learning may be carried out by the trigger notification system 100 or another system component in communication with the trigger notification system 100 or by the client 160 or by another entity associated with the client 160, or by a combination of the above.

For example, in one embodiment, the clients 160 provide feedback data to the trigger notification system 100 regarding the success rates of their consumer contact campaigns that are based on trigger notifications 150. The feedback data provided by a given client 160 is preferably time-stamped or segmented to permit the success rate information to be correlated with the trigger criteria, and possibly with the pre-screening criteria, used by that client 160 to generate the associated list or lists of prospects 150. A software-based analysis component of the trigger notification system 100 analyzes the collected feedback data, collectively and/or on a client-specific basis, to identify the trigger criteria, and optionally the pre-screen criteria, that produces the "best" results (e.g., the highest success rate, as measured based on the percentage of the contacted prospects that accept the associated offer from the client).

Results of this analysis may be disseminated to the clients 160 via auto-generated, periodic reports to assist the clients 160 in modifying their trigger criteria and/or pre-screen criteria over time so as to improve their respective success rates. The reports may, for example, separately identify, for each of a plurality of different products and services, those criteria that tend to produce the highest success rates, as determined based on a collective analysis of all the feedback data and associated criteria settings of many different clients (e.g., tens to hundreds of different clients). The reports may also include client-specific recommendations based on the feedback data provided by the particular client.

The business entity that operates the trigger notification system 100 may also provide a computer-implemented service for enabling clients to request and obtain mutually exclusive lists of prospects, such that two competing clients 160 will not be notified of the same prospect at the same time. This feature may, for example, be implemented using a round robin protocol in which each time a consumer matches the trigger criteria of multiple competing clients, that consumer is added only to the prospect list of the next client in sequence. This feature, which may be implemented within the software of the trigger notification system 100, can significantly increase the success rates of the clients' campaigns, while reducing the likelihood that the consumers will be overwhelmed by the volume of contacts made by clients 160.

Figure 1B:
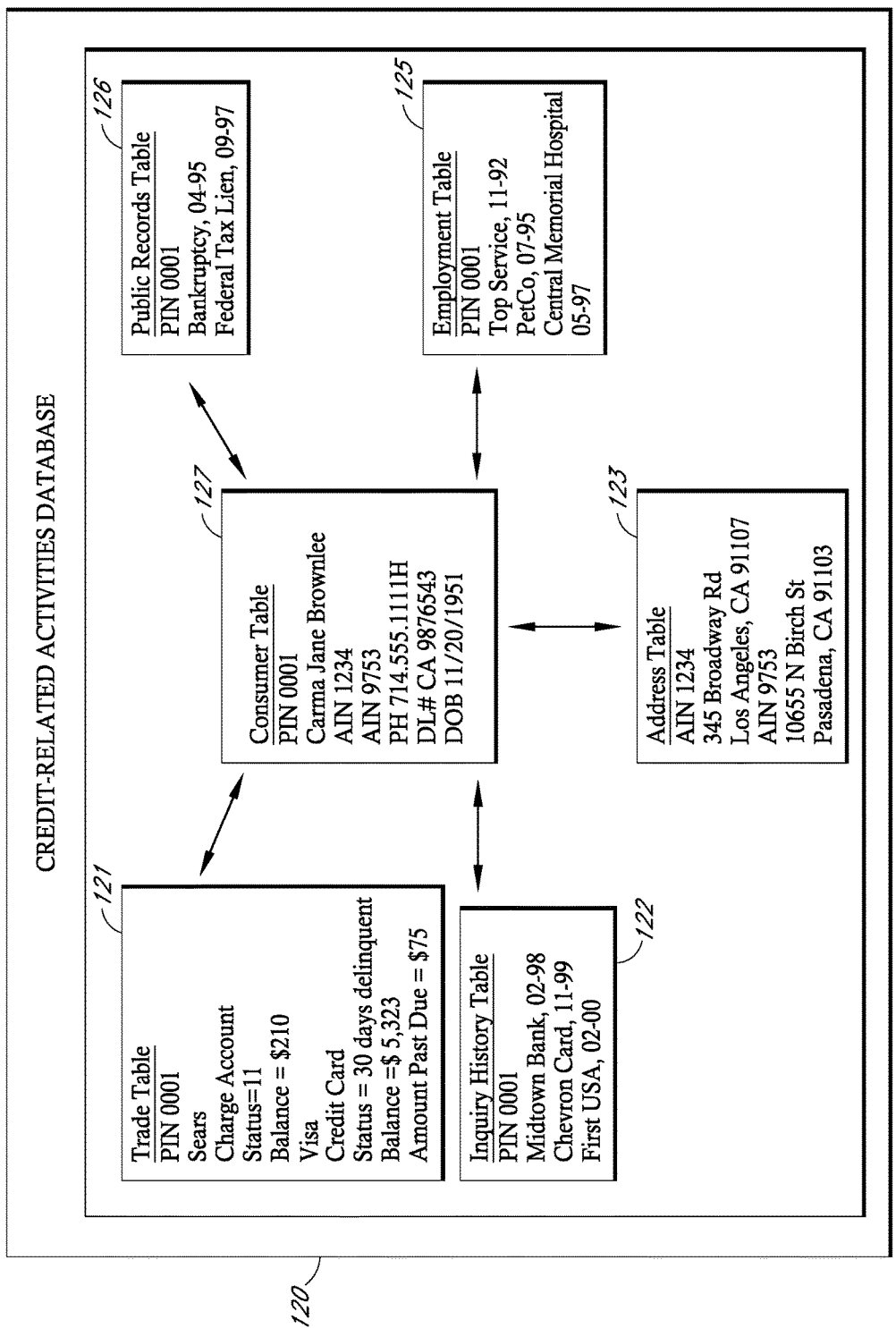
FIG. 1B is a block diagram that provides a more detailed view of the table structure of one embodiment an online database of credit-related consumer activity.

FIG. 1B depicts one example of a set of relations or tables 121-127 that store consumer credit-related data in a relational online database 120. In the example depicted in FIG. 1B, some or all of the tables 121-127 of the relational database 120 may be linked to one another using a unique personal identification number (PIN) that is assigned to each consumer in the database 120.

A consumer table 127 of the consumer activity database 120 includes identifying and other personal information for each consumer in the database 120. The consumer's record may include, by way of example, the consumer's PIN and full legal name, driver's license information, and the like.

A trade table 121 stores information about existing credit card relationships associated with each consumer. For example, in FIG. 1B, the consumer with PIN number '0001' has one Sears charge account and one Visa credit card, and up-to-date information about those accounts is stored in the table 121.

An inquiry history table 122 stores information about credit score inquiries that have been submitted to the online database 120. For example, in FIG. 1B, credit inquiries regarding the consumer with PIN number '0001' have been made within the last few years by Midtown Bank, Chevron Credit Card, and First USA.

An address table 123 stores information about known addresses, which may be indexed by an Address Identification Number (AIN), that are associated with consumers.

A public records table 126 stores information about consumers that may be relevant to a consumer's credit rating and that is typically available to the public. For example, information about bankruptcies, liens, property titles, and the like may be stored in the public record table 126. An employment table 125 stores information about a consumer's employment history. In other embodiments, other tables may be additionally or alternatively used to store data about the consumers' credit-related activities.

As depicted in FIG. 1B, many of the tables 121-127 of the relational credit-activities database 120 use the consumer PIN number as a primary key to link the tables 121-127 and to facilitate various database query and sorting operations, both simple and complex, that are implemented to carry out the functions of the trigger notification system 100. As will be familiar to one of skill in the design and use of relational databases, the information stored in the tables 121-127 of the database 120 may be organized as a relational database according to a wide variety of other organizational schema. Furthermore, in other embodiments, the database 120 may be organized as a type of information repository different from a relational database.

Figure 2:
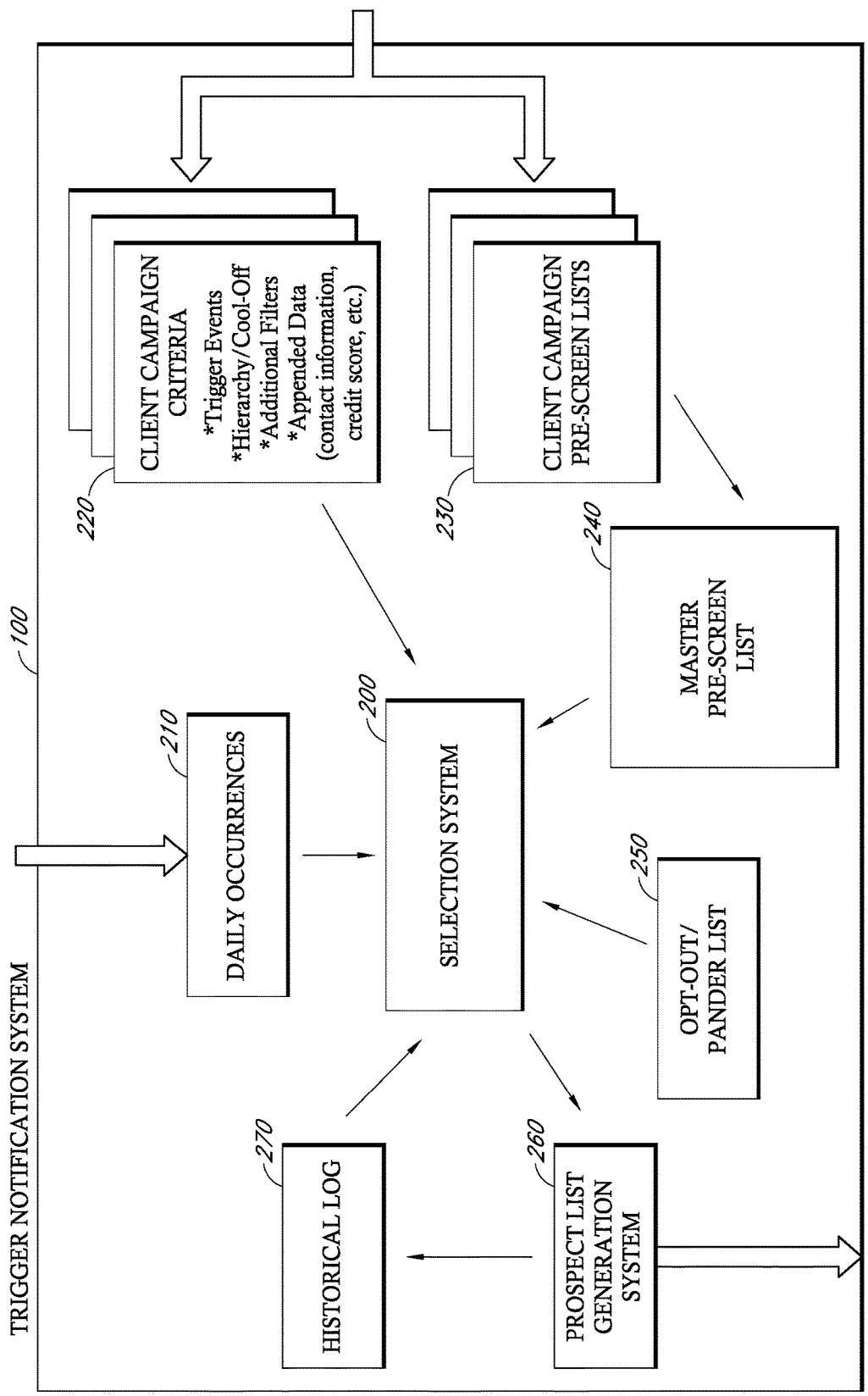
FIG. 2 is a block diagram that provides a more detailed view of one embodiment of a trigger notification system.

FIG. 2 is a block diagram that provides a more detailed view of one embodiment of a trigger notification system 100. As shown in FIG. 2, a selection system 200 of the trigger notification system 100 may receive several types of information, including: a set of daily credit-related occurrences 210; campaign pre-screen lists 230 for individual clients, which may be combined into a master pre-screen list 240; client campaign criteria 220, one or more opt-out/pander lists 250; and a historical log 270 of generated prospects triggers. These types of information will be described in greater detail below. The selection system 200 processes the information 210, 220, 240, 250, 270, and a prospect list generation system 260 prepares a daily list of prospect trigger names 150 to send to clients 160 for each client campaign.

A pre-screen list 230 of consumers who meet a client's criteria for a firm offer of credit is obtained for each client campaign. As was described with reference to FIG. 1A, the client 160 may compile and provide the pre-screen list 145 to the trigger notification system 100, or the client may request that the pre-screen list 140 be compiled from suitable consumer names identified in the database of consumer files 130. Either of these types of lists, or a combination of the two, may be used as the pre-screen list 230 of consumers for use by the selection system 200 of the trigger notification system 100.

For efficiently serving many clients 160 simultaneously, the trigger notification system 100 may compile a master pre-screen list 240 that may be compiled from the various campaign pre-screen lists 220 received from the clients 160. The master pre-screen list 240 advantageously takes into account the fact that a given consumer may meet the campaign criteria for more than one client and/or for more than one campaign. Thus, by combining the various campaign pre-screen lists 220, the trigger notification system 100 is able to more efficiently monitor the daily credit-related occurrence information 210 received from the online database 120 and to provide the list of prospect triggered names 150 to clients 160 in a timely, preferably daily, schedule. An example of a master pre-screen list 240 is described in greater detail with reference to FIG. 3.

The trigger notification system 100 receives information about daily credit-related occurrences 210 that were reported to and logged in the online database 120. In a preferred embodiment, the online database 120 receives information about credit-related activities around-the-clock and seven-days-a-week. In general, client campaigns that make use of prospect triggers are especially interested in credit-related inquiries associated with a given consumer. For example, the client may wish to be notified when information in the database 120 indicates that the consumer has made an inquiry about a home equity loan, a car loan, or a mortgage. However, some campaigns may be interested in events such as credit balance changes, and the like.

Information about inquiries newly-logged in the database 120 may be provided to the selection system 200 of the trigger notification system 100 once daily or at more frequent intervals. When the daily occurrences information 210 is provided to the trigger notification system 100 two or more times during the day, the selection system 200 may process the available portion of the incoming occurrence information 210 at various times throughout the day, and may provide the information to the prospect list generation system 260, in order to compile a daily prospect trigger list 150, as will be described in greater detail below.

In one simple embodiment, the selection system 200 simply collects information about credit inquiry occurrences associated with consumers on the master pre-screen list 240, and sends the information to the prospect list generation system 260 for separation according to individual client campaigns and for transmission to the appropriate clients 160. In another embodiment, the prospect list generation system 260 simply forwards a list received from the selection system 200 to an applicable client. The prospect list generation system 260 may also send a record to the historical log 270 of the list 150 that was sent to the client 160, as will be described in greater detail with reference to FIG. 5.

In other preferred embodiments, the selection system 200 accesses additional information before forwarding the triggered consumer names and other information to be sent to the client, in order to provide additional screening of the occurrence information 210. This additional processing may advantageously provide additional assurance that the list of consumer names 150 sent to client 160 contains only bona fide qualified consumers, which is of especial advantage to clients in jurisdictions in which government regulations specify that every consumer whose name is received by the client 160 on a prospect trigger list 150 must be extended a firm offer of credit.

In various embodiments, therefore, the selection system 200 receives further information about client campaign criteria 220, about consumer opt-out/pander lists 250 and/or the historical log 270 of previous trigger notifications sent to clients 160 for a given consumer.

The opt-out/pander list 250 includes the names of consumers who have specifically requested that they not be contacted with advertisements of various types, including credit-related offers. In some jurisdictions, consumers may register with one or more government programs that maintain consumer opt-out/pander lists 250. Government agencies may further undertake to enforce compliance with the opt-out/pander lists 250 by levying fines on businesses that contact consumers on the list(s). Although opt-out/pander lists 250 are frequently consulted in compiling a client's original campaign pre-screen list 220, clients may request that consumers on a given day's prospect trigger list be again compared to the opt-out/pander lists 250, in part to verify that the consumer has not been placed on the opt-out/pander list 250 since the campaign pre-screen list 220 was compiled. Consumers whose names appear on the master pre-screen list 240, who are associated with a daily trigger, and who are identified by the selection system 200 as appearing on an opt-out/pander list 250, will frequently be removed from the daily prospect list 150 before the list 150 is sent to the client 160.

As has been described above, clients 160 may also specify additional types of campaign-specific criteria 220 to be applied to consumers associated with daily occurrences that serve to filter the daily set of prospect triggers being compiled by the trigger notification system 100. For example, because a client's pre-screen list 230 is frequently regenerated only monthly or even quarterly, some consumer data of interest to the client 160 may have changed in the interim, and the client may wish to have critical data re-verified before a consumer's name is placed on the daily prospect trigger list 150 that will be supplied to the client 160. For example, a client 160 may wish to have one or more of the consumer's credit scores re-calculated using up-to-date information before being sent the consumer's name and contact information.

Furthermore, in an effort to avoid creating a negative impression for a consumer by making multiple offers of the same credit product or service within a short time period, a client may specify that a consumer who has been contacted by the client based on a prospect trigger notification should not be included on another prospect triggers list 150 for a specified period of time, such as for thirty, sixty, or ninety days. Such a period of non-contact may be known as a "cool-off" period. The selection system 200 may consult the historical log 270 of notification triggers activity to determine if the consumer is still within a cool-off period based on a previous contact by the client.

The selection system 200 may also receive additional information from the client 160 as part of the client campaign criteria 220. For example, in additional to information about the trigger events about which the client is interested, the client may send information about any desired hierarchy of campaigns, such that a consumer for whom a trigger event is identified for more than one campaign, may be put on a list of triggered names 150 for a campaign with a higher ranking and not put on a list 150 for a campaign with a lower ranking. For example, a client who is a credit card provider may instruct the trigger notification system 100 to implement a hierarchy that includes a rule stipulating: if a pre-screened consumer is triggered for a "Platinum Card" campaign and for a "Gold Card" campaign, put the consumer name on the "Platinum Card" list only.

The campaign criteria 220 may also include a request to append additional data to each consumer name included on the trigger notification list 150, as will be described in greater detail with reference to FIG. 3. Furthermore, the campaign criteria 220 may provide additional instructions to the selection system 200 for processing names identified as being associated with trigger events.

Once the selection system 200 has processed the information 210, 220, 240, 250, 270, the selection system 260 sends the resulting data to the prospect list generation system 260 for further processing and for generating the individual lists of triggered names 150 for making available to the clients 160.

FIG. 3 depicts an example of a master pre-screen list 240. In the example shown, a record is generated for each consumer whose name appears on at least one client campaign pre-screen list 230. In the example shown, each consumer name in the master pre-screen list 240 is associated with a consumer identifier used by the trigger notification system 100, such as the PIN described with reference to FIG. 1B. Indications are also entered into each consumer record to identify client campaigns for which the consumer meets the pre-screen criteria. Finally, in some embodiments, each client record stores information about additional data requested by clients. For example, a client who wishes to carry out a telephone advertising campaign may wish to have a contact telephone number for each consumer on the client's pre-screen list 230. The requested information may be appended onto the consumer's record, and may be delivered to the client 160 together with the consumer name, if and when the consumer's name is triggered by a credit-related occurrence identified by the trigger notification system 100. Although, for ease of description, each record in the master pre-screen list 240 of FIG. 3 is associated with one set of appended consumer data, in other embodiments, separate sets of appended consumer data may be stored for the individual campaigns. Furthermore, in some embodiments, the master pre-screen list 240 may identify consumers by personal identification number (PIN) without including the consumer names.

Thus, the master pre-screen list 240 forms a master list of consumers for whom the trigger notification system 100 is requested to monitor daily credit-related occurrences 210.

FIG. 4 depicts a very simplified example of a list of daily occurrences 210. In one embodiment, the online database 120 transmits the list of daily occurrences 210 to the trigger notification system 100 on a daily basis or more frequently. The list of daily occurrences 210 lists new consumer credit-related activity that has been reported to the online database 120 by financial institutions 122, merchants, 124, lenders, governments 128, or other informants. In the example shown in FIG. 4, each row, or record, represents an occurrence, and the records are organized according to the source of the information, or informant. In order to facilitate processing by the trigger notification system 100, the records are further organized by type of occurrence, such as by type of credit-product associated with each credit score inquiry for the consumers. In other embodiments, the daily occurrences list 210 may be organized according to any of a variety of other schemes. For example, records may be ordered in simple chronological order according to the time at which they were reported to the online database 120. Furthermore, in other embodiments, the daily occurrences list 210 may additionally or alternatively include any of a variety of other types of information that allows the trigger notification system 100 to identify trigger events that have occurred for consumers who are on one or more client pre-screen lists 230.

FIG. 5 depicts a simplified example of a prospect triggers historical log 270. As shown in FIG. 5, the prospect triggers historical log 270 keeps a record of prospect trigger notifications 150 that have been sent to clients 160. The information stored in the prospect triggers historical log 270 may be used to verify whether a consumer has been previously included in a prospect trigger list 150 for a given client campaign, and if so, when. As described in greater detail with reference to FIG. 2 and FIG. 6B, the prospect triggers historical log 270 may be used to provide additional filtering to a list of names from a client's pre-screen list 230 for whom a trigger event has occurred. In particular, the prospect triggers historical log 270 may assist the prospect list generation system 260 to implement a "cool-off" period, if requested by the client 160. In other embodiments, other methods of implementing a historical log for prospect trigger notifications may be used by the trigger notification system 100.

Figure 6A:
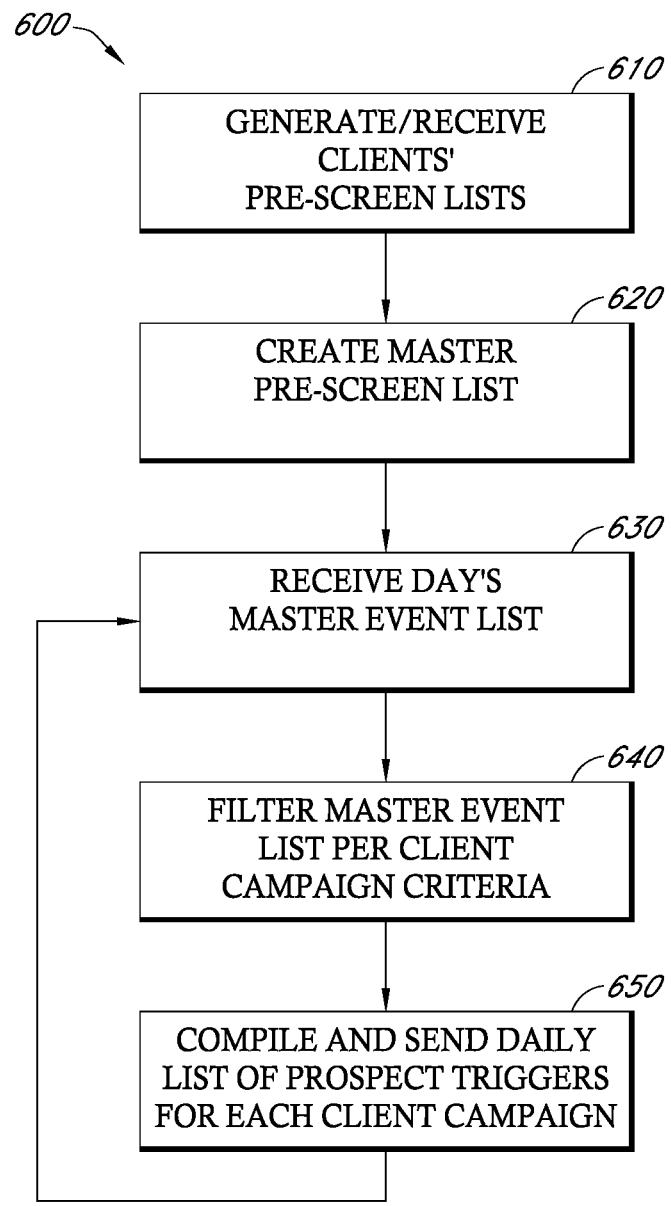
FIG. 6A is a flow chart that depicts one embodiment of a process for generating prospect triggered names.

FIG. 6A is a flow chart that depicts one embodiment of a process 600 for generating prospect trigger notifications 150. In FIG. 6A, the prospect trigger notifications 150 are generated on a daily basis, based on information that has been received by the online database 120 within the last twenty-four hours. In other embodiments, the prospect trigger notifications 150 may be generated at another frequency and/or may be based on data received by the online database 120 or other source of information within another recent period of time.

As depicted in FIG. 6A, the process 600 begins in Block 610 with the generation of a client's pre-screen list 220. As described with reference to FIG. 2, the client's pre-screen list 230 may comprise a list of names of consumers who match a set of criteria provided by the client 160. For example, a client 160 may wish to offer home equity loans to consumers who: (a) have a credit score over a threshold value, (b) do not have a foreclosure on their record, and (c) live in the greater Chicago area, and (d) have been at the same job for over three years. A client 160 may alternatively wish to specify a much more complex set of pre-screen criteria for identifying consumers qualified to receive the client's offer of credit or other products or services.

In some embodiments, the client 160 may request that the business entity offering the prospect trigger notification service also generate the pre-screen list 220 of consumers that match the client's specified criteria. As was described with reference to FIG. 1A, the business entity may search a data warehouse 130 to identify consumers that meet the client's pre-screen criteria.

Alternatively or additionally, the client 160 may generate, purchase, or otherwise acquire a list 145 of consumers that are deemed to be acceptable for a firm offer of credit and may provide the list 145 for use by the trigger notification system 100.

In Block 620, a master pre-screen list 240 is created for use by the trigger notification system 100. The master pre-screen list 240 combines information from a plurality of client campaign pre-screen lists 230, as exemplified in the sample master pre-screen list of FIG. 3. As was described with reference to FIG. 3, combining the various pre-screen lists 230 from the clients 160 that using the trigger notification system 100 on a given day allows the trigger notification system 100 to more efficiently process the incoming daily occurrences data 210 and therefore more quickly provide the clients 160 with their requested daily list of triggered names 150.

In Block 630, the trigger notification system 100 receives the list of new occurrences 210 that have been reported and entered into the online database 120 within a recent period of time, such as within the last day. A simplified example of a daily occurrences list 210 is depicted and described with reference to FIG. 4. In some embodiments, the daily occurrences list 210 may be processed before being sent to the triggers notification system 100, for example to reduce the processing burden involved in monitoring the daily occurrences list 210. For example, the set of all reported occurrences may be filtered to include only occurrences of interest to the clients 160 using the triggers notification system 100, for example, only credit score inquiries. As another example, the set of all reported occurrences may be filtered to include only occurrences associated with consumers on the pre-screen list 140, 145. As was described with reference to FIG. 4, the set of all reported occurrences may additionally or alternatively be sorted or otherwise organized in a manner so as to allow for efficient processing on the part of the triggers notification selection system 200.

In Block 640, the selection system 200 of the trigger notification system 100 filters the list of daily occurrences 210 to identify, for each client campaign, the consumers who (a) meet the client's pre-screen criteria, (b) are associated with a trigger event of interest to the client that occurred within a recent time period of interest to the client, and (c) also meet any additional criteria 220 for the campaign that has been specified by the client, as was described with reference to FIG. 2. For example, a client 160 may specify that some or all of the pre-screen criteria that allowed the consumer to be placed on the pre-screen list 230 should be verified as still being accurate. The client 160 may request that the trigger notification system 100 implement a "cool-off" period and/or that the trigger notification system 100 confirm that the consumers listed in the daily list of occurrences 210 are currently not on an opt-out/pander list 250.

In some embodiments, as has been described with reference to FIG. 6A, filtering the day's master event list 210 is carried out by the selection system 200. In other embodiments, the process of filtering the day's master event list 210 in may be carried out, in whole or in part, by the prospect list generation system 200. FIG. 6B will provide a more detailed flowchart that depicts in greater detail a sample implementation of the process for filtering of Block 640, as carried out by the selection system 200, the prospect list generation system 260, or by another system included in or associated with the trigger notification system 100.

Once the triggered consumer names have been filtered according the client's campaign criteria 220, the daily list of prospect triggered names 150 may be compiled by the prospect list generation system 260, together with any appended data 220 requested by the client, and sent, or otherwise made available, to the client 160. The prospect list generation system 260 may also notify the historical log 270 of the list of triggered names 150 sent to the client.

Figure 6B:
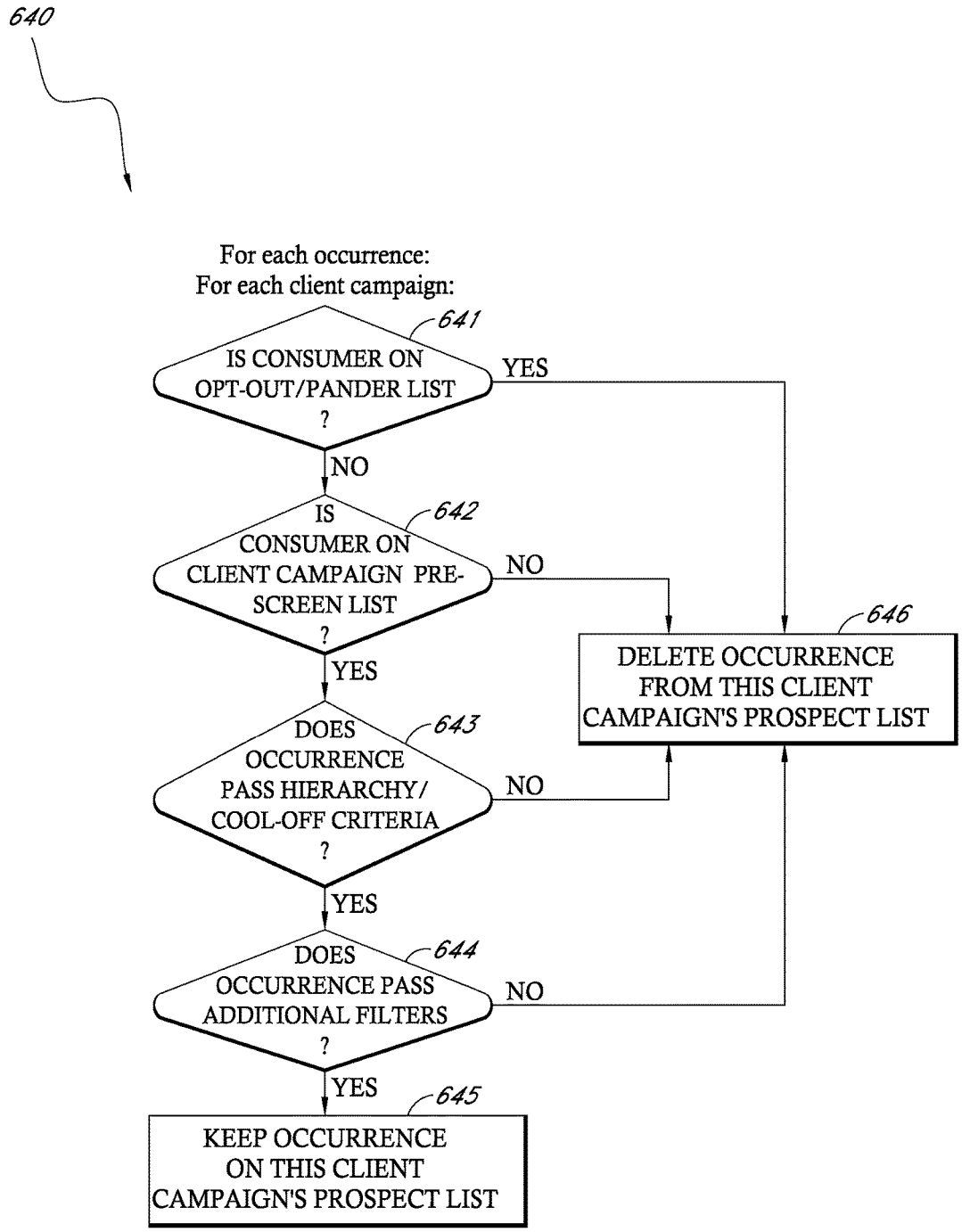
FIG. 6B is a flow chart that depicts a more detailed view of an embodiment of a process for filtering a master event list for generating a list of daily prospect triggered names.

FIG. 6B is a flow chart that depicts a more detailed view of an embodiment of a process for filtering a master event list for generating a list of daily prospect triggered names. The flowchart depicts a filtering process that may be applied to each trigger event occurrence that has been reported for a consumer name on the master pre-screen list 240, and, since campaign criteria are frequently different for different client campaigns, may be applied for each applicable client campaign, as well.

The process 640, as depicted in FIG. 6B, begins in Block 641, where the selection system 200 determines if the consumer name is on an opt-out/pander list 250, as has been earlier described with reference to FIG. 2 and elsewhere in the disclosure. If the consumer name is on an opt-out/pander list 250, the process moves to Block 646 where the selection system 200 deletes this trigger event occurrence from the client's daily list of triggered names 150 for this campaign. In some embodiments, if the consumer name is on an opt-out/pander list 250, in Block 646 the selection system 200 deletes the consumer name is deleted from all client campaigns.

If the consumer name is not on an opt-out/pander list 250, the process move to Block 642, where consumer names that are not on the client's pre-screen list for the campaign are deleted from, or not included in the list of triggered names 150 for the campaign.

In Block 643, any campaign-specific criteria 220 with regard to campaign hierarchies or "cool-off" periods provided by the client is used to further process the daily list of occurrences 210. For example, if the consumer name has already been added to a list 150 for a campaign with a higher ranking in the provided hierarchy of campaigns, the consumer name may be deleted, in Block 646, from the list 150 for any lower-ranking campaign of the client's. As another example, if information from the historical log 270 indicates that the consumer's name has been put on a prospect trigger list 150 within a recent period designated by the client as a "cool-off" period for the campaign, then the selection system 200 may, in Block 646, delete the consumer name from the list of triggered names 150 for this campaign.

In Block 644, the selection system 200 may check the consumer's trigger event with regard to one or more additional filters provided with the campaign criteria 220. For example, the client's credit score, address information, or employment information may be re-checked for accuracy.

If this occurrence of a trigger event for the consumer passes all of the above tests, in Blocks 641-644, then the consumer name for this trigger event may be included in a processed version of the list of triggered names 150 for the campaign.

As noted above, in various embodiments, the process 640 may be carried out, in whole or in part, by the selection system 200 and/or by the prospect list generation system 260. Thus, although the process 640 is described as being carried out by the selection 200, various embodiments of the trigger notification system 100 may carry out the functions of the process 640 in a variety of different ways.

Although the foregoing systems and methods have been described in terms of certain preferred embodiments, other embodiments will be apparent to those of ordinary skill in the art from the disclosure herein. On a very basic level, although many of the lists, repositories, and various data sets have been described herein as including consumer names, it will be readily apparent to one of skill in the art that the lists, repositories, various data sets and other applicable components, may be alternatively and even preferably implemented using one or more identifiers for the consumers other than their names. As another example, while the embodiments described herein have been described with respect to an online database 120 and a data warehouse 130, in other embodiments, the two databases 120, 130 may be implemented as a single database configured to provide the functionality described herein with reference to the online database 120 and the data warehouse 130. Furthermore, while the trigger notification system 100 has been described as monitoring updates to the online database 120, in other embodiments the trigger notification system 100 additionally or alternatively monitors updates to the data warehouse 130. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms. Accordingly, the accompanying claims and their equivalents are intended to cover such forms or modifications as would fall within the scope and spirit of the invention.

What is claimed is:

1. A computer system comprising:
    a first computer storage dynamically receiving and storing information about credit-related activities of over one hundred million consumers;
    a second computer storage configured to store a plurality of snapshots of credit information from the first computer storage, the plurality of snapshots of credit information periodically updated and verified for accuracy, and merged with other information not stored in the first computer storage; and
    a trigger notification system in electronic communication with the first computer storage and the second computer storage, the trigger notification system configured to:
        receive a first client's pre-screen criteria data file defining non-customer consumers qualifying for a firm offer of credit from the first client;
        receive the first client's trigger events file comprising indications of events that are indicative of consumers actively seeking credit provided by the first client;
        apply the first client's pre-screen criteria data file to a first snapshot of the plurality of snapshots to generate a first subset of non-customer consumers from the over one hundred million consumers satisfying the first client's pre-screen criteria;
        monitor updates to the credit-related activities of the first subset of non-customer consumers in the first computer storage;
        identify one or more first updates associated with the first client's trigger events file for the first subset of non-customer consumers;
        automatically generate a first electronic notification configured to be sent electronically to a system accessible by the first client about the identified one or more first updates for transmitting a firm offer of credit to at least one first non-customer consumer associated with at least one of the identified first updates;
        apply the first client's pre-screen criteria data file to a second updated snapshot of the plurality of snapshots to generate a second subset of non-customer consumers from the over one hundred million consumers satisfying the first client's pre-screen criteria, the second subset different from the first subset;
        monitor updates to the credit-related activities of the second subset of non-customer consumers in the first computer storage;
        identify one or more second updates associated with the first client's trigger events file for the second subset of non-customer consumers; and
        automatically generate an electronic notification configured to be sent electronically to the system accessible by the first client about the identified one or more second updates for transmitting a firm offer of credit to at least one second non-customer consumer associated with at least one of the identified second updates.

2. The system of claim 1, wherein the information about credit-related activities of millions of consumers is dynamically received from one or more of merchants, lenders, or government entities.

3. The system of claim 1, wherein the credit-related activities include information associated with one or more of changes to account balances, account payment histories including notices of overdue accounts, credit rating inquiries, new lines of credit opened, credit line limit increases, credit line over-limits, address changes, judgments, liens, or bankruptcies.

4. The system of claim 1, wherein the snapshot of information from the first computer storage is updated at a frequency of one or more of monthly, weekly, twice weekly, or another desired schedule.

5. The system of claim 1, wherein the other information not stored in the first computer storage includes one or more of demographic information, employment information, or other information for credit-related purposes.

6. The system of claim 1, wherein the first client's pre-screen criteria includes consumers with credit ratings above a threshold value.

7. A computer-implemented method comprising:
- dynamically receiving and storing, in a first computer storage, information about credit-related activities of over one hundred million consumers;
- storing, in a second computer storage, a plurality of snapshots of credit information from the first computer storage, the plurality of snapshots of credit information periodically updated and verified for accuracy, and merged with other information not stored in the first computer storage;
- receiving, at a trigger notification system in electronic communication with the first computer storage and the second computer storage, a first client's pre-screen criteria data file defining non-customer consumers qualifying for a firm offer of credit from the first client;
- receiving, at the trigger notification system, the first client's trigger events file comprising indications of events that are indicative of consumers actively seeking credit provided by the first client;
- applying, by the trigger notification system, the first client's pre-screen criteria data file to a first snapshot of the plurality of snapshots to generate a first subset of non-customer consumers from the over one hundred million consumers satisfying the first client's pre-screen criteria;
- monitoring, by the trigger notification system, updates to the credit-related activities of the first subset of non-customer consumers in the first computer storage;
- identifying, by the trigger notification system, one or more first updates associated with the first client's trigger events file for the first subset of non-customer consumers;
- automatically generating, by the trigger notification system, a first electronic notification to be sent electronically to a system accessible by the first client about the identified one or more first updates for transmitting a firm offer of credit to at least one first non-customer consumer associated with at least one of the identified first updates;
- applying, by the trigger notification system, the first client's pre-screen criteria data file to a second snapshot of the plurality of snapshots to generate a second subset of non-customer consumers from the over one hundred million consumers satisfying the first client's pre-screen criteria;
- monitoring, by the trigger notification system, updates to the credit-related activities of the second subset of non-customer consumers in the first computer storage;
- identifying, by the trigger notification system, one or more second updates associated with the first client's trigger events file for the second subset of non-customer consumers; and
- automatically generating, by the trigger notification system, a second electronic notification to be sent electronically to the system accessible by the first client about the identified one or more second updates for transmitting a firm offer of credit to at least one second non-customer consumer associated with at least one of the identified second updates.

8. The method of claim 7, wherein the first client's pre-screen criteria are received from the system accessible by the first client.

9. The method of claim 7, wherein the first client's pre-screen criteria are received from an automated system.

10. The method of claim 7, further comprising generating the electronic notification in less than one day from identification of the one or more updates.

11. The method of claim 7, wherein generating the electronic notification further comprises providing information enabling the first client to contact the at least one first non-customer consumer.

12. The method of claim 7, wherein generating the electronic notification further comprises providing information that includes an indication of the identified one or more updates.

13. A non-transitory computer readable medium for trigger notification, comprising:
- program instructions for dynamically receiving and storing, in a first computer storage, information about credit-related activities of over one hundred million consumers;
- program instructions for storing, in a second computer storage, a plurality of snapshots of credit information from the first computer storage, the plurality of snapshots of credit information periodically updated and verified for accuracy, and merged with other information not stored in the first computer storage;
- program instructions for receiving, at a trigger notification system in electronic communication with the first computer storage and the second computer storage, a first client's pre-screen criteria data file defining non-customer consumers qualifying for a firm offer of credit from the first client;
- program instructions for receiving, at the trigger notification system, the first client's trigger events file comprising indications of events that are indicative of consumers actively seeking credit provided by the first client;
- program instructions for applying, by the trigger notification system, the first client's pre-screen criteria data file to a first snapshot of the plurality of snapshots to generate a first subset of non-customer consumers from the over one hundred million consumers satisfying the first client's pre-screen criteria;
- program instructions for monitoring, by the trigger notification system, updates to the credit-related activities of the first subset of non-customer consumers in the first computer storage;
- program instructions for identifying, by the trigger notification system, one or more first updates associated with the first client's trigger events file for the first subset of non-customer consumers;
- program instructions for automatically generating, by the trigger notification system, a first electronic notification to be sent electronically to a system accessible by the first client about the identified one or more first updates for transmitting a firm offer of credit to at least one first non-customer consumer associated with at least one of the identified first updates;
- program instructions for applying, by the trigger notification system, the first client's pre-screen criteria data file to a second snapshot of the plurality of snapshots to generate a second subset of non-customer consumers from the over one hundred million consumers satisfying the first client's pre-screen criteria;
- program instructions for monitoring, by the trigger notification system, updates to the credit-related activities of the second subset of non-customer consumers in the first computer storage;
- program instructions for identifying, by the trigger notification system, one or more second updates associated with the first client's trigger events file for the second subset of non-customer consumers;

program instructions for automatically generating, by the trigger notification system, a second electronic notification to be sent electronically to the system accessible by the first client about the identified one or more second updates for transmitting a firm offer of credit to at least one second non-customer consumer associated with at least one of the identified second updates.

14. The non-transitory computer readable medium of claim 13, wherein the first client's pre-screen criteria are received from the system accessible by the first client.

15. The non-transitory computer readable medium of claim 13, wherein the first client's pre-screen criteria are received from an automated system.

16. The non-transitory computer readable medium of claim 13, further comprising generating the electronic notification in less than one day from identification of the one or more updates.

17. The non-transitory computer readable medium of claim 13, wherein generating, by the trigger notification system, the electronic notification further comprises providing information enabling the first client to contact the at least first one non-customer consumer.

18. The non-transitory computer readable medium of claim 13, wherein generating, by the trigger notification system, the electronic notification further comprises providing information that includes an indication of the identified one or more updates.

19. The non-transitory computer readable medium of claim 13, wherein the information about credit-related activities of millions of consumers is dynamically received from one or more of merchants, lenders, or government entities.

20. The non-transitory computer readable medium of claim 13, wherein the credit-related activities include information associated with one or more of changes to account balances, account payment histories including notices of overdue accounts, credit rating inquiries, new lines of credit opened, credit line limit increases, credit line over-limits, address changes, judgments, liens, or bankruptcies.

* * * * *